United States Patent
Song et al.

(10) Patent No.: US 11,820,932 B2
(45) Date of Patent: Nov. 21, 2023

(54) POLYMERISABLE LIQUID CRYSTAL MATERIAL AND POLYMERISED LIQUID CRYSTAL FILM

(71) Applicant: Merck Patent GmbH, Darmstadt (DE)

(72) Inventors: Dong-Mee Song, Hwaseong (KR); Yong-Hyun Choi, Pyeongtaek (KR); Jae-Hyun Kang, Seoul (KR); Yong-Kuk Yun, Hwaseong (KR)

(73) Assignee: Merck Patent GmbH, Darmstadt (DE)

( * ) Notice: Subject to any disclaimer, the term of this patent is extended or adjusted under 35 U.S.C. 154(b) by 15 days.

(21) Appl. No.: 16/336,974

(22) PCT Filed: Sep. 25, 2017

(86) PCT No.: PCT/EP2017/074164
§ 371 (c)(1),
(2) Date: Mar. 27, 2019

(87) PCT Pub. No.: WO2018/060110
PCT Pub. Date: Apr. 5, 2018

(65) Prior Publication Data
US 2019/0218459 A1   Jul. 18, 2019

(30) Foreign Application Priority Data
Sep. 28, 2016 (EP) ..................... 16191146

(51) Int. Cl.
| | | |
|---|---|---|
| C09K 19/54 | (2006.01) | |
| C08F 222/26 | (2006.01) | |
| C09K 19/38 | (2006.01) | |
| C09K 19/04 | (2006.01) | |
| G02F 1/1337 | (2006.01) | |
| G02F 1/13363 | (2006.01) | |

(52) U.S. Cl.
CPC ............ *C09K 19/54* (2013.01); *C08F 222/26* (2013.01); *C09K 19/3857* (2013.01); *C08F 2800/20* (2013.01); *C09K 2019/0448* (2013.01); *G02F 1/13363* (2013.01); *G02F 1/133711* (2013.01); *G02F 1/133742* (2021.01)

(58) Field of Classification Search
CPC .................................................. C09K 19/54
See application file for complete search history.

(56) References Cited

U.S. PATENT DOCUMENTS

| | | | |
|---|---|---|---|
| 3,992,796 A | 11/1976 | Dorgnon et al. | |
| 7,476,423 B2 | 1/2009 | Hirai | |
| 8,992,796 B2* | 3/2015 | Hasebe | C09K 19/16 252/299.61 |
| 9,316,906 B2 | 4/2016 | Shin et al. | |
| 9,873,663 B2* | 1/2018 | Oh | C07C 251/66 |
| 10,539,872 B2 | 1/2020 | Tadokoro et al. | |
| 2008/0014374 A1* | 1/2008 | Hirai | C09K 19/3861 428/1.1 |
| 2012/0224245 A1* | 9/2012 | Adlem | C09K 19/406 252/299.63 |
| 2015/0146156 A1* | 5/2015 | Hirai | C09K 19/56 349/194 |
| 2017/0160636 A1* | 6/2017 | Tadokoro | G03F 7/031 |
| 2018/0030161 A1* | 2/2018 | Takishita | C09K 19/54 |

FOREIGN PATENT DOCUMENTS

| | | | |
|---|---|---|---|
| CN | 105652595 A | | 6/2016 |
| EP | 2845845 A1 | | 3/2015 |
| EP | 2399942 B1 | | 8/2017 |
| JP | 2008266550 A | | 11/2008 |
| JP | 2009286976 A | * | 12/2009 |
| JP | 5054456 B2 | | 10/2012 |
| JP | 2014137466 A | * | 7/2014 |
| KR | 20140144809 A | * | 12/2014 |

(Continued)

OTHER PUBLICATIONS

English translation of KR20140144809. (Year: 2014).*
English translation of JP2009286976. (Year: 2009).*
English translation of JP2014137466. (Year: 2014).*
Nie et al., J. Appl. Polym. Sci., vol. 123, 2012, pp. 725-731.
International Search Report PCT/EP2017/074164 dated Nov. 29, 2017 (pp. 1-3).
Office Action in corresponding ROC (Taiwan) Patent Application No. 106133052 dated Mar. 4, 2021 (pp. 1-7).
Notification of reasons for refusal in corresponding JP2019-537871 dated Oct. 5, 2021 (pp. 1-2).
Office Action in corresponding Korean Patent Appln. 2019-7011972 dated May 20, 2022 (pp. 1-15).

*Primary Examiner* — Cynthia H Kelly
*Assistant Examiner* — Anna Malloy
(74) *Attorney, Agent, or Firm* — MILLEN WHITE ZELANO AND BRANIGAN, PC; Harry B. Shubin

(57) ABSTRACT

A polymerisable LC material comprising at least one di- or multireactive mesogenic compound and at least one compound of formula CO-1,

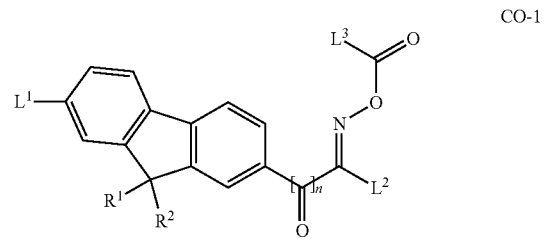

wherein $R^1$, $R^2$, $L^1$, $L^2$, $L^3$, and n have the meanings as given in claim 1. Furthermore, a method for preparation of the LC material, a polymer film with improved thermal durability obtainable from the corresponding polymerisable LC material, a method of preparation of such polymer film, and the use of such polymer film and said polymerisable LC material for optical, electro-optical, decorative or security devices.

17 Claims, No Drawings

(56) References Cited

FOREIGN PATENT DOCUMENTS

| KR | 20140144809 A | | 12/2014 | | |
|----|----|----|----|----|----|
| TW | 201616236 A | | 5/2016 | | |
| TW | 201632610 A | | 9/2016 | | |
| WO | 10095680 A1 | | 8/2010 | | |
| WO | 15108386 A1 | | 7/2015 | | |
| WO | WO-2015108386 A1 | * | 7/2015 | ........... | C07C 251/66 |
| WO | 16010036 A1 | | 1/2016 | | |
| WO | 16076652 A1 | | 5/2016 | | |
| WO | WO-2016143824 A1 | * | 9/2016 | ............... | G02B 5/22 |
| WO | 17059772 A1 | | 4/2017 | | |

* cited by examiner

POLYMERISABLE LIQUID CRYSTAL MATERIAL AND POLYMERISED LIQUID CRYSTAL FILM

FIELD OF INVENTION

The invention relates to a polymerisable LC material comprising at least one di- or multireactive mesogenic compound and at least one compound of formula CO-1,

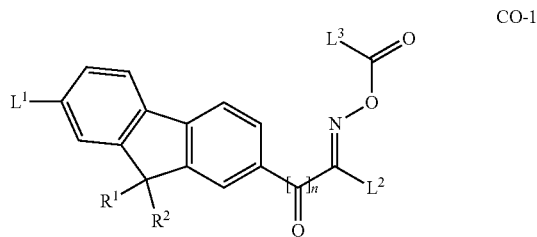

wherein
- $R^1$ and $R^2$ denotes H, alkyl, alkoxy or mono- oligo- or polyfluorinated alkyl or alkoxy, preferably alkyl,
- $L^1$ denotes H, alkyl, alkoxy, thioalkyl, alkylcarbonyl, alkoxycarbonyl, alkylcarbonyloxy or alkoxycarbonyloxy; halogen, CN, $NO_2$, OCN, SCN, or mono- oligo- or polyfluorinated alkyl or alkoxy atoms; or -($Sp^{31}$-$A^{31}$), preferably H, halogen, CN, or $NO_2$,
- $L^2$ to $L^3$ denotes H, alkyl, mono- oligo- or polyfluorinated alkyl, or -($Sp^{31}$-$A^{31}$), preferably H, alkyl, or -($Sp^{31}$-$A^{31}$),
- $Sp^{31}$ denotes a spacer group or a single bond, preferably a single bond or $C_{1-12}$ alkylene radical, more preferably a single bond or $C_{1-6}$ alkylene radical, most preferably a single bond or $C_{1-2}$ alkylene radical, and
- $A^{31}$ denotes an aryl, heteroaryl, (non-aromatic) alicyclic and heterocyclic group, optionally having one or more substituents, which are selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups, preferably phenyl, cyclohexyl, or cyclopentyl
- n denotes 0 or 1, preferably 1.

Furthermore, the present invention relates also to a method for its preparation, a polymer film with improved thermal durability obtainable from the corresponding polymerisable LC material, to a method of preparation of such polymer film, and to the use of such polymer film and said polymerisable LC material for optical, electro-optical, decorative or security devices.

BACKGROUND AND PRIOR ART

Polymerizable liquid crystal materials are known in prior art for the preparation of anisotropic polymer films with uniform orientation. These films are usually prepared by coating a thin layer of a polymerizable liquid crystal mixture onto a substrate, aligning the mixture into uniform orientation and polymerizing the mixture. The orientation of the film can be planar, i.e. where the liquid crystal molecules are oriented substantially parallel to the layer, homeotropic (rectangular or perpendicular to the layer) or tilted.

Such optical films are described, for example, in EP 0 940 707 B1, EP 0 888 565 B1 and GB 2 329 393 B1.

Polymerisable liquid crystal (LC) materials, while stable at room temperature, can degrade when subjected to increased temperatures. For example, when heated for a period of time the optical properties such as dispersion or retardance decreases and as such, the performance of the optical film degrades over time. This can be attributed, in particular, to a low degree of polymerisation and a corresponding high content of residual free radicals in the polymer, polymer shrinkage, and/or thermo-oxidative degradation.

A high degree of polymerisation can be i.a. influenced by the choice of the utilized photoinitiator. In this regard, Nie et al. describe in J. Appl. Polym. Sci. 2012, 123, 725-731; the synthesis and photopolymerisation kinetics of suitable oxime ester photoinitiators.

JP 5054456 B2 describes polymerisable liquid crystal (LC) materials comprising one or more direactive mesogenic compounds and the commercially available photoinitiators Oxe02 available from by Ciba and N-1919 (T) available from Adeka.

In particular, the desired properties of an optical retardation film, like e.g. uniform alignment of the mesogenic compounds, film structure, film adhesion, temperature stability and optical performance, are highly dependent from the composition of the polymerisable liquid crystal material especially concerning the ratio and choice of mono- and direactive mesogenic compounds.

For example, polymer shrinkage, which is a decrease in thickness of the optical film, reduces the retardance of the passing light in accordance to R=dΔn, wherein R is the retardance, d is the thickness of the birefringent film, Δn is the birefringence. Polymer shrinkage can e.g. be reduced by utilizing polymerisable compounds having more than one polymerizable group, e.g. di- or multireactive compounds, and therefore capable of forming a more crosslinked and more rigid polymer.

However, again, the desired properties of an optical retardation film are highly dependent from the composition of the polymerisable liquid crystal material. In this regard, one possible way to adjust the alignment profile in the direction perpendicular to the film plane is the appropriate selection of the ratio of monoreactive mesogenic compounds, i.e. compounds with one polymerizable group, and direactive mesogenic compounds, i.e. compounds with two polymerizable groups. In addition, low diacrylate content RM films are highly suitable for applications where good adhesion of the RM film to the substrate is important. However, as stated above, in low diacrylate content RM films often the optical retardation drops significantly especially due to polymer shrinkage.

Thermo-oxidative degradation is the breakdown of a polymer network catalysed by oxidation at high temperatures. As commonly known, antioxidant additives, or short antioxidants, can be used to reduce the thermo-oxidative degradation of polymers when subjected to increased temperatures. This is especially important when optical films are utilized for an in-cell application due to the high temperatures. In particular, the optical film has to endure when annealing the polyimide layer in the LC cell. In this regard, the documents WO 2009/86911 A1 and JP 5354238 B1 describe polymerisable liquid crystal (LC) materials comprising the commercially available antioxidant Irganox®1076.

All of the above-described materials have distinct disadvantages, such as, the thermal durability of the resulting polymer films is still not high enough, their transparency to VIS-light is limited, they require the utilization of further additives, or their application bandwidth is limited, due to the utilized LC material.

Therefore, there is still the need for new and preferably improved, polymerisable liquid crystal materials or mixtures, which do not exhibit the drawbacks of prior art materials or if so, do only exhibit them to a less extent.

Advantageously, such polymerisable LC material, should preferably be applicable for the preparation of different, uniform aligned polymer networks, such as polymer films or polymer network LC applications, and should, in particular at the same time,

- show a favourable adhesion to a substrate,
- be highly transparent to VIS-light,
- exhibit an reduced yellow colouration over time (yellowing) and
- show a favourable high temperature stability or durability, and in addition,
- the uniform aligned polymer films should be produced by compatible, commonly known methods for the mass production.

Other aims of the present invention are immediately evident to the person skilled in the art from the following detailed description.

Surprisingly, the inventors of the present invention have found that one or more, preferably all of the above requirements aims can be achieved, preferably at the same time, by using a polymerisable LC material according to claim 1.

SUMMARY OF THE INVENTION

Thus, the invention relates to a polymerisable LC material comprising at least one di- or multireactive mesogenic compound and at least one compound of formula CO-1.

Further, the invention also relates to a corresponding method of production for the polymerisable LC material.

The invention further relates to a polymer network or polymer film obtainable, preferably obtained, from the polymerisable LC material, as described above and below and to a method of production of a polymer film, as described above and below.

The invention further relates to a method of increasing the durability of a polymer film, obtainable, preferably obtained, from a polymerisable LC material as described above and below, by adding a compound of formula CO-1 to the LC material before polymerisation.

The invention further relates to the use of a polymer network or polymer film or polymerisable LC material, as described above and below, in optical, electrooptical, information storage, decorative and security applications, like liquid crystal displays, projection systems, polarisers, compensators, alignment layers, circular polarisers, colour filters, decorative images, liquid crystal pigments, reflective films with spatially varying reflection colours, multicolour images, non-forgeable documents like identity or credit cards or banknotes.

The invention further relates to a optical component or device, polariser, patterned retarder, compensator, alignment layer, circular polariser, colour filter, decorative image, liquid crystal lens, liquid crystal pigment, reflective film with spatially varying reflection colours, multicolour image for decorative or information storage, comprising at least one polymer network or polymer film or polymerisable LC material, as described above and below The invention further relates to a liquid crystal display comprising at least one polymer network or polymer film or polymerisable LC material or an optical component, as described above and below.

The invention further relates to authentication, verification or security marking, coloured or multicolour image for security use, non-forgeable object or document of value like an identity or credit card or a banknote, comprising a polymer network or polymer film or polymerisable LC material or a optical component as described above and below.

Terms and Definitions

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerisation" means the chemical process to form a polymer by bonding together multiple polymerisable groups or polymer precursors (polymerisable compounds) containing such polymerisable groups.

The terms "film" and "layer" include rigid or flexible, self-supporting or freestanding films with mechanical stability, as well as coatings or layers on a supporting substrate or between two substrates.

The term "liquid crystal" or "LC" relates to materials having liquid-crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid-crystalline phase (or mesophase) behaviour. The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerisable liquid-crystalline compounds, and liquid-crystalline polymers.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" means a polymerisable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerisable compounds, etc.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive or non-polymerisable" compounds.

The term "non-mesogenic compound or material" means a compound or material that does not contain a mesogenic group as defined above.

Visible light is electromagnetic radiation that has wavelength in a range from about 400 nm to about 740 nm. Ultraviolet (UV) light is electromagnetic radiation with a wavelength in a range from about 200 nm to about 450 nm.

The Irradiance ($E_e$) or radiation power is defined as the power of electromagnetic radiation ($d\theta$) per unit area (dA) incident on a surface:

$$E_e = d\theta/dA.$$

The radiant exposure or radiation dose ($H_e$), is as the irradiance or radiation power ($E_e$) per time (t):

$$H_e = E_e \cdot t.$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

The term "alignment" or "orientation" relates to alignment (orientational ordering) of anisotropic units of material such as small molecules or fragments of big molecules in a common direction named "alignment direction". In an aligned layer of liquid-crystalline or RM material the liquid-crystalline director coincides with the alignment direction so that the alignment direction corresponds to the direction of the anisotropy axis of the material.

The terms "uniform orientation" or "uniform alignment" of an liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

The term "homeotropic structure" or "homeotropic orientation" refers to a film wherein the optical axis is substantially perpendicular to the film plane.

The term "planar structure" or "planar orientation" refers to a film wherein the optical axis is substantially parallel to the film plane.

The term "negative (optical) dispersion" refers to a birefringent or liquid crystalline material or layer that displays reverse birefringence dispersion where the magnitude of the birefringence ($\Delta n$) increases with increasing wavelength ($\lambda$). I.e. $|\Delta n (450)| < |\Delta n (550)|$, or $\Delta n (450)/\Delta n (550) < 1$, where $\Delta n (450)$ and $\Delta n (550)$ are the birefringence of the material measured at wavelengths of 450 nm and 550 nm respectively. In contrast, positive (optical) dispersion" means a material or layer having $|\Delta n (450)| > |\Delta n (550)|$ or $\Delta n (450)/\Delta n (550) > 1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Since the optical retardation at a given wavelength is defined as the product of birefringence and layer thickness as described above [$R(\lambda) = \Delta n(\lambda) \cdot d$], the optical dispersion can be expressed either as the "birefringence dispersion" by the ratio $\Delta n(450)/\Delta n(550)$, or as "retardation dispersion" by the ratio $R(450)/R(550)$, wherein $R(450)$ and $R(550)$ are the retardation of the material measured at wavelengths of 450 nm and 550 nm respectively. Since the layer thickness d does not change with the wavelength, $R(450)/R(550)$ is equal to $\Delta n(450)/\Delta n(550)$. Thus, a material or layer with negative or reverse dispersion has $R(450)/R(550) < 1$ or $|R(450)| < |R(550)|$, and a material or layer with positive or normal dispersion has $R(450)/R(550) > 1$ or $|R(450)| > |R(550)|$.

In the present invention, unless stated otherwise "optical dispersion" means the retardation dispersion i.e. the ratio $R(450)/R(550)$.

The term "high dispersion" means that the absolute value of the dispersion shows a large deviation from 1, whereas the term "low dispersion" means that the absolute value of the dispersion shows a small deviation from 1. Thus "high negative dispersion" means that the dispersion value is significantly smaller than 1, and "low negative dispersion" means that the dispersion value is only slightly smaller than 1.

The retardation ($R(\lambda)$) of a material can be measured using a spectroscopic ellipsometer, for example the M2000 spectroscopic ellipsometer manufactured by J. A. Woollam Co., This instrument is capable of measuring the optical retardance in nanometres of a birefringent sample e.g. Quartz over a range of wavelengths typically, 370 nm to 2000 nm. From this data, it is possible to calculate the dispersion ($R(450)/R(550)$ or $\Delta n(450)/\Delta n(550)$) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, NE, USA). Unless stated otherwise, this method is used to determine the retardation of the materials, films and devices described in this invention.

The term "A plate" refers to an optical retarder utilizing a layer of uniaxially birefringent material with its extraordinary axis oriented parallel to the plane of the layer.

The term "C plate" refers to an optical retarder utilizing a layer of uniaxially birefringent material with its extraordinary axis oriented perpendicular to the plane of the layer.

In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate".

An A (or C) plate comprising a film of optically uniaxial birefringent material with negative birefringence, such as discotic anisotropic materials is also referred to as "negative A (or C) plate" or "−A (or C) plate" depending on the orientation of the discotic materials. A film made from a cholesteric calamitic material with a reflection band in the UV part of the spectrum also has the optics of a negative C plate.

The birefringence Δn is defined as follows $$\Delta n = n_e - n_o$$

wherein $n_e$ is the extraordinary refractive index and $n_o$ is the ordinary refractive index, and the average refractive index $n_{av.}$ is given by the following equation:

$$n_{av.} = ((2n_o^2 + n_e^2)/3)^{1/2}$$

The average refractive index $n_{av.}$ and the ordinary refractive index $n_o$ can be measured using an Abbe refractometer. Δn can then be calculated from the above equations.

Unless the context clearly indicates otherwise, as used herein plural forms of the terms herein are to be construed as including the singular form and vice versa.

All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm In case of doubt the definitions as given in C. Tschierske, G. Pelzl and S. Diele, Angew. Chem. 2004, 116, 6340-6368 shall apply.

Unless explicitly stated otherwise in the given generic formulae, the following terms have the following meanings:

"Carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms. Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

Above, $R^x$ preferably denotes H, halogen, a straight-chain, branched or cyclic alkyl chain having 1 to 25 C atoms, in which, in addition, one or more non-adjacent $CH_2$ may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, n-hexyl, 2-ethylhexyl, n-heptyl, n-octyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S, and Se.

Particular preference is given to mono-, bi-, or tricyclic aryl groups having 6 to 25 C atoms and mono-, bi- or tricyclic heteroaryl groups having 2 to 25 C atoms, which optionally contain fused rings and which are optionally substituted. Preference is furthermore given to 5-, 6-, or 7-membered aryl and heteroaryl groups, in which, in addition, one or more CH groups may be replaced by N, S, or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphth-imidazole, phenanthrimidazole, pyridimidazole, pyrazinimidazole, quinoxa-linimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S, and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi-, or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent CH$_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, (non-aromatic) alicyclic and heterocyclic groups optionally have one or more substituents, which are preferably selected from the group comprising silyl, sulfo, sulfonyl, formyl, amine, imine, nitrile, mercapto, nitro, halogen, C$_{1-12}$ alkyl, C$_{6-12}$ aryl, C$_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —OH, —CN, —NO$_2$, —NCO, —NCS, —OCN, —SCN, —C(=O)N(R$^x$)$_2$, —C(=O)Y$^x$, —C(=O)R$^x$, —C(=O)OR$^x$, —N(R$^x$)$_2$, in which R$^x$ has the above-mentioned meaning, and above Y$^x$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, R$^y$, —OR$^y$, —CO—R$^y$, —CO—O—R$^y$, —O—CO—R$^y$ or —O—CO—O—R$^y$, in which R$^y$ denotes H, a straight-chain, branched or cyclic alkyl chain having 1 to 12 C atoms.

In the formula shown above and below, a substituted phenylene ring

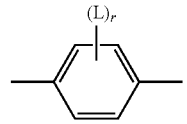

is preferably

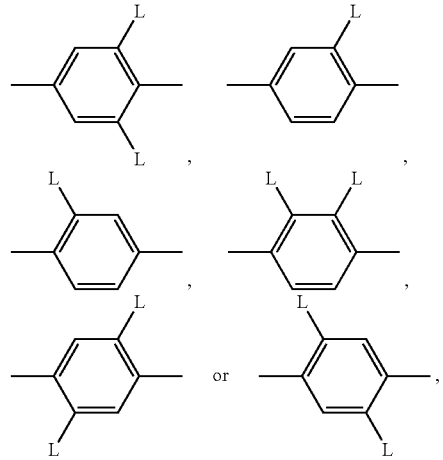

in which L has, on each occurrence identically or differently, one of the meanings given above and below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, most preferably F, Cl, CH$_3$, OCH$_3$, COCH$_3$ or OCF$_3$.

"Halogen" denotes F, Cl, Br or I, preferably F or Cl, more preferably F.

"Polymerisable groups" (P) are preferably selected from groups containing a C=C double bond or C≡C triple bond, and groups which are suitable for polymerisation with ring opening, such as, for example, oxetane or epoxide groups.

Preferably, polymerisable groups (P) are selected from the group consisting of CH$_2$=CW$^1$—COO—, CH$_2$=CW$^1$—CO—,

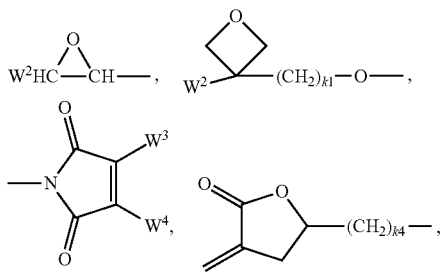

$CH_2=CW^2-(O)_{k3}-$, $CW^1=CH-CO-(O)_{k3}-$, $CW^1=CH-CO-NH-$, $CH_2=CW^1-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-$CH=CH-$, in which W$^1$ denotes H, F, Cl, CN, CF$_3$, phenyl or alkyl having 1 to 5 C atoms, in particular H, F, Cl or CH$_3$, W$^2$ denotes H or alkyl having 1 to 5 C atoms, in particular H, methyl, ethyl or n-propyl, W$^3$ and W$^4$ each, independently of one another, denote H, Cl or alkyl having 1 to 5 C atoms, Phe denotes 1,4-phenylene, which is optionally substituted by one or more radicals L as being defined above but being different from P-Sp, preferably preferred substituents L are F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl, and $k_1$, $k_2$ and $k_3$ each, independently of one another, denote 0 or 1, $k_3$ preferably denotes 1, and $k_4$ is an integer from 1 to 10.

Particularly preferred polymerizable groups P are $CH_2=CH-COO-$, $CH_2=C(CH_3)-COO-$, $CH_2=CF-COO-$, $CH_2=CH-$, $CH_2=CH-O-$, $(CH_2=CH)_2CH-OCO-$, $(CH_2=CH)_2CH-O-$

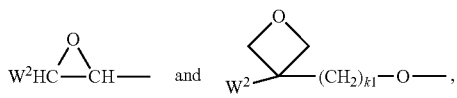

in which W$^2$ denotes H or alkyl having 1 to 5 C atoms, in particular H, methyl, ethyl or n-propyl, Further preferred polymerizable groups (P) are vinyloxy, acrylate, methacrylate, fluoroacrylate, chloroacrylate, oxetane and epoxide, most preferably acrylate or methacrylate, in particular acrylate.

Preferably, all multireactive polymerisable compounds and sub-formulae thereof contain instead of one or more radicals P-Sp-, one or more branched radicals containing two or more polymerisable groups P (multireactive polymerisable radicals).

Suitable radicals of this type, and polymerisable compounds containing them, are described, for example, in U.S. Pat. No. 7,060,200 B1 or US 2006/0172090 A1.

Particular preference is given to multireactive polymerisable radicals selected from the following formulae:

—X-alkyl-CHP$^x$—CH$_2$—CH$_2$P$^y$    I*a

—X-alkyl-C(CH$_2$P$^x$)(CH$_2$P$^y$)—CH$_2$P$^z$    I*b

—X-alkyl-CHP$^x$CHP$^y$—CH$_2$P$^z$    I*c

—X-alkyl-C(CH$_2$P$^x$)(CH$_2$P$^y$)—C$_{aa}$H$_{2aa+1}$    I*d

—X-alkyl-CHP$^x$—CH$_2$P$^y$    I*e

—X-alkyl-CHP$^x$P$^y$    I*f

—X-alkyl-CP$^x$P$^y$—C$_{aa}$H$_{2aa+1}$    I*g

—X-alkyl-C(CH$_2$P$^y$)(CH$_2$P$^{y'}$)—CH$_2$OCH$_2$—C(CH$_2$P$^x$)(CH$_2$P$^{y'}$)CH$_2$P$^z$    I*h —X-alkyl-CH((CH$_2$)$_{aa}$P$^x$)((CH$_2$)$_{bb}$P$^y$)    I*i —X-alkyl-CHP$^x$CHP$^y$—C$_{aa}$H$_{2aa+1}$    I*k in which alkyl denotes a single bond or straight-chain or branched alkylene having 1 to 12 C atoms, in which one or more non-adjacent CH$_2$ groups may each be replaced, independently of one another, by $-C(R^x)=C(R^x)-$, $-C≡C-$, $-N(R^x)-$, $-O-$, $-S-$, $-CO-$, $-CO-O-$, $-O-CO-$, $-O-CO-O-$ in such a way that O and/or S atoms are not linked directly to one another, and in which, in addition, one or more H atoms may be replaced by F, Cl or CN, where R$^x$ has one the above-mentioned meaning, $aa$ and $bb$ each, independently of one another, denote 0, 1, 2, 3, 4, 5 or 6, X has one of the meanings indicated for X', and P$^v$ to P$^z$ each, independently of one another, have one of the meanings indicated above for P.

Preferred spacer groups Sp are selected from the formula Sp'-X', so that the radical "P-Sp-" conforms to the formula "P-Sp'-X'-", where Sp' denotes alkylene having 1 to 20, preferably 1 to 12 C atoms, which is optionally mono- or polysubstituted by F, Cl, Br, I or CN and in which, in addition, one or more non-adjacent CH$_2$ groups may each be replaced, independently of one another, by $-O-$, $-S-$, $-NH-$, $-NR^{xx}-$, $-SiR^{xx}R^{yy}-$, $-CO-$, $-COO-$, $-OCO-$, $-OCO-O-$, $-S-CO-$, $-CO-S-$, $-NR^{xx}-CO-O-$, $-O-CO-NR^{xx}-$, $-NR^{xx}-CO-NR^{yy}-$, $-CH=CH-$ or $-C≡C-$ in such a way that O and/or S atoms are not linked directly to one another, X' denotes $-O-$, $-S-$, $-CO-$, $-COO-$, $-OCO-$, $-O-COO-$, $-CO-NR^{xx}$, $-NR^{xx}-CO-$, $-NR^{xx}-CO-NR^{yy}-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, $-CH=N-$, $-N=CH-$, $-N=N-$, $-CH=CR^{xx}-$, $-CY^{xx}=CY^{xx}-$, $-C≡C-$, $-CH=CH-COO-$, $-OCO-CH=CH-$ or a single bond, R$^{xx}$ and R$^{yy}$ each, independently of one another, denote H or alkyl having 1 to 12 C atoms, and Y$^{xx}$ and Y$^{yy}$ each, independently of one another, denote H, F, Cl or CN.

X' is preferably $-O-$, $-S-$ $-CO-$, $-COO-$, $-OCO-$, $-O-COO-$, $-CO-NR^{xx}-$, $-NR^{xx}-CO-$, $-NR^{xx}-CO-NR^{yy}-$ or a single bond.

Typical spacer groups Sp' are, for example, $-(CH_2)_{p1}-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^{xx}R^{yy}-O)_{p1}-$, in which p1 is an integer from 1 to 12, q1 is an integer from 1 to 3, and R$^{xx}$ and R$^{yy}$ have the above-mentioned meanings.

Particularly preferred groups —X'-Sp'- are —(CH$_2$)$_{p1}$—, —O—(CH$_2$)$_{p1}$—, —OCO—(CH$_2$)$_{p1}$—, —OCOO—(CH$_2$)$_{p1}$—, in which p1 is an integer from 1 to 12.

Particularly preferred groups Sp' are, for example, in each case straight-chain, methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the present invention,

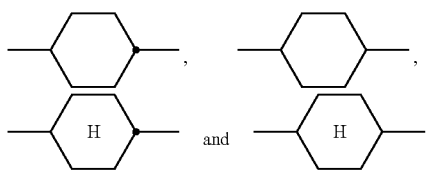

denote trans-1,4-cyclohexylene,

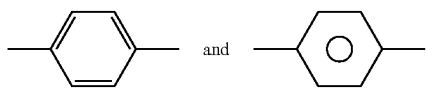

denote 1,4-phenylene.

For the present invention the groups —COO— or —CO$_2$— denote an ester group of formula

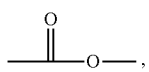

and the groups —OCO—, —O$_2$C— or —OOC— denote an ester group of formula

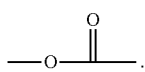

A "polymer network" is a network in which all polymer chains are interconnected to form a single macroscopic entity by many crosslinks.

The polymer network can occur in the following types:
A graft polymer molecule is a branched polymer molecule in which one or more the side chains are different, structurally or configurationally, from the main chain.
A star polymer molecule is a branched polymer molecule in which a single branch point gives rise to multiple linear chains or arms. If the arms are identical, the star polymer molecule is said to be regular. If adjacent arms are composed of different repeating subunits, the star polymer molecule is said to be variegated.
A comb polymer molecule consists of a main chain with two or more three-way branch points and linear side chains. If the arms are identical the comb polymer molecule is said to be regular.
A brush polymer molecule consists of a main chain with linear, unbranched side chains and where one or more of the branch points has four-way functionality or larger.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

All concentrations are quoted in percent by weight and relate to the respective mixture as a whole, all temperatures are quoted in degrees Celsius and all temperature differences are quoted in differential degrees.

DETAILED DESCRIPTION

Preferred oxime ester photoinitiators of formula CO-1 are selected from the group of compounds of the following formulae

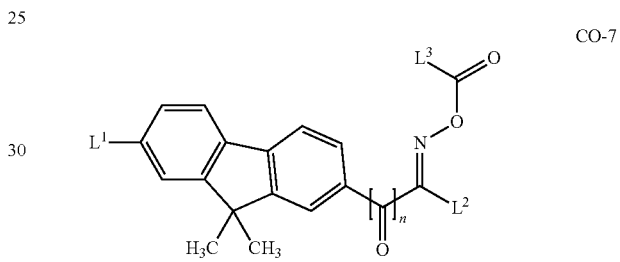

CO-7

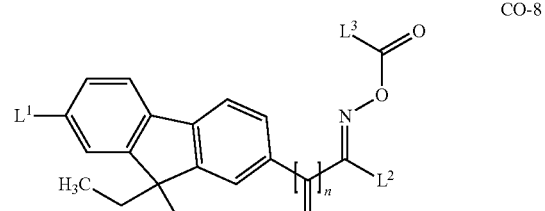

CO-8

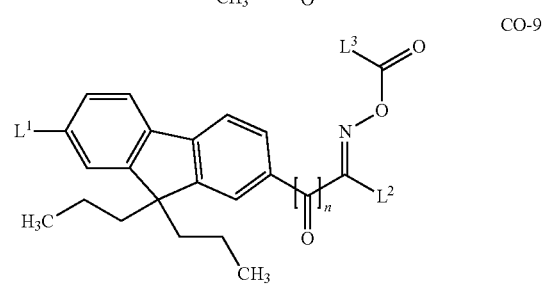

CO-9

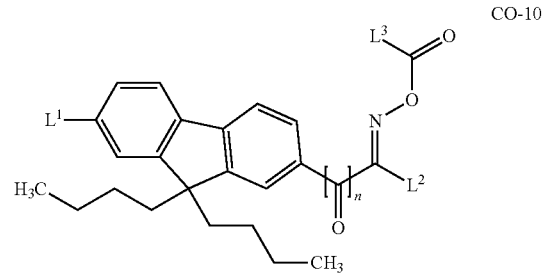

CO-10 wherein L$^1$ denotes H, Br, CN, or NO$_2$; L$^2$, L$^3$ and n have one of the meanings as given in formula CO-1.

Especially preferred oxime ester photoinitiators selected from the following formulae,

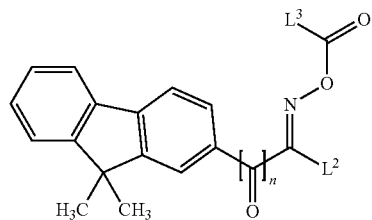
CO-11

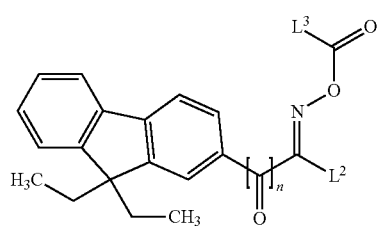
CO-12

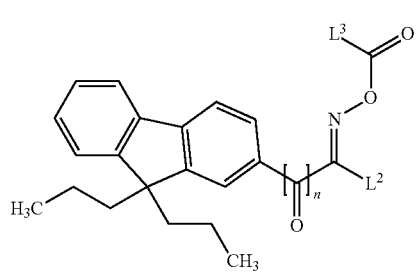
CO-13

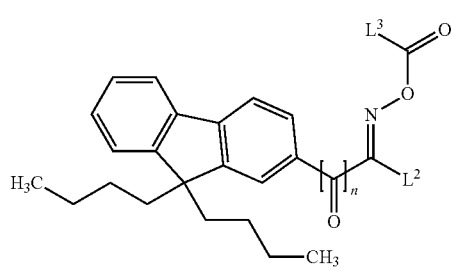
CO-14 wherein $L^2$ and $L^3$ and n have one of the meanings as given above under formula CO-1.

In particular preferred are oxime ester photoinitiators selected from the following formula,

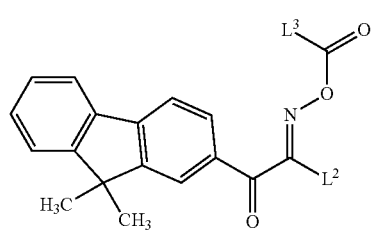
CO-15

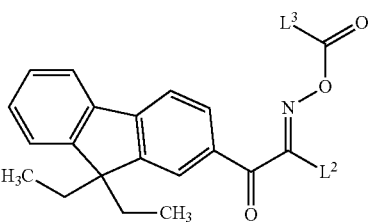
CO-16

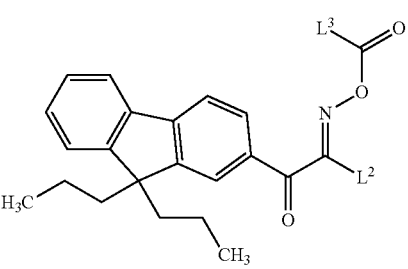
CO-17

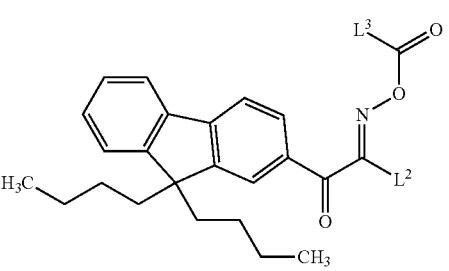
CO-18 wherein $L^2$ and $L^3$ have one of the meanings as given above under formula CO-1.

Further preferred are oxime ester photoinitiators selected from the following formula CO-19 to CO-22,

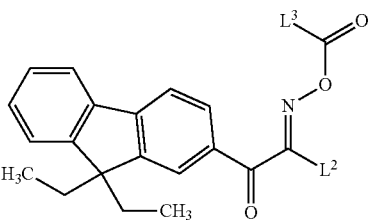
CO-1

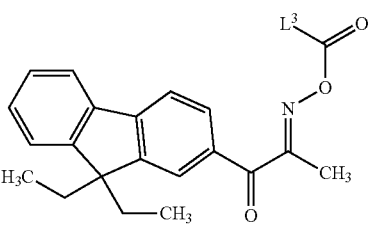
CO-2

CO-3

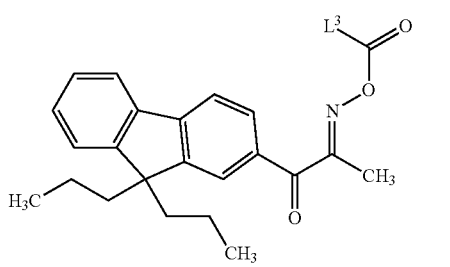

CO-4

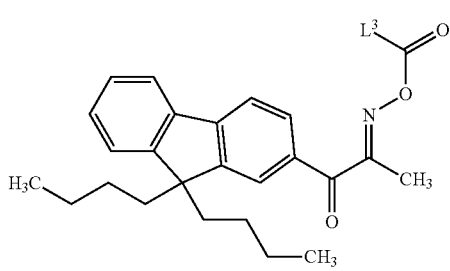

wherein $L^3$ has one of the meanings as given above under formula CO-1 and preferably denotes alkyl or 1,4-phenyl.

The compounds of the formulae CO—1 and sub-formulae thereof can be pre-pared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. Preferably, the compounds of formula CO—1 and sub-formulae thereof can be pre-pared analogously to the processes disclosed in WO2016/076652 A1, WO 2015/108386 A1 or EP 2 845 845 A1.

Preferably the minimum amount of oxime ester photoinitiators of formula CO-1 in the polymerisable LC material as a whole is more than 1%, more preferably more than 2%, even more preferably more than 3%, and most preferably more than 4% of the total mixture.

Preferably, the maximum amount of oxime ester photoinitiators of formula CO-1, is preferably less than 10%, very preferably less than 8%, in particular less than 6% by weight of the whole polymerisable LC material.

Preferably, at least one di- or multireactive mesogenic compound is selected of formula DRM $P^1$-$Sp^1$-MG-$Sp^2$-$P^2$   RM wherein $P^1$ and $P^2$ independently of each other denote a polymerisable group, $Sp^1$ and $Sp^2$ independently of each other are a spacer group or a single bond, and MG is a rod-shaped mesogenic group, which is preferably selected of formula MG -$(A^1$-$Z^1)_n$-$A^2$-   MG wherein $A^1$ and $A^2$ denote, in case of multiple occurrence independently of one another, an aromatic or alicyclic group, which optionally contains one or more heteroatoms selected from N, O and S, and is optionally mono- or polysubstituted by $L^1$, $L^1$ is P-Sp-, F, Cl, Br, I, —CN, —$NO_2$, —NCO, —NCS, —OCN, —SCN, —C(=O)$NR^{00}R^{000}$, —C(=O)$OR^{00}$, —C(=O)$R^{00}$, —$NR^{00}R^{00}$, —OH, —$SF_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, $R^{00}$ and $R^{000}$ independently of each other denote H or alkyl with 1 to 12 C-atoms, $Z^1$ denotes, in case of multiple occurrence independently of one another, —O—, —S—, —CO—, —COO—, —OCO—, —S—CO—, —CO—S—, —O—COO—, —CO—$NR^{00}$—, —$NR^{00}$—CO—, —$NR^{00}$—CO—$NR^{000}$, —$NR^{00}$—CO—O—, —O—CO—$NR^{00}$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_{n1}$, —$CF_2CH_2$—, —$CH_2CF_2$—, —$CF_2CF_2$—, —CH=N—, —N=CH—, —N=N—, —CH=$CR^{00}$—, —$CY^1$=$CY^2$—, —C≡C—, —CH=CH—COO—, —OCO—CH=CH— or a single bond, $Y^1$ and $Y^2$ independently of each other denote H, F, Cl or CN, n is 1, 2, 3 or 4, preferably 1 or 2, most preferably 2, n1 is an integer from 1 to 10, preferably 1, 2, 3 or 4.

Preferred groups $A^1$ and $A^2$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups L as defined above.

Particular preferred groups $A^1$ and $A^2$ are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent $CH_2$ groups are optionally replaced by O and/or S, wherein these groups are unsubstituted or substituted by 1, 2, 3 or 4 groups L as defined above.

Particular preferred groups $Z^1$ are in each occurrence independently from another preferably selected from —COO—, —OCO—, —$CH_2CH_2$—, —$CF_2O$—, —$OCF_2$—, —C≡C—, —CH=CH—, —OCO—CH=CH—, —CH=CH—COO—, or a single bond, Very preferred direactive mesogenic compounds of formula DRM are selected from the following formulae:

DRMa1

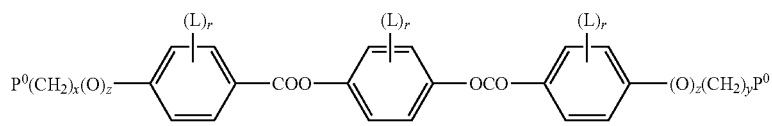

-continued

DRMa2
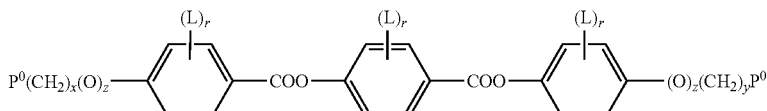

DRMa3
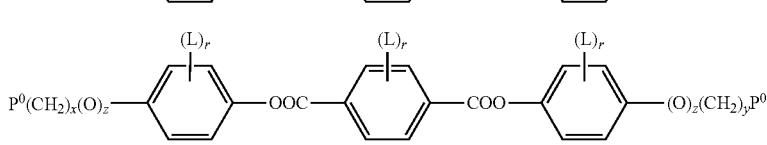

DRMa4
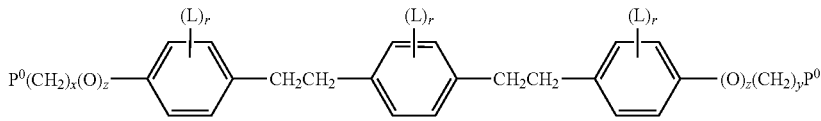

DRMa5
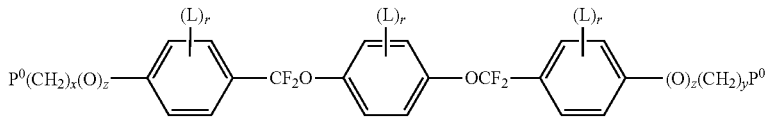

DRMa6
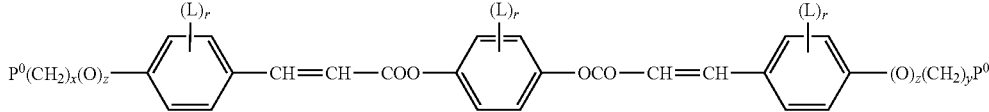

DRMa7
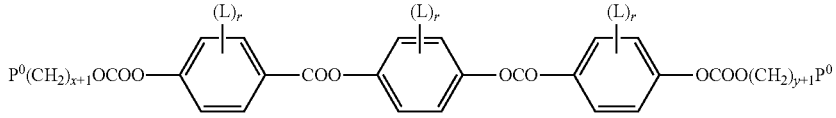

DRMb

DRMc
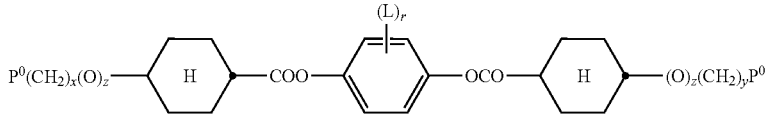

DRMd
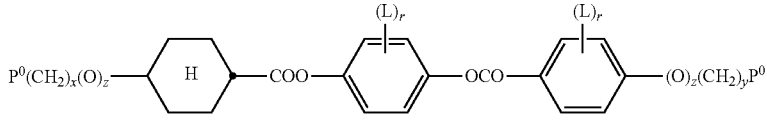

DRMe
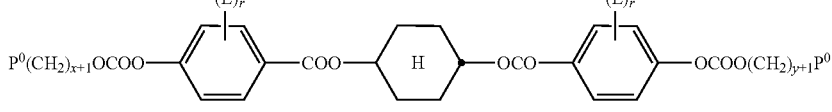

wherein
$P^0$ is, in case of multiple occurrence independently of one another, a polymerisable group, preferably an acryl, methacryl, oxetane, epoxy, vinyl, heptadiene, vinyloxy, propenyl ether or styrene group,
L has on each occurrence identically or differently one of the meanings given for $L^1$ in formula DRM, and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
x and y are independently of each other 0 or identical or different integers from 1 to 12,
z is each and independently, 0 or 1, with z being 0 if the adjacent x or y is 0.

Especially preferred are compounds of formula DRMa1, DRMa2 and DRMa3, in particular those of formula DRMa1.

Preferably, the polymerisable LC material additionally comprises at least one monoreactive mesogenic compound, which is preferably selected from formula MRM, $P^1$-$Sp^1$-MG-R      MRM wherein $P^1$, $Sp^1$ and MG have the meanings given in formula DRM, R F, Cl, Br, I, —CN, —NO$_2$, —NCO, —NCS, —OCN, —SCN, —C(=O)NR$^x$R$^y$, —C(=O)X, —C(=O)OR$^x$, —C(=O)R$^y$, —NR$^x$R$^y$, —OH, —SF$_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, preferably F or Cl, and R$^x$ and R$^y$ are independently of each other H or alkyl with 1 to 12 C-atoms.

Preferably, the monoreactive mesogenic compounds of formula MRM are selected from the following formulae.

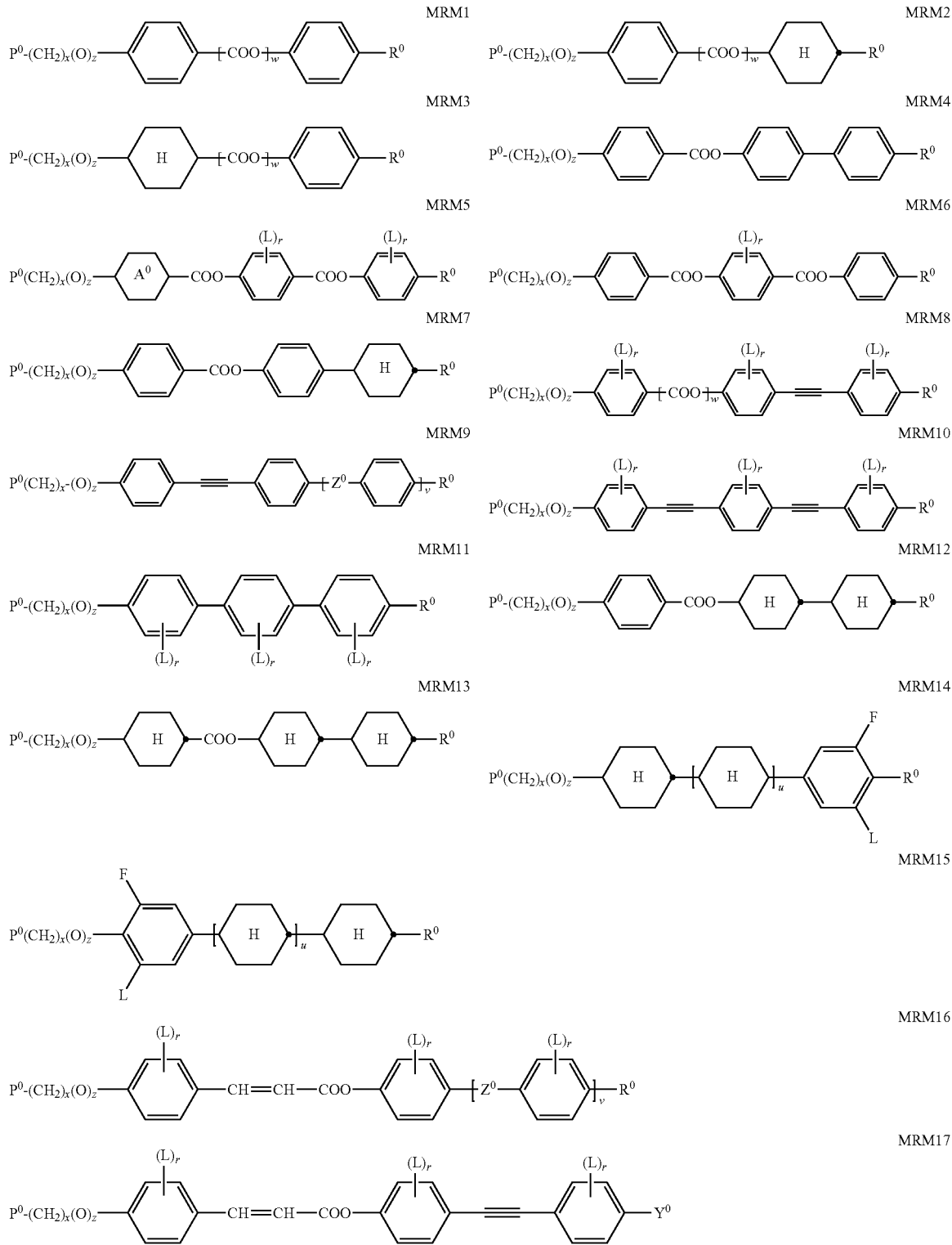

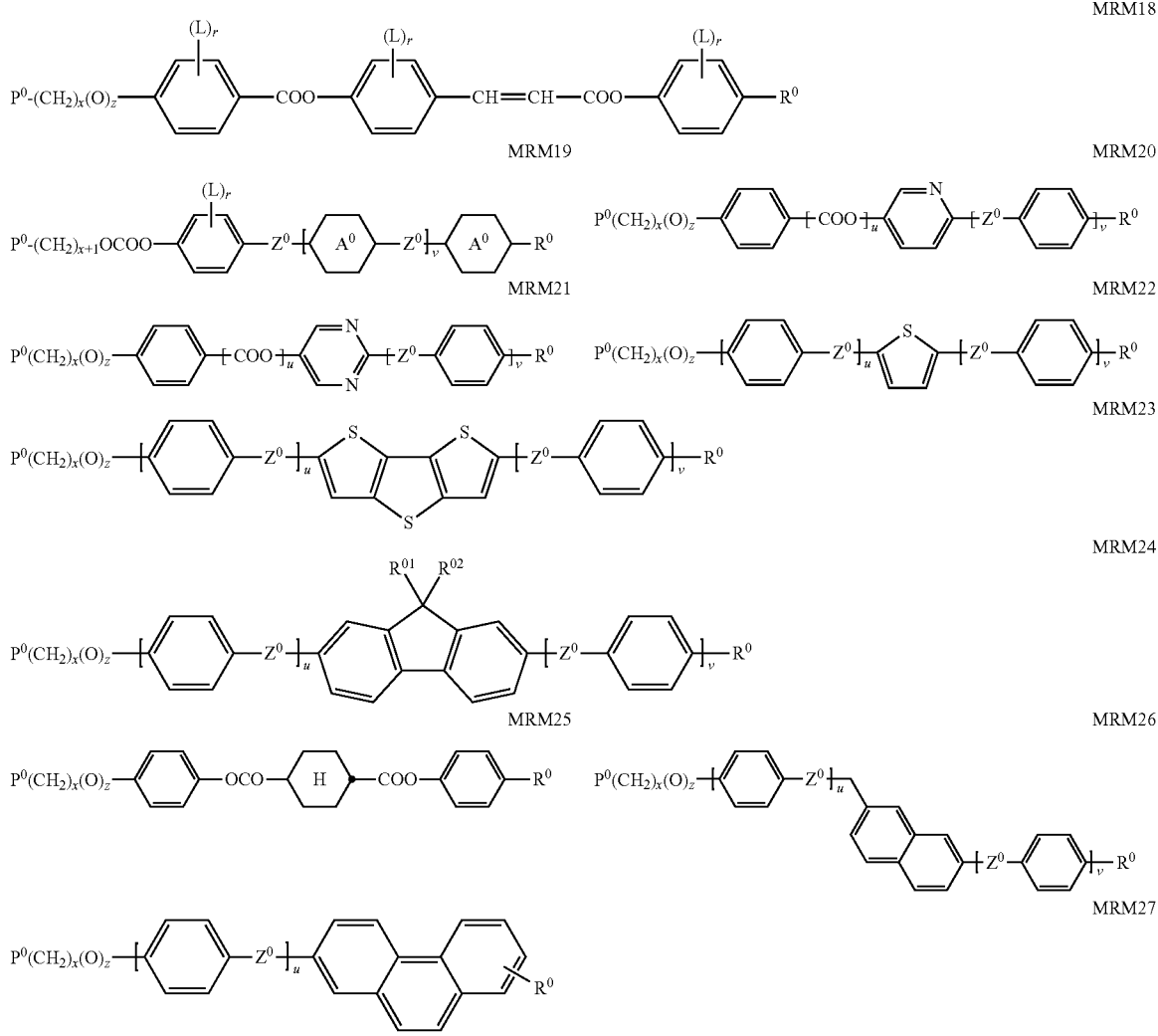

wherein P⁰, L, r, x, y and z are as defined in formula DRMa-1 to formula DRMe,
- R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms or denotes Y⁰,
- Y⁰ is F, Cl, CN, $NO_2$, $OCH_3$, OCN, SCN, $SF_5$, or mono- oligo- or polyfluorinated alkyl or alkoxy with 1 to 4 C atoms,
- Z⁰ is —COO—, —OCO—, —$CH_2CH_2$—, —$CF_2O$—, —$OCF_2$—, —CH=CH—, —OCO—CH=CH—, —CH=CH—COO—, or a single bond,
- A⁰ is, in case of multiple occurrence independently of one another, 1,4-phenylene that is unsubstituted or substituted with 1, 2, 3 or 4 groups L, or trans-1,4-cyclohexylene,
- u and v are independently of each other 0, 1 or 2,
- w is 0 or 1, and wherein the benzene and naphthalene rings can additionally be substituted with one or more identical or different groups L.

Further preferred are compounds of formula MRM1, MRM2, MRM3, MRM4, MRM5, MRM6, MRM7, MRM9 and MRM10, especially those of formula MRM1, MRM4, MRM6, and MRM7, and in particular those of formulae MRM1 and MRM7.

The compounds of the formulae DRM, MRM, and sub-formulae thereof can be pre-pared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

The proportion of said mono-, di- or multireactive liquid-crystalline compounds in a polymerisable liquid-crystalline material according to the present invention as a whole, is preferably in the range from 30 to 99.9% by weight, more preferably in the range from 40 to 99.9% by weight and even more preferably in the range from 50 to 99.9% by weight.

In a preferred embodiment, the proportion of the di- or multireactive polymerisable mesogenic compounds in a polymerisable liquid-crystalline material according to the present invention as a whole, is preferably in the range from 5 to 99% by weight, more preferably in the range from 10 to 97% by weight and even more preferably in the range from 15 to 95% by weight.

In another preferred embodiment, the proportion of the monoreactive polymerisable mesogenic compounds in a polymerisable liquid-crystalline material according to the present invention as a whole, is, if present, preferably in the range from 5 to 80% by weight, more preferably in the range from 10 to 75% by weight and even more preferably in the range from 15 to 70% by weight.

In another preferred embodiment, the proportion of the multireactive polymerizable mesogenic compounds in a polymerisable liquid-crystalline material according to the present invention as a whole is, if present, preferably in the range from 1 to 30% by weight, more preferably in the range from 2 to 20% by weight and even more preferably in the range from 3 to 10% by weight.

In another preferred embodiment the polymerisable LC material does not contain polymerizable mesogenic compounds having more than two polymerisable groups.

In another preferred embodiment the polymerisable LC material does not contain polymerizable mesogenic compounds having less than two polymerisable groups.

In another preferred embodiment the polymerisable LC material is an achiral material, i.e. it does not contain any chiral polymerizable mesogenic compounds or other chiral compounds.

In a further preferred embodiment, the polymerisable LC material comprises at least one monoreactive mesogenic compound, preferably selected from formulae MRM-1, at least one direactive mesogenic compound, preferably selected from formula DRMa-1, and at least one compound of formula CO—1.

In a further preferred embodiment, the polymerisable LC material comprises at least one monoreactive mesogenic compound, preferably selected from formula MRM-7, at least one direactive mesogenic compound, preferably selected from formula DRMa-1, and at least one compound of formula CO—1.

In a further preferred embodiment, the polymerisable LC material comprises at least two monoreactive mesogenic compound, preferably selected from compounds of formulae MRM-1 and/or MRM-7, at least one direactive mesogenic compound, preferably selected from formula DRMa-1, and at least one compound of formula CO—1.

In a further preferred embodiment, the polymerisable LC material comprises at least two monoreactive mesogenic compounds, preferably selected from compounds of formulae MRM-1 and/or MRM-7, at least two direactive mesogenic compounds, preferably selected from compounds of formula DRMa-1, and at least one compound of formula CO—1.

In a further preferred embodiment, the polymerisable LC material comprises at least two direactive mesogenic compounds, preferably selected from compounds of formula DRMa-1, and at least one compound of formula CO—1.

In a further preferred embodiment, especially for negative optical dispersion applications, the polymerisable LC material as described above comprises additionally one or more compounds of formula ND, $$R^1-(A^1-Z^1)_m-U^1-(Z^2-A^2)_n-R^2$$
$$|$$
$$(B)_q$$
$$|$$
$$R^3-(A^3-Z^3)_o-U^2-(Z^4-A^4)_p-R^4$$

ND wherein
$U^{1,2}$ are independently of each other selected from

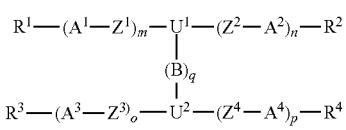
and

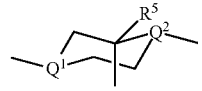

including their mirror images, wherein the rings $U^1$ and $U^2$ are each bonded to the group —(B)$_q$— via the axial bond, and one or two non-adjacent CH$_2$ groups in these rings are optionally replaced by O and/or S, and the rings $U^1$ and $U^2$ are optionally substituted by one or more groups L, $Q^{1,2}$ are independently of each other CH or SiH,
$Q^3$ is C or Si,
B is in each occurrence independently of one another —C≡C—, —CY$^1$=CY$^2$— or an optionally substituted aromatic or heteroaromatic group,
$Y^{1,2}$ are independently of each other H, F, Cl, CN or R$^0$
q is an integer from 1 to 10, preferably 1, 2, 3, 4, 5, 6 or 7,
$A^{1-4}$ are independently of each other selected from non-aromatic, aromatic or heteroaromatic carbocyclic or heterocyclic groups, which are optionally substituted by one or more groups R$^5$, and wherein each of -(A$^1$-Z$^1$)$_m$—U$^1$—(Z$^2$-A$^2$)$_n$- and -(A$^3$-Z$^3$)$_o$—U$^2$—(Z$^4$-A$^4$)$_p$- does not contain more aromatic groups than non-aromatic groups and preferably does not contain more than one aromatic group,
$Z^{1-4}$ are independently of each other —O—, —S—, —CO—, —COO—, —OCO—, —O—COO—, —CO—NR$^0$—, —NR$^0$—CO—, —NR$^0$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond,
$R^0$ and $R^{00}$ are independently of each other H or alkyl with 1 to 12 C-atoms,
m and n are independently of each other 0, 1, 2, 3 or 4, and p are independently of each other 0, 1, 2, 3 or 4,
$R^{1-5}$ are independently of each other identical or different groups selected from H, halogen, —CN, —NC, —NCO, —NCS, —OCN, —SCN, —C(=O)NR$^0$R$^{00}$, —C(=O)X$^0$, —C(=O)R$^0$, —NH$_2$, —NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-,
P is a polymerisable group,
Sp is a spacer group or a single bond.

Preferably, the subgroups forming the bridging group B in formula ND are preferably selected from groups having a bonding angle of 120° or more, preferably in the range of 180°. Very preferred are —C≡C— groups or divalent aromatic groups connected to their adjacent groups in para-position, like e.g. 1,4-phenylene, naphthalene-2,6-diyl, indane-2,6-diyl or thieno[3,2-b]thiophene-2,5-diyl.

Further possible subgroups include —CH=CH—, —CY$^1$=CY$^2$—, —CH=N—, —N=CH—, —N=N— and —CH=CR$^0$— wherein Y$^1$, Y$^2$, R$^0$ have the meanings given above.

Preferably the bridging group, or —(B)$_q$— in formula ND, comprises one or more groups selected from the group consisting of —C≡C—, optionally substituted 1,4-phenylene and optionally substituted 9H-fluorene-2,7-diyl. The subgroups, or B in formula ND, are preferably selected from the group consisting of —C≡C—, optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the bridging group, or —(B)$_q$— in formula ND, are selected from —C≡C—, —C≡C—C≡C—, —C≡C—C≡C—C≡C—, —C≡C—C≡C—C≡C—C≡C—,

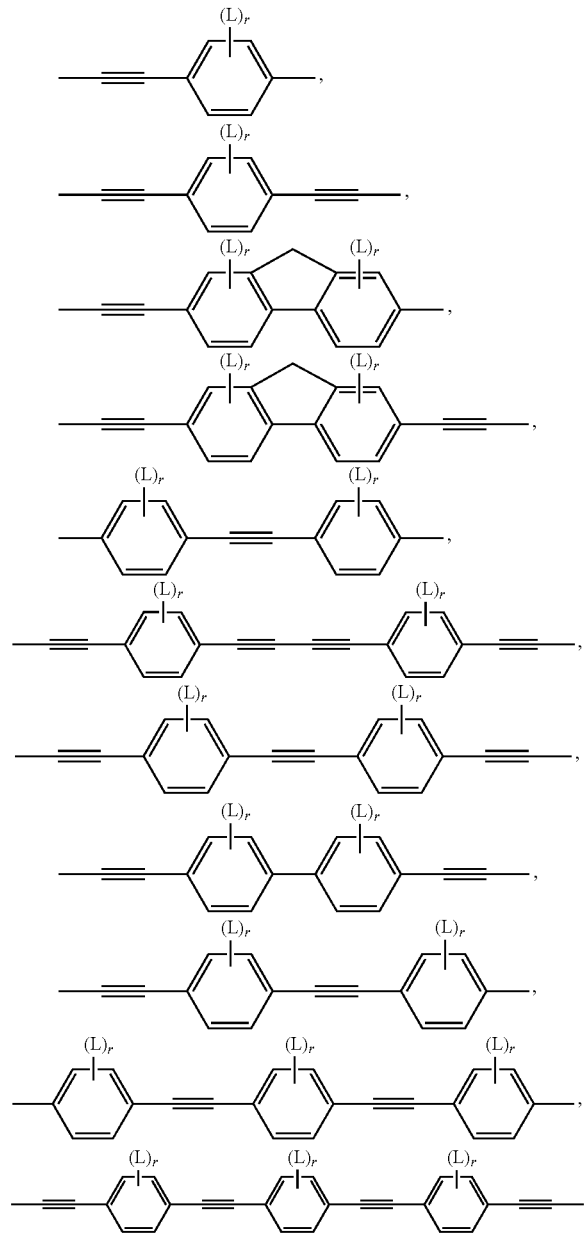

wherein r is 0, 1, 2, 3 or 4 and L has the meaning as described below.

Preferably, the non-aromatic rings of the mesogenic groups where the bridging group is attached, like $U^1$ and $U^2$ in formula ND, are preferably selected from

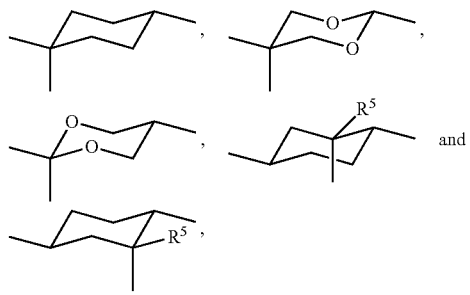

wherein $R^5$ is as defined in formula ND.

Preferably, the aromatic groups $A^{1-4}$ in formula ND, may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and that are optionally substituted.

Preferably, the non-aromatic carbocyclic and heterocyclic rings $A^{1-4}$ in the compounds of formula ND, include those which are saturated (also referred to as "fully saturated"), i.e. they do only contain C-atoms or hetero atoms connected by single bonds, and those which are unsaturated (also referred to as "partially saturated"), i.e. they also comprise C-atoms or hetero atoms connected by double bonds. The non-aromatic rings may also comprise one or more hetero atoms, preferably selected from Si, O, N and S.

Preferably the non-aromatic and aromatic rings, or $A^{1-4}$ in formula ND, are selected from trans-1,4-cyclohexylene and 1,4-phenylene that is optionally substituted with one or more groups L.

Very preferred are compounds of formula ND, wherein m and p are 1 and n and o are 1 or 2. Further preferred are compounds of formula ND, wherein m and p are 1 or 2 and n and o are 0. Further preferred are compounds wherein m, n, o and p are 2.

In the compounds of formula ND, the linkage groups connecting the aromatic and non-aromatic cyclic groups in the mesogenic groups, or $Z^{1-4}$, are preferably selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, very preferably from —COO—, —OCO— and a single bond.

Preferably, in the compounds of formula ND, the substituents on the rings, such as L, are preferably selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein R$^0$ and R$^{00}$ are as defined in formula ND and X is halogen.

Preferably, the compounds of formula ND comprise one or more terminal groups, like $R^{1-4}$, or substituents, like $R^5$, that are substituted by two or more polymerisable groups P or P-Sp- (multifunctional polymerisable groups). Suitable multifunctional polymerisable groups of this type are disclosed for example in U.S. Pat. No. 7,060,200 B1 or US 2006/0172090 A1.

Very preferred compounds of formula ND are those of the following sub formulae:

NDa
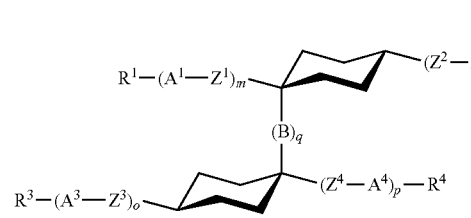

NDb
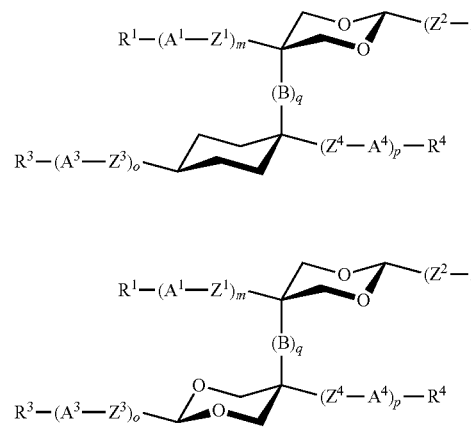

NDc

NDd
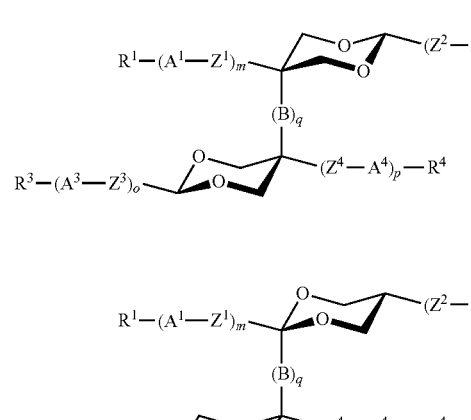

NDe
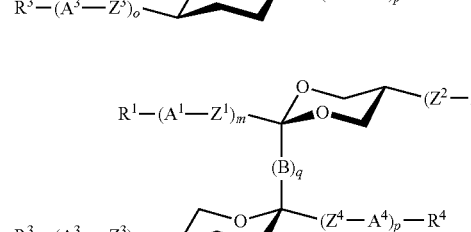

NDf
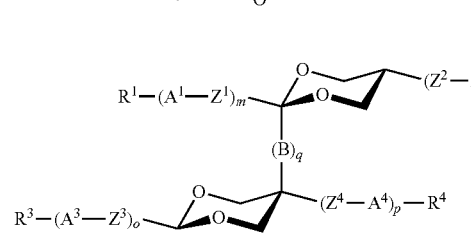

-continued

NDg
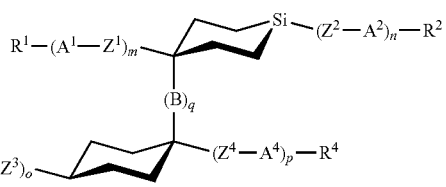

NDh
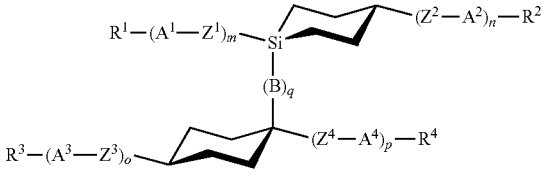

NDi
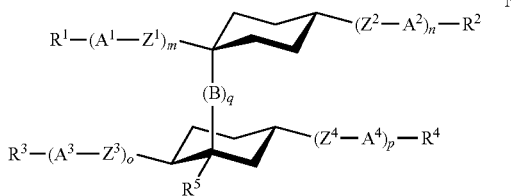

NDk
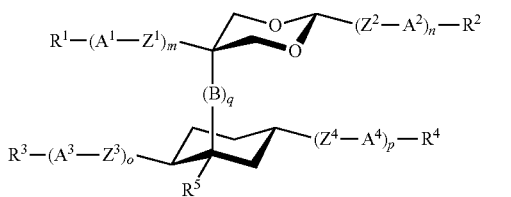

NDm
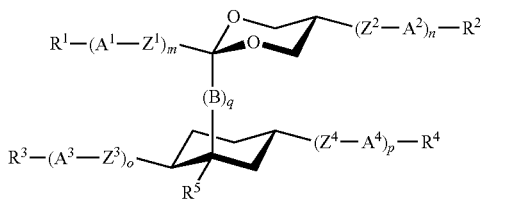

NDn
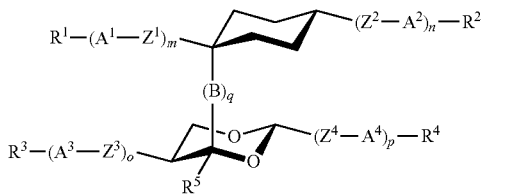

NDo
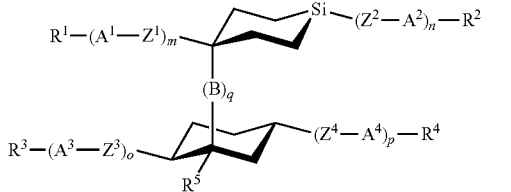

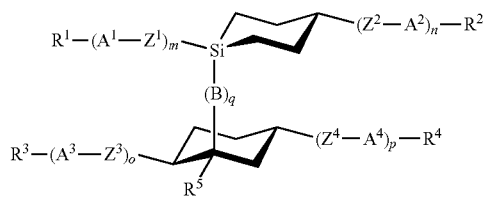 NDp
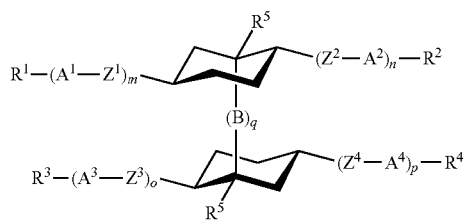 NDq
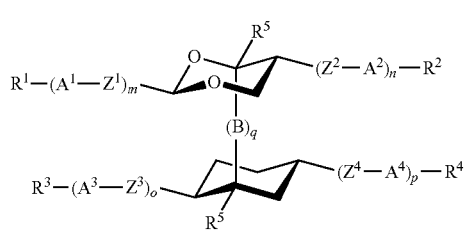 NDr
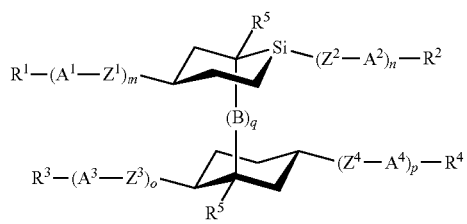 NDs
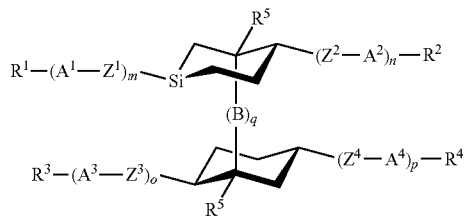 NDt
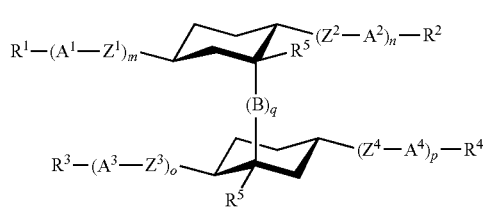 NDu
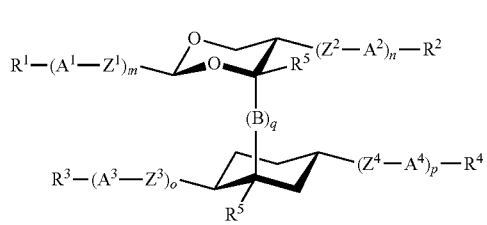 NDv
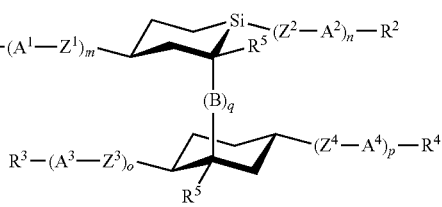 NDw
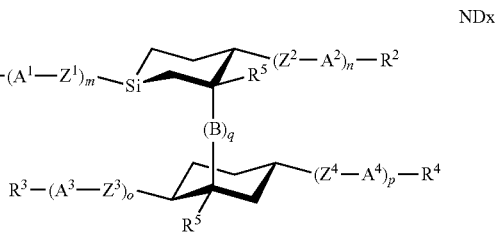 NDx
wherein $R^{1-5}$, $A^{1-4}$, $Z^{1-4}$, B, m, n, o, p and q have one the meanings given above.
Especially preferred are compounds of the following sub formulae:
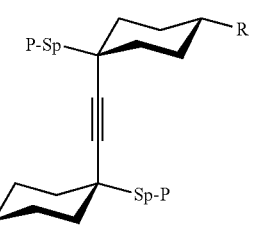 ND1
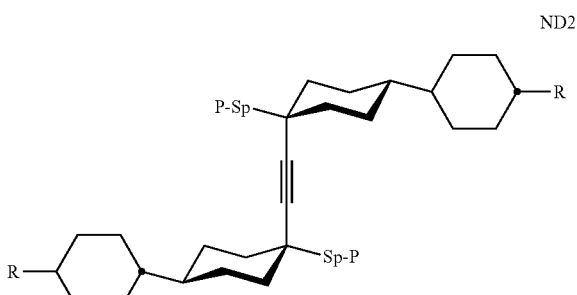 ND2
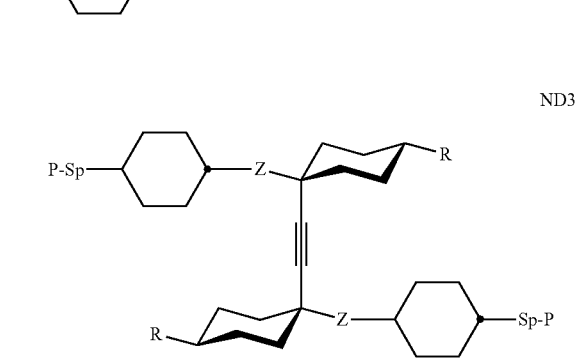 ND3

ND4
ND5
ND6
ND7
ND8
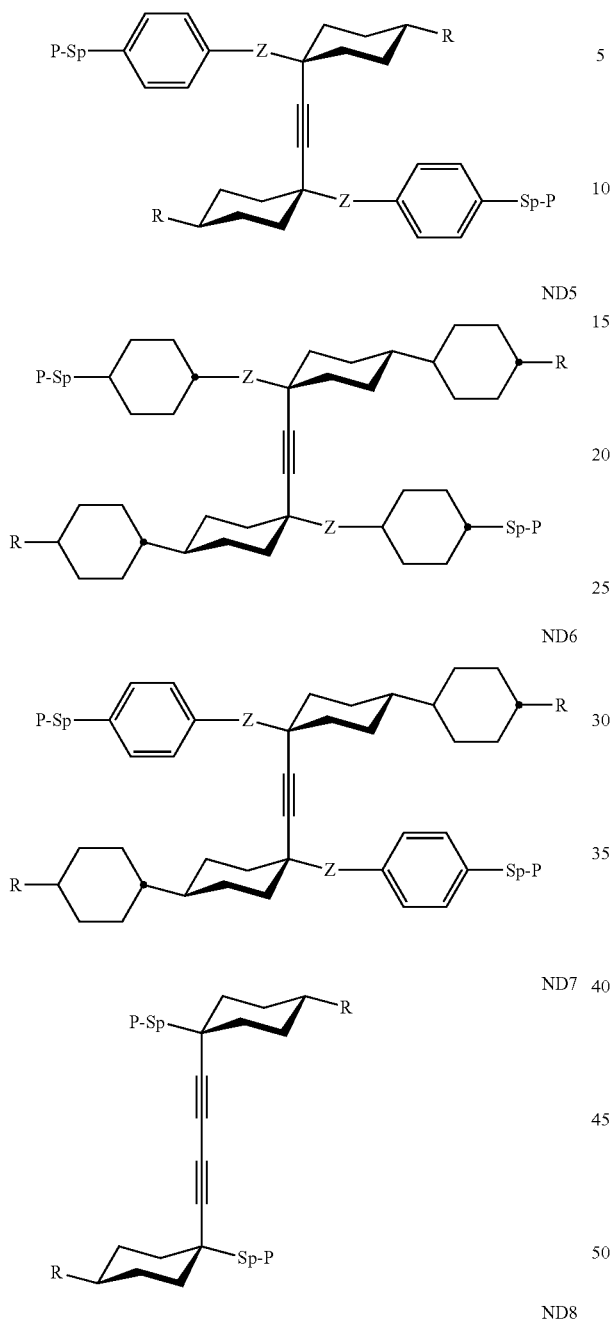
ND9
ND10
ND11
ND12
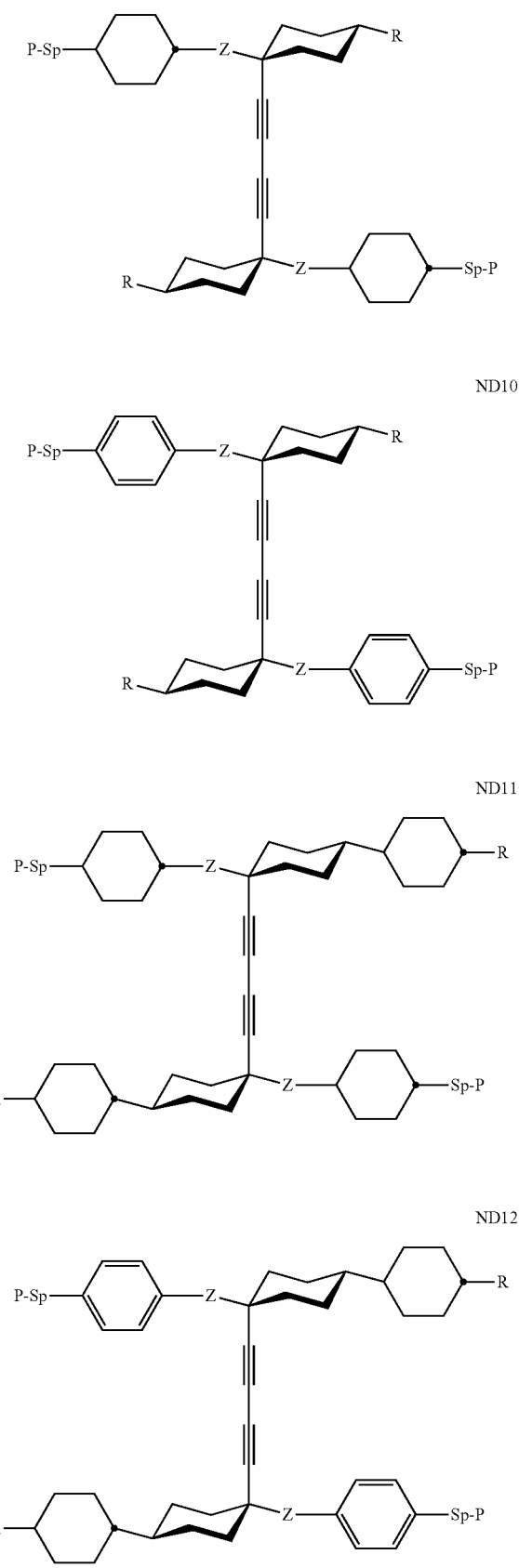

ND13
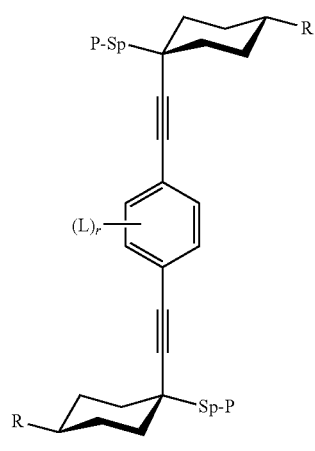
ND16
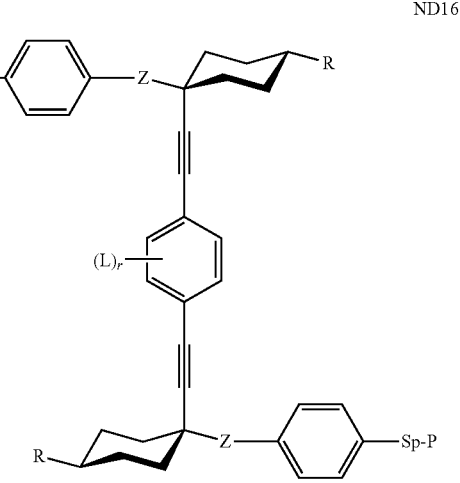
ND14
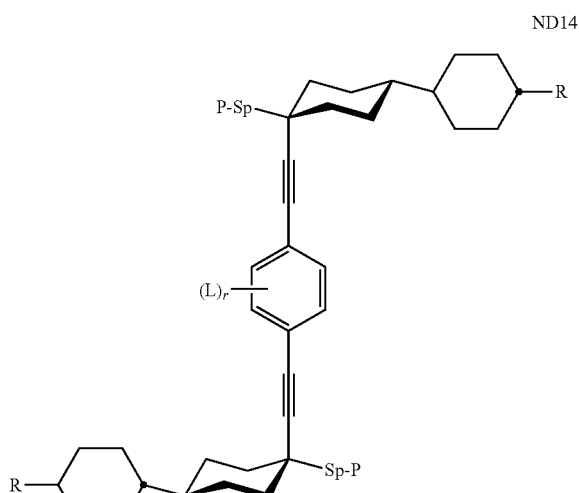
ND17
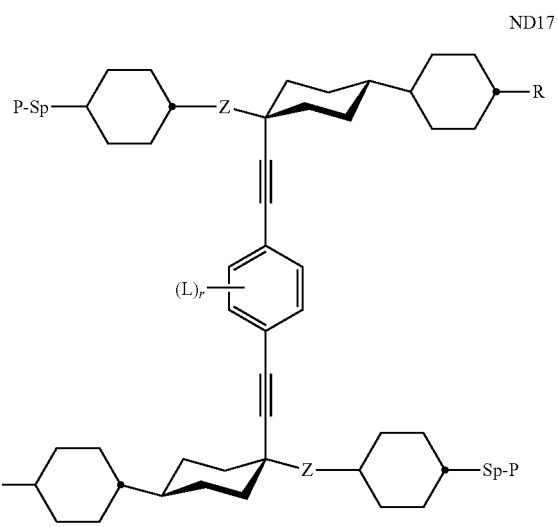
ND15
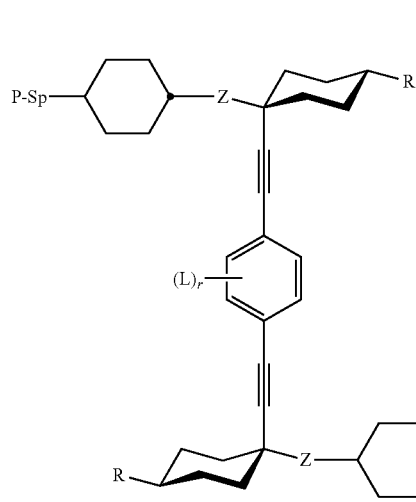
ND18
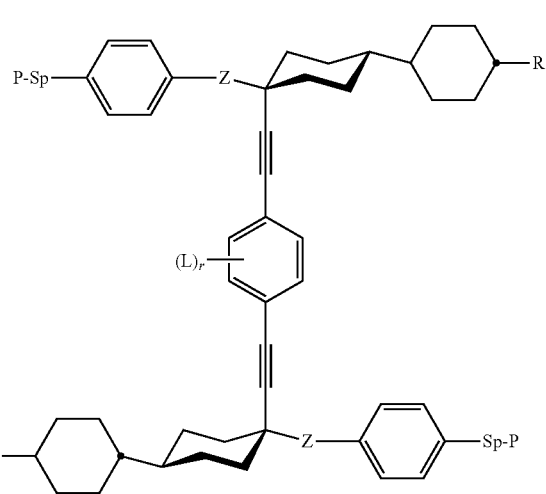

ND19
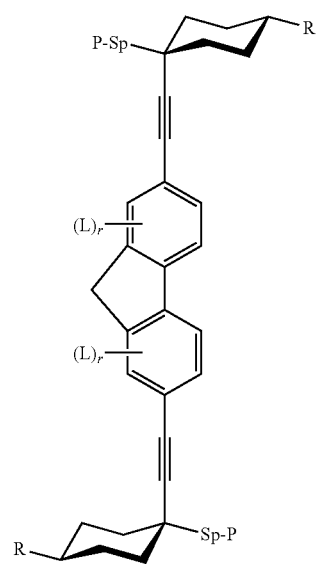
ND20
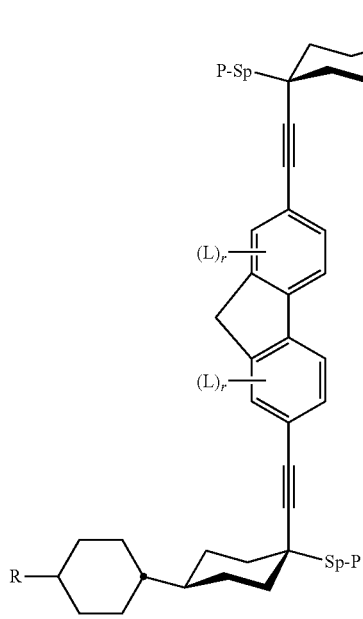
ND21
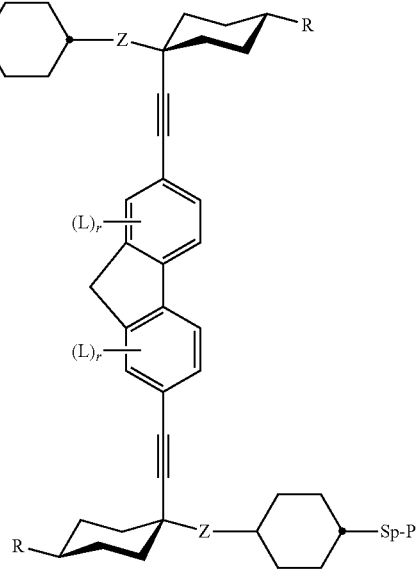
ND22
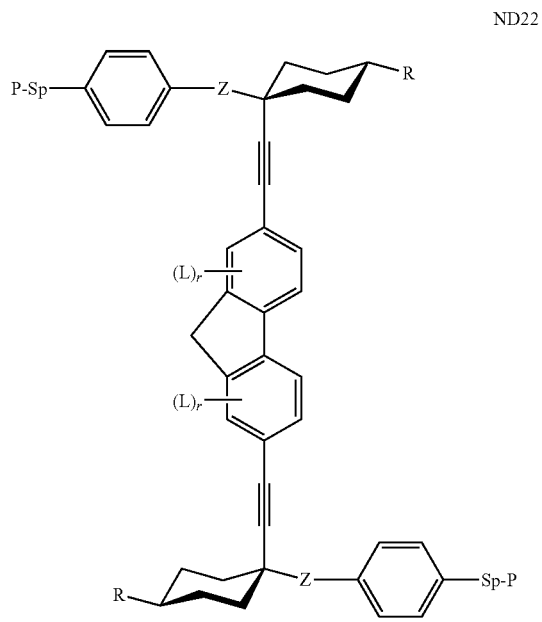

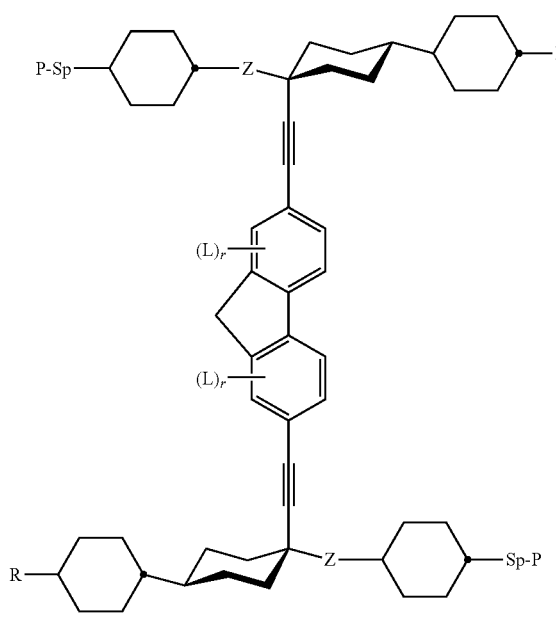

ND23

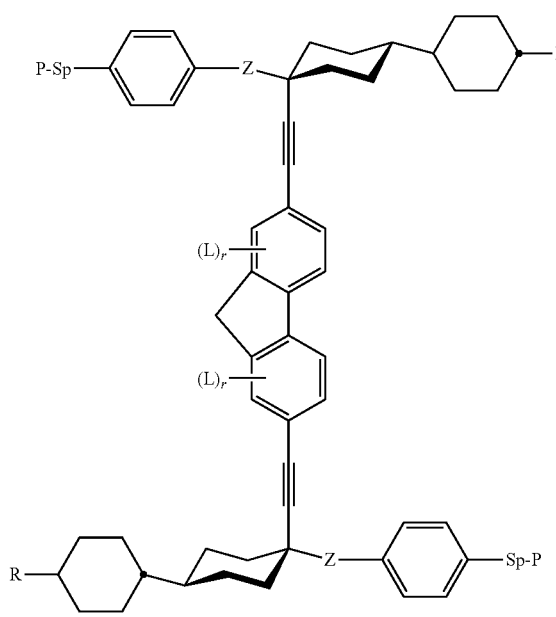

ND24

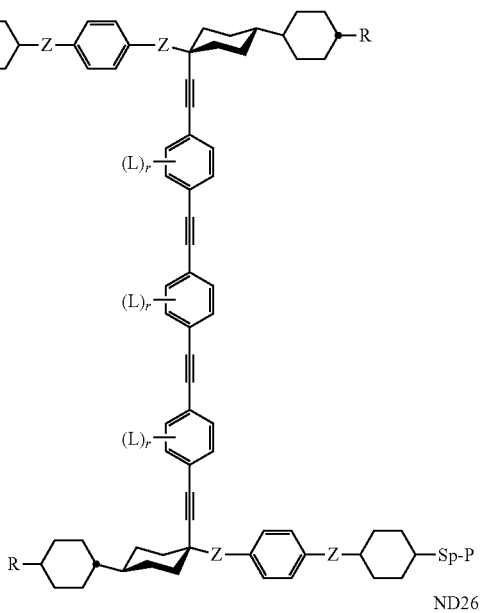

ND25

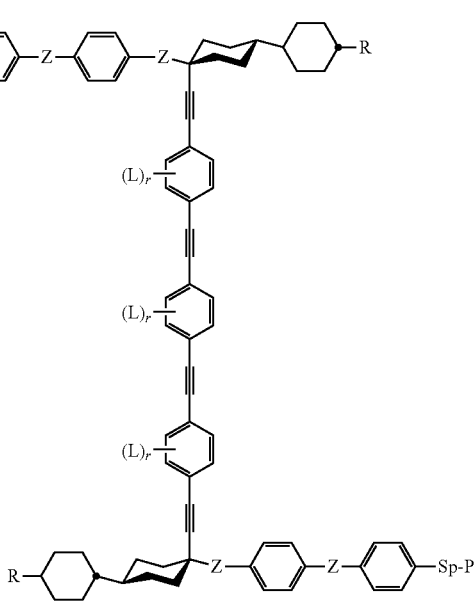

ND26 wherein Z has one of the meanings of $Z^1$ given above, R has one of the meanings of $R^1$ as given above that is different from P-Sp-, and P, Sp, L and r are as defined above, and the benzene rings in the mesogenic groups are optionally substituted by one or more groups L as defined above.

Preference is furthermore given to a polymerisable liquid crystalline medium wherein the compounds of formula ND are selected from the group of compounds of formula ND 25 or ND 26, in particular wherein Z denotes —COO—, r is in each occurrence 0, and P, Sp are as defined above.

P-Sp- in these preferred compounds is preferably P-Sp'-X', with X' preferably being —O—, —COO— or —OCOO—.

The compounds of formula ND, its subformulae and suitable methods for their synthesis are disclosed in WO 2008/119427 A1.

The amount of compounds of formula ND in the polymerisable LC material is preferably from 0 to 50%, very preferably from 0 to 40%.

In a further preferred embodiment the polymerisable LC material optionally comprises one or more additives selected from the group consisting of further polymerisation initiators, antioxidants, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

In another preferred embodiment, the polymerisable LC material optionally comprises one or more additives selected from polymerisable non-mesogenic compounds (reactive thinners). The amount of these additives in the polymerisable LC material is preferably from 0 to 30%, very preferably from 0 to 25%.

The reactive thinners used are not only substances which are referred to in the actual sense as reactive thinners, but also auxiliary compounds already mentioned above which contain one or more complementary reactive units or polymerizable groups P, for example hydroxyl, thiol-, or amino groups, via which a reaction with the polymerisable units of the liquid-crystalline compounds can take place.

The substances, which are usually capable of photopolymerisation, include, for example, mono-, bi- and polyfunctional compounds containing at least one olefinic double bond. Examples thereof are vinyl esters of carboxylic acids, for example of lauric, myristic, palmitic and stearic acid, and of dicarboxylic acids, for example of succinic acid, adipic acid, allyl and vinyl ethers and methacrylic and acrylic esters of monofunctional alcohols, for example of lauryl, myristyl, palmityl and stearyl alcohol, and diallyl and divinyl ethers of bifunctional alcohols, for example ethylene glycol and 1,4-butanediol.

Also suitable are, for example, methacrylic and acrylic esters of polyfunctional alcohols, in particular those which contain no further functional groups, or at most ether groups, besides the hydroxyl groups. Examples of such alcohols are bifunctional alcohols, such as ethylene glycol, propylene glycol and their more highly condensed representatives, for example diethylene glycol, triethylene glycol, dipropylene glycol, tripropylene glycol etc., butanediol, pentanediol, hexanediol, neopentyl glycol, alkoxylated phenolic compounds, such as ethoxylated and propoxylated bisphenols, cyclohexanedimethanol, trifunctional and polyfunctional alcohols, such as glycerol, trimethylolpropane, butanetriol, trimethylolethane, pentaerythritol, ditrimethylolpropane, dipentaerythritol, sorbitol, mannitol, and the corresponding alkoxylated, in particular ethoxylated and propoxylated alcohols.

Other suitable reactive thinners are polyester (meth)acrylates, which are the (meth)acrylic ester of polyesterols.

Examples of suitable polyesterols are those which can be prepared by esterification of polycarboxylic acids, preferably dicarboxylic acids, using polyols, preferably diols. The starting materials for such hydroxyl-containing polyesters are known to the person skilled in the art. Dicarboxylic acids which can be employed are succinic, glutaric acid, adipic acid, sebacic acid, o-phthalic acid and isomers and hydrogenation products thereof, and esterifiable and transesterifiable derivatives of said acids, for example anhydrides and dialkyl esters. Suitable polyols are the abovementioned alcohols, preferably ethyleneglycol, 1,2- and 1,3-propylene glycol, 1,4-butanediol, 1,6-hexanediol, neopentyl glycol, cyclohexanedimethanol and polyglycols of the ethylene glycol and propylene glycol type.

Suitable reactive thinners are furthermore 1,4-divinylbenzene, triallyl cyanurate, acrylic esters of tricyclodecenyl alcohol of the following formula

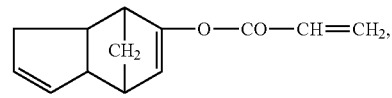 [SMILES: C=CC(=O)OC1=CC2CC1C1CC=CC21]

also known under the name dihydrodicyclopentadienyl acrylate, and the allyl esters of acrylic acid, methacrylic acid and cyanoacrylic acid.

Of the reactive thinners, which are mentioned by way of example, those containing photopolymerizable groups are used in particular and in view of the abovementioned preferred compositions.

This group includes, for example, dihydric and polyhydric alcohols, for example ethylene glycol, propylene glycol and more highly condensed representatives thereof, for example diethylene glycol, triethylene glycol, dipropylene glycol, tripropylene glycol etc., butanediol, pentanediol, hexanediol, neopentyl glycol, cyclohexanedimethanol, glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated alcohols.

The group furthermore also includes, for example, alkoxylated phenolic compounds, for example ethoxylated and propoxylated bisphenols.

These reactive thinners may furthermore be, for example, epoxide or urethane (meth)acrylates.

Epoxide (meth)acrylates are, for example, those as obtainable by the reaction, known to the person skilled in the art, of epoxidized olefins or poly- or diglycidyl ether, such as bisphenol A diglycidyl ether, with (meth)acrylic acid.

Urethane (meth)acrylates are, in particular, the products of a reaction, likewise known to the person skilled in the art, of hydroxylalkyl (meth)acrylates with poly- or diisocyanates.

Such epoxide and urethane (meth)acrylates are included amongst the compounds listed above as "mixed forms".

If reactive thinners are used, their amount and properties must be matched to the respective conditions in such a way that, on the one hand, a satisfactory desired effect, for example the desired colour of the composition according to the invention, is achieved, but, on the other hand, the phase behaviour of the liquid-crystalline composition is not excessively impaired. The low-crosslinking (high-crosslinking) liquid-crystalline compositions can be prepared, for example, using corresponding reactive thinners, which have a relatively low (high) number of reactive units per molecule.

The group of diluents include, for example:

C1-C4-alcohols, for example methanol, ethanol, n-propanol, isopropanol, butanol, isobutanol, sec-butanol and, in particular, the C5-C12-alcohols n-pentanol, n-hexanol, n-heptanol, n-octanol, n-nonanol, n-decanol, n-undecanol and n-dodecanol, and isomers thereof, glycols, for example 1,2-ethylene glycol, 1,2- and 1,3-propylene glycol, 1,2-, 2,3- and 1,4-butylene glycol, di- and triethylene glycol and di- and tripropylene glycol, ethers, for example methyl tert-butyl ether, 1,2-ethylene glycol mono- and dimethyl ether, 1,2-ethylene glycol mono- and -diethylether, 3-methoxypropanol, 3-isopropoxypropanol, tetrahydrofuran and dioxane, ketones, for example acetone, methyl ethyl ketone, methyl isobutyl ketone and diacetone alcohol (4-hydroxy-4-methyl-2-pentanone), C1-C5-alkyl esters, for example methyl acetate, ethyl acetate, propyl acetate, butyl acetate and amyl acetate, aliphatic and aromatic hydrocarbons, for example pentane, hexane, heptane, octane, isooctane, petroleum ether, toluene, xylene, ethylbenzene, tetralin, decalin, dimethylnaphthalene, white spirit, Shellsol® and Solvesso® mineral oils, for example gasoline, kerosine, diesel oil and heating oil, but also natural oils, for example olive oil, soya oil, rapeseed oil, linseed oil and sunflower oil.

It is of course also possible to use mixtures of these diluents in the compositions according to the invention.

So long as there is at least partial miscibility, these diluents can also be mixed with water. Examples of suitable diluents here are C1-C4-alcohols, for example methanol, ethanol, n-propanol, isopropanol, butanol, isobutanol and sec-butanol, glycols, for example 1,2-ethylene glycol, 1,2- and 1,3-propylene glycol, 1,2-, 2,3- and 1,4-butylene glycol, di- and triethylene glycol, and di- and tripropylene glycol, ethers, for example tetrahydrofuran and dioxane, ketones, for example acetone, methyl ethyl ketone and diacetone alcohol (4-hydroxy-4-methyl-2-pentanone), and C1-C4-alkyl esters, for example methyl, ethyl, propyl and butyl acetate.

The diluents are optionally employed in a proportion of from about 0 to 10.0% by weight, preferably from about 0 to 5.0% by weight, based on the total weight of the polymerisable LC material.

The antifoams and deaerators (c1)), lubricants and flow auxiliaries (c2)), thermally curing or radiation-curing auxiliaries (c3)), substrate wetting auxiliaries (c4)), wetting and dispersion auxiliaries (c5)), hydrophobicizing agents (c6)), adhesion promoters (c7)) and auxiliaries for promoting scratch resistance (c8)) cannot strictly be delimited from one another in their action.

For example, lubricants and flow auxiliaries often also act as antifoams and/or deaerators and/or as auxiliaries for improving scratch resistance. Radiation-curing auxiliaries can also act as lubricants and flow auxiliaries and/or deaerators and/or as substrate wetting auxiliaries. In individual cases, some of these auxiliaries can also fulfil the function of an adhesion promoter (c8)).

Corresponding to the above-said, a certain additive can therefore be classified in a number of the groups c1) to c8) described below.

The antifoams in group c1) include silicon-free and silicon-containing polymers. The silicon-containing polymers are, for example, unmodified or modified polydialkylsiloxanes or branched copolymers, comb or block copolymers comprising polydialkylsiloxane and polyether units, the latter being obtainable from ethylene oxide or propylene oxide.

The deaerators in group c1) include, for example, organic polymers, for example polyethers and polyacrylates, dialkylpolysiloxanes, in particular dimethylpolysiloxanes, organically modified polysiloxanes, for example arylalkyl-modified polysiloxanes, and fluorosilicones.

The action of the antifoams is essentially based on preventing foam formation or destroying foam that has already formed. Antifoams essentially work by promoting coalescence of finely divided gas or air bubbles to give larger bubbles in the medium to be deaerated, for example the compositions according to the invention, and thus accelerate escape of the gas (of the air). Since antifoams can frequently also be employed as deaerators and vice versa, these additives have been included together under group c1).

Such auxiliaries are, for example, commercially available from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18, TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 936, Tego® Airex 960, Tego® Airex 970, Tego® Airex 980 and Tego® Airex 985 and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-066, BYK®-070, BYK®-080, BYK®-088, BYK®-141 and BYK®-A 530.

The auxiliaries in group c1) are optionally employed in a proportion of from about 0 to 3.0% by weight, preferably from about 0 to 2.0% by weight, based on the total weight of the polymerisable LC material.

In group c2), the lubricants and flow auxiliaries typically include silicon-free, but also silicon-containing polymers, for example polyacrylates or modifiers, low-molecular-weight polydialkylsiloxanes. The modification consists in some of the alkyl groups having been replaced by a wide variety of organic radicals. These organic radicals are, for example, polyethers, polyesters or even long-chain (fluorinated)alkyl radicals, the former being used the most frequently.

The polyether radicals in the correspondingly modified polysiloxanes are usually built up from ethylene oxide and/or propylene oxide units. Generally, the higher the proportion of these alkylene oxide units in the modified polysiloxane, the more hydrophilic is the resultant product.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGO® Rad 2700, which are likewise obtainable from TEGO.

Such-auxiliaries are also available, for example, from BYK as BYK®-300 BYK®-306, BYK®-307, BYK®-310, BYK®-320, BYK®-333, BYK®-341, Byk® 354, Byk®361, Byk®361N, BYK®388.

Such-auxiliaries are also available, for example, from 3M as FC4430®.

Such-auxiliaries are also available, for example, from Cytonix as FluorN®561 or FluorN®562.

Such-auxiliaries are also available, for example, from Merck KGaA as Tivida® FL 2300 and Tivida® FL 2500

The auxiliaries in group c2) are optionally employed in a proportion of from about 0 to 3.0% by weight, preferably from about 0 to 2.0% by weight, based on the total weight of the polymerisable LC material.

In group c3), the radiation-curing auxiliaries include, in particular, polysiloxanes having terminal double bonds which are, for example, a constituent of an acrylate group. Such auxiliaries can be crosslinked by actinic or, for example, electron radiation. These auxiliaries generally combine a number of properties together. In the uncrosslinked state, they can act as antifoams, deaerators, lubricants and flow auxiliaries and/or substrate wetting auxiliaries, while, in the crosslinked state, they increase, in particular, the scratch resistance, for example of coatings or films which can be produced using the compositions according to the invention. The improvement in the gloss properties, for example of precisely those coatings or films, is regarded essentially as a consequence of the action of these auxiliaries as antifoams, deaerators and/or lubricants and flow auxiliaries (in the uncrosslinked state).

Examples of suitable radiation-curing auxiliaries are the products TEGO® Rad 2100, TEGO® Rad 2200, TEGO® Rad 2500, TEGO® Rad 2600 and TEGO® Rad 2700 available from TEGO and the product BYK®-371 available from BYK.

Thermally curing auxiliaries in group c3) contain, for example, primary OH groups, which are able to react with isocyanate groups, for example of the binder.

Examples of thermally curing auxiliaries, which can be used, are the products BYK®-370, BYK®-373 and BYK®-375 available from BYK.

The auxiliaries in group c3) are optionally employed in a proportion of from about 0 to 5.0% by weight, preferably from about 0 to 3.0% by weight, based on the total weight of the polymerisable LC material.

The substrate wetting auxiliaries in group c4) serve, in particular, to increase the wettability of the substrate to be printed or coated, for example, by printing inks or coating compositions, for example compositions according to the invention. The generally attendant improvement in the lubricant and flow behaviour of such printing inks or coating compositions has an effect on the appearance of the finished (for example crosslinked) print or coating.

A wide variety of such auxiliaries are commercially available, for example from Tego as TEGO® Wet KL 245, TEGO® Wet 250, TEGO® Wet 260 and TEGO® Wet ZFS 453 and from BYK as BYK®-306, BYK®-307, BYK®-310, BYK®-333, BYK®-344, BYK®-345, BYK®-346 and Byk®-348.

The auxiliaries in group c4) are optionally employed in a proportion of from about 0 to 3.0% by weight, preferably from about 0 to 1.5% by weight, based on the total weight of the liquid-crystalline composition.

The wetting and dispersion auxiliaries in group c5) serve, in particular, to prevent the flooding and floating and the sedimentation of pigments and are therefore, if necessary, suitable in particular in pigmented compositions.

These auxiliaries stabilize pigment dispersions essentially through electrostatic repulsion and/or steric hindrance of the pigment particles containing these additives, where, in the latter case, the interaction of the auxiliary with the ambient medium (for example binder) plays a major role.

Since the use of such wetting and dispersion auxiliaries is common practice, for example in the technical area of printing inks and paints, the selection of a suitable auxiliary of this type generally does not present the person skilled in the art with any difficulties, if they are used.

Such wetting and dispersion auxiliaries are commercially available, for example from Tego, as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W and from BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra®-206, BYK®-151, BYK®-154, BYK®-155, BYK®-P 104 S, BYK®-P 105, Lactimon®, Lactimon®-WS and Bykumen®.

The amount of the auxiliaries in group c5) used on the mean molecular weight of the auxiliary. In any case, a preliminary experiment is therefore advisable, but this can be accomplished simply by the person skilled in the art.

The hydrophobicizing agents in group c6) can be used to give water-repellent properties to prints or coatings produced, for example, using compositions according to the invention. This prevents or at least greatly suppresses swelling due to water absorption and thus a change in, for example, the optical properties of such prints or coatings. In addition, when the composition is used, for example, as a printing ink in offset printing, water absorption can thereby be prevented or at least greatly reduced.

Such hydrophobicizing agents are commercially available, for example, from Tego as Tego® Phobe WF, Tego® Phobe 1000, Tego® Phobe 1000 S, Tego® Phobe 1010, Tego® Phobe 1030, Tego® Phobe 1010, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries in group c6) are optionally employed in a proportion of from about 0 to 5.0% by weight, preferably from about 0 to 3.0% by weight, based on the total weight of the polymerisable LC material.

Further adhesion promoters from group c7) serve to improve the adhesion of two interfaces in contact. It is directly evident from this that essentially the only fraction of the adhesion promoter that is effective is that located at one or the other or at both interfaces. If, for example, it is desired to apply liquid or pasty printing inks, coating compositions or paints to a solid substrate, this generally means that the adhesion promoter must be added directly to the latter or the substrate must be pre-treated with the adhesion promoters (also known as priming), i.e. this substrate is given modified chemical and/or physical surface properties.

If the substrate has previously been primed with a primer, this means that the interfaces in contact are that of the primer on the one hand and of the printing ink or coating composition or paint on the other hand. In this case, not only the adhesion properties between the substrate and the primer, but also between the substrate and the printing ink or coating composition or paint play a part in adhesion of the overall multilayer structure on the substrate.

Adhesion promoters in the broader sense which may be mentioned are also the substrate wetting auxiliaries already listed under group c4), but these generally do not have the same adhesion promotion capacity.

In view of the widely varying physical and chemical natures of substrates and of printing inks, coating compositions and paints intended, for example, for their printing or coating, the multiplicity of adhesion promoter systems is not surprising.

Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane and vinyltrimethoxysilane. These and other silanes are commercially available from Hüls, for example under the tradename DYNASILAN®.

Corresponding technical information from the manufacturers of such additives should generally be used or the person skilled in the art can obtain this information in a simple manner through corresponding preliminary experiments.

However, if these additives are to be added as auxiliaries from group c7) to the polymerisable LC materials according to the invention, their proportion optionally corresponds to from about 0 to 5.0% by weight, based on the total weight of the polymerisable LC material. These concentration data serve merely as guidance, since the amount and identity of the additive are determined in each individual case by the nature of the substrate and of the printing/coating composition. Corresponding technical information is usually available from the manufacturers of such additives for this case or can be determined in a simple manner by the person skilled in the art through corresponding preliminary experiments.

The auxiliaries for improving the scratch resistance in group c8) include, for example, the abovementioned products TEGO® Rad 2100, TEGO® Rad 2200, TEGO® Rad 2500, TEGO® Rad 2600 and TEGO® Rad 2700, which are available from Tego.

For these auxiliaries, the amount data given for group c3) are likewise suitable, i.e. these additives are optionally employed in a proportion of from about 0 to 5.0% by weight, preferably from about 0 to 3.0% by weight, based on the total weight of the liquid-crystalline composition.

Examples that may be mentioned of light, heat and/or oxidation stabilizers are the following:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, Hydroquinones and alkylated hydroquinones, such as 2,6-di-tert-butyl-4-methoxyphenol, 2,5-di-tert-butylhydroquinone, 2,5-di-tert-amylhydrocrainone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, Tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl)disulfide, Alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane and 1,1,5,5-tetrakis(5-tert-butyl-4-hydroxy-2-methylphenyl)pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl)sulfide and isooctyl-3,5-di-tert-butyl-4-hydroxybenzylmercaptoacetate, aromatic hydroxybenzyl compounds, such as 1,3,5-tris(3,5-di-tert-butyl-4-hydroxybenzyl)-2,4,6-trimethyl-benzene, 1,4-bis(3,5-di-tert-butyl-4-hydroxybenzyl)-2,3,5,6-tetramethyl-benzene and 2,4,6-tris(3,5-di-tert-butyl-4-hydroxybenzyl)phenol, Triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl)hexahydro-1,3,5-triazine, 1,3,5-tris(3,5-dicyclohexyl-4-hydroxybenzyl)isocyanurate and 1,3,5-tris(2-hydroxyethyl)isocyanurate, Benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate, Acylaminophenols, such as 4-hydroxylauroylanilide, 4-hydroxystearoylanilide and octyl N-(3,5-di-tert-butyl-4-hydroxyphenyl)carbamate, Propionic and acetic esters, for example of monohydric or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]-octane, Propionamides based on amine derivatives, such as N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl) hydrazine, Ascorbic acid (Vitamin C) and ascorbic acid derivatives, such as ascorbyl palmitate, laurate and stearate, and ascorbyl sulfate and phosphate, Antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one and 2,2,6,6-tetramethylpiperidin-4-ol, Phosphines, Phosphites and phosphonites, such as triphenylphosnine triphenylphosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl))pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methyl phosphite and bis(2,4-di-tert-butyl-6-methylphenyl)ethyl phosphite, 2-(2'-Hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3,5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxy phenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxy phenyl)benzotriazole, 2-(3'-dodecyl-2'-hydroxy-5'-methylphenyl)benzotriazole and 2-(3'-tert-butyl-2'-hydroxy-5'-(2-isooctyloxycarbonylethyl)phenyl benzotriazole, 2,2'-methylenebis[4-(1,1,3,3-tetramethylbutyl)-6-benzotriazol-2-ylphenol];

the product of complete esterification of 2-[3'-tertbutyl-5'-(2-methoxycarbonylethyl)-2'-hydroxyphenyl]-2H-benzotriazole with polyethylene glycol 300;

sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamates, dioctadecyl disulfide and pentaerythritol tetrakis(β-dodecylmercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, Esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, Acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis(2,2,6,6-tetramethylpiperidin-4-yl) sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris(2,2,6,6-tetramethylpiperidin-4-yl)nitrilotriacetate, tetrakis(2,2,6,6-tetramethylpiperidin-4-yl)1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl)sebacate, bis(1-octyloxy-2,2,6,6-tetramethylpiperidin-4-yl)succinate, the condensation product of N,N'-bis(2,2,6,6-tetramethylpiperidin-4-yl)hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl)hexamethylenediamine and 4-cyclohexylamino-2,6-dichloro-1,3,5-triazine, the condensation product of 1,2-bis(3-aminopropylamino) ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxospiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl)piperidinyl]-siloxane, Oxalamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

In another preferred embodiment the polymerisable LC material comprises one or more specific antioxidant additives, preferably selected from the Irganox® series, e.g. the commercially available antioxidants Irganox®1076 and Irganox®1010, from Ciba, Switzerland.

In another preferred embodiment, the polymerisable LC material comprises a combination of one or more, more preferably of two or more photoinitiators. Typically, additional radical photoinitiators which can be utilized together with one or more compounds of formula CO—1, are, for example, selected from the commercially available Irgacure® or Darocure® (Ciba AG) series, in particular, Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, or Darcure TPO.

The concentration of the polymerisation initiator(s) as a whole in the polymerisable LC material is preferably from 1 to 10%, very preferably from 2 to 8%, more preferably 3 to 6%.

In another preferred embodiment, in particular for other purposes than optical films, such as, for example PN-LC or PDLC applications, the polymerisable LC material comprises also a non-polymerisable nematic component.

Preferably, the non-polymerisable nematic component comprises one or more LC compounds selected from compounds indicated below:

The liquid-crystalline component preferably comprises one or more compounds selected from the group of the compounds of the formulae I-1, I-2, I-3 and I-4,

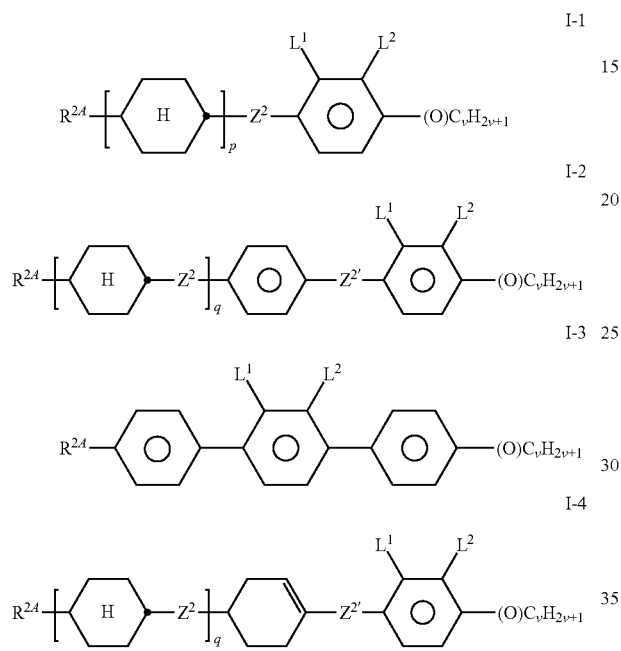

in which
R$^{2A}$ denotes H, an alkyl or alkoxy radical having 1 to 15 C atoms, where, in addition, one or more CH$_2$ groups in these radicals may each be replaced, independently of one another, by —C≡C—, —CF$_2$O—, —CH=CH—,

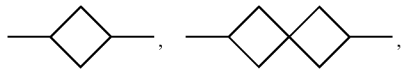

—O—, —CO—O— or —O—CO— in such a way that O atoms are not linked directly to one another, and in which, in addition, one or more H atoms may be replaced by halogen, L$^1$ and L$^2$ each, independently of one another, denote F, Cl, CF$_3$ or CHF$_2$, preferably each denote F, Z$^2$ and Z$^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or —CH=CHCH$_2$O—, p denotes 0, 1 or 2,
q denotes 0 or 1,
(O)C$_v$H$_{2v+1}$ denotes OC$_v$H$_{2v+1}$ or C$_v$H$_{2v+1}$, and v denotes 1 to 6.

Particularly preferred compounds of the formulae I-1 to I-4 are shown below:

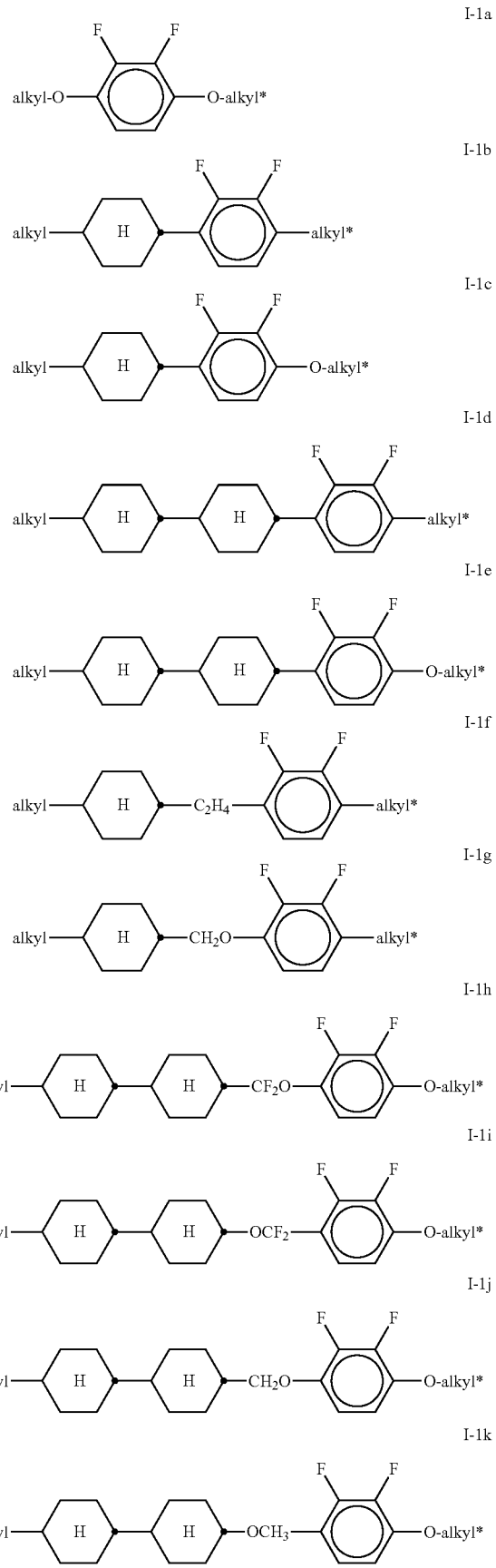

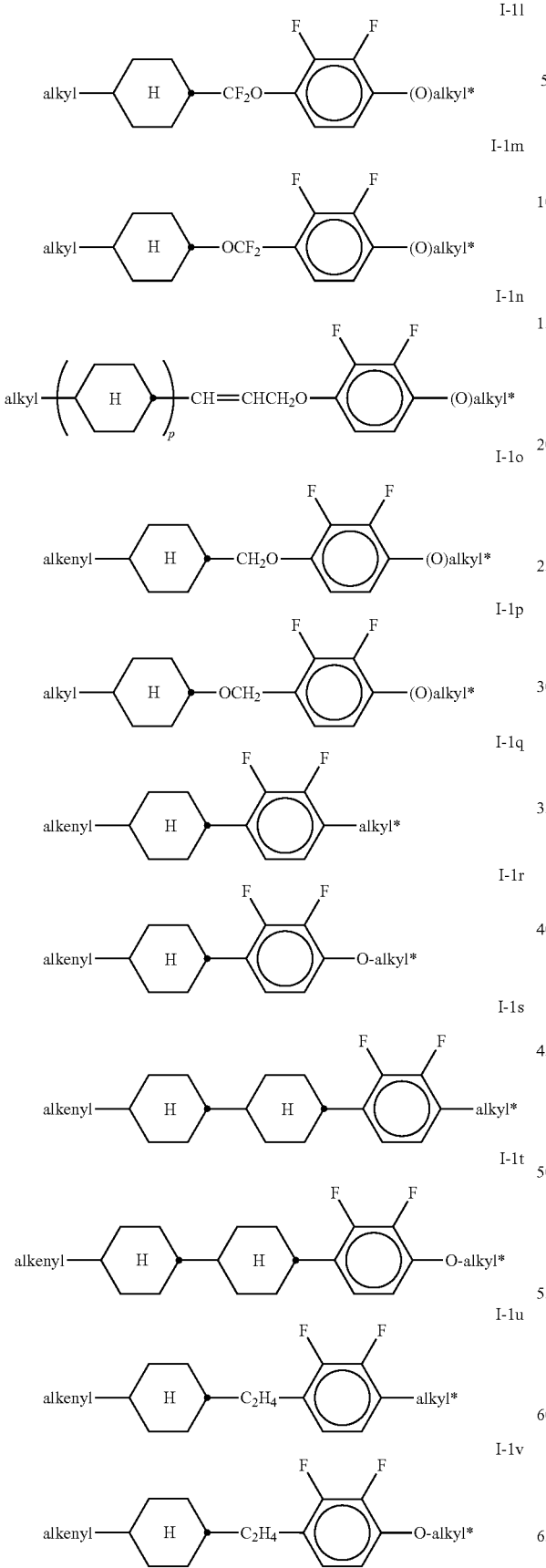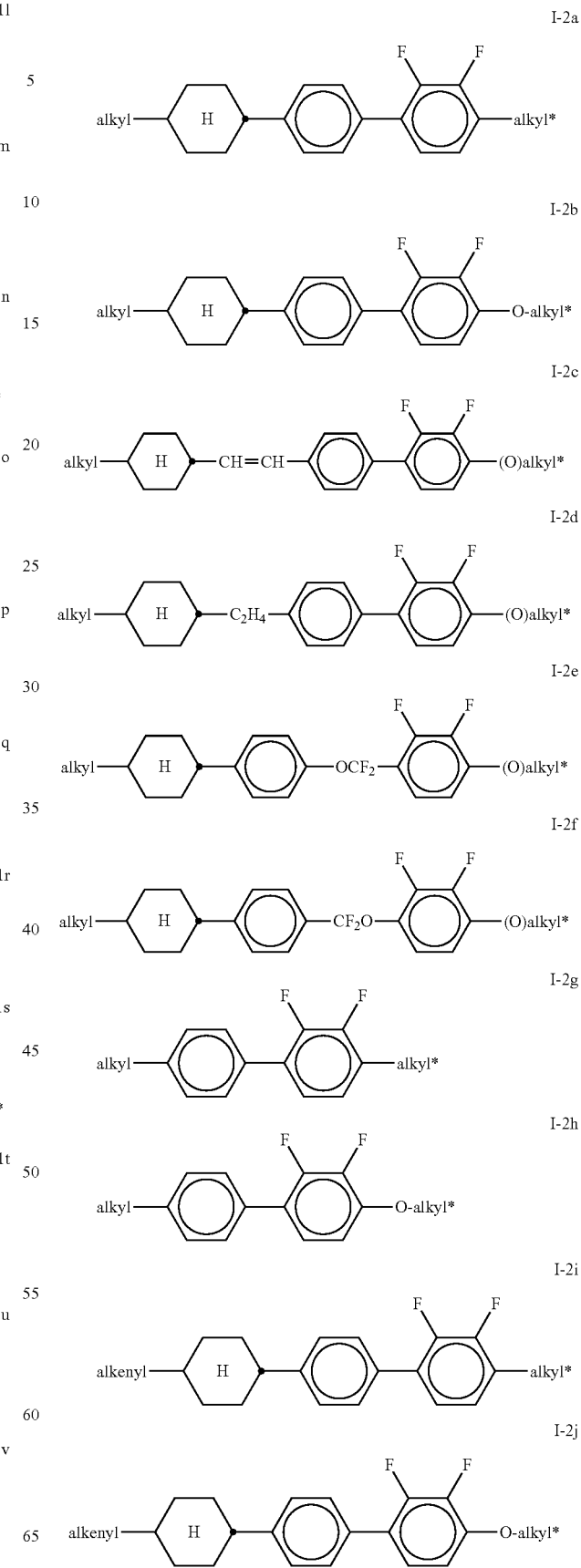

I-3a

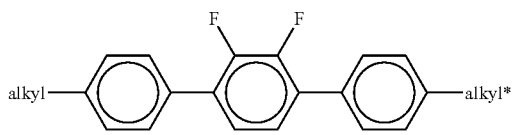

in which
alkyl and alkyl* each, independently of one another, denote a straight-chain alkyl radical having 1 to 9 C atoms, preferably 2 to 6 C atoms, and alkenyl and alkenyl* each, independently of one another, denote a straight-chain alkenyl radical having 2-6 C atoms, and p denotes 0, 1 or 2.

Of the said compounds, particular preference is given to the compounds of the formulae I-1a, I-1c, I-1e, I-1g, I-1j, I-1r, I-1t, I-2b, I-2h, I-2j and I-3a.

the medium comprises one or more neutral compounds of the formulae II and/or III,

II

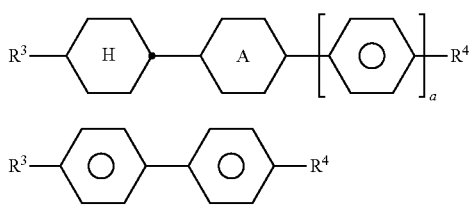

III

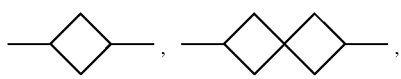

in which
A denotes 1,4-phenylene or trans-1,4-cyclohexylene,
a is 0 or 1,
$R^3$ denotes alkenyl having 2 to 9 C atoms, and
$R^4$ denotes an alkyl or alkoxy radical having 1 to 15 C atoms, where, in addition, one or more $CH_2$ groups in these radicals may each be replaced, independently of one another, by —C≡C—, —$CF_2$O—, —CH=CH—,

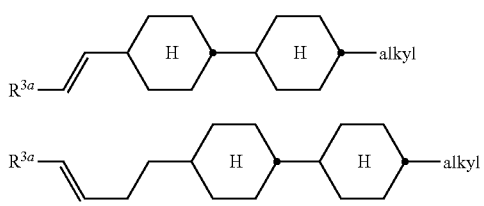

—O—, —CO—O—, —O—CO— in such a way that O atoms are not linked directly to one another, and in which, in addition, one or more H atoms may be replaced by halogen, preferably alkyl having 1 to 12 C atoms or alkenyl having 2 to 9 C atoms.

The compounds of the formula II are preferably selected from the following formulae:

IIa

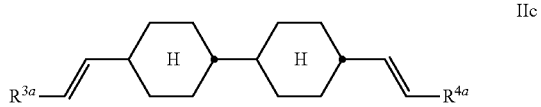

IIb

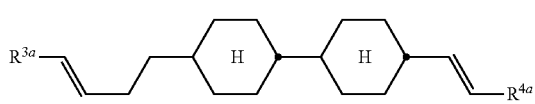

IIc

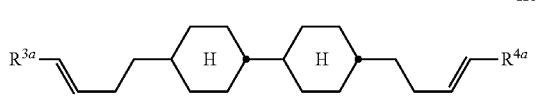

IId

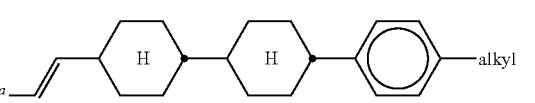

IIe

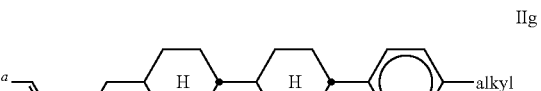

IIf

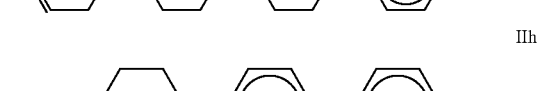

IIg

IIh

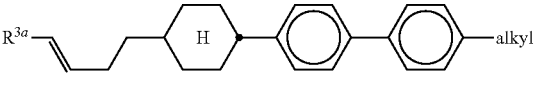

IIi

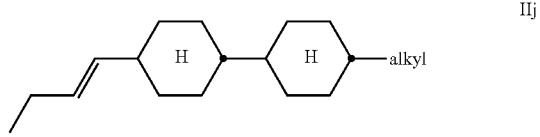

in which $R^{3a}$ and $R^{4a}$ each, independently of one another, denote H, $CH_3$, $O_2H_5$ or $C_3H_7$, and "alkyl" denotes a straight-chain alkyl group having 1 to 8 C atoms. Particular preference is given to compounds of the formulae IIa and IIf, in particular, in which $R^{3a}$ denotes H or $CH_3$, and compounds of the formula IIc, in particular in which $R^{3a}$ and $R^{4a}$ denote H, $CH_3$ or $C_2H_5$.

Preference is furthermore given to compounds of the formula II which have a non-terminal double bond in the alkenyl side chain:

IIj

IIk

Il

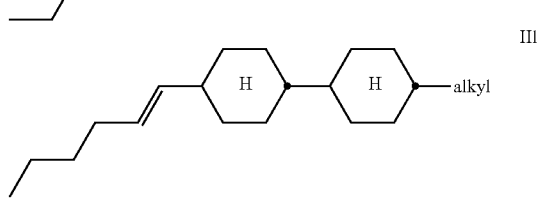

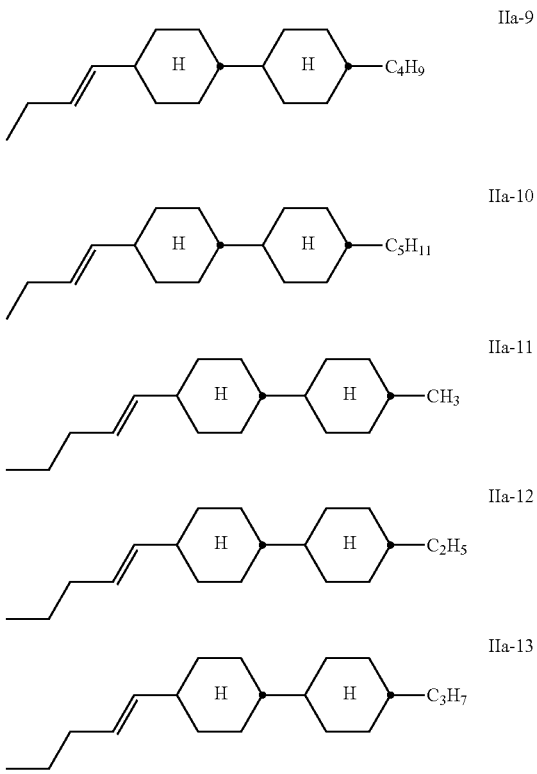
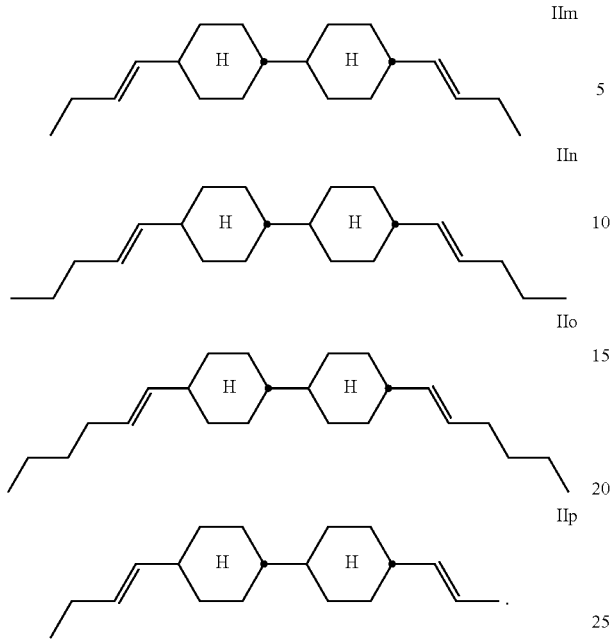
Very particularly preferred compounds of the formula II are the compounds of the formulae
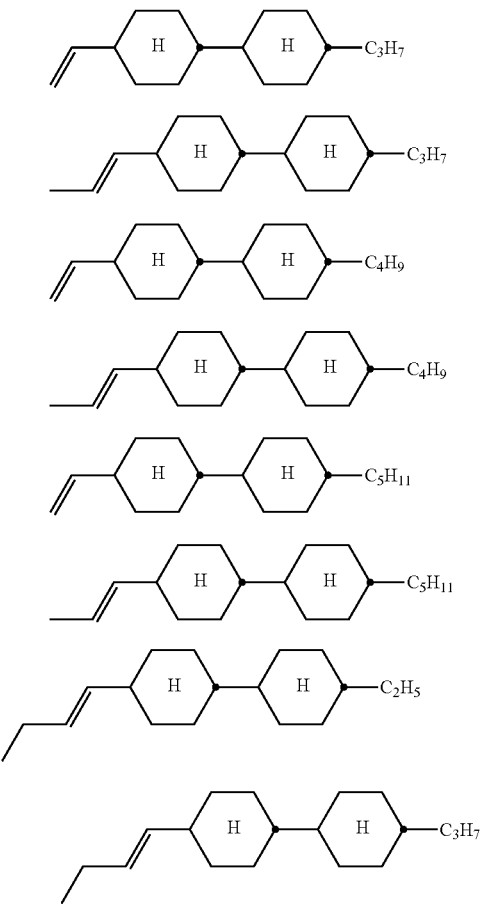

IIa-19

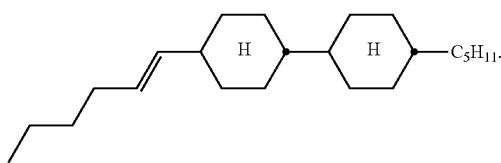

Of the compounds of the formulae IIa-1 to IIa-19, particular preference is given, in particular, to the compounds of the formulae IIa-1, IIa-2, IIa-3 and IIa-5.
The compounds of the formula III are preferably selected from the following formulae:

IIIa

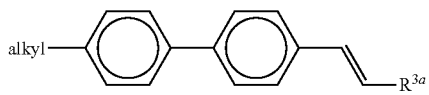

IIIb

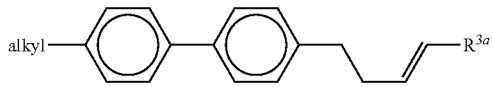

in which "alkyl" and $R^{3a}$ have the meanings indicated above, and $R^{3a}$ preferably denotes H or $CH_3$. Particular preference is given to compounds of the formula IIIb; Very particular preference is given to the compound of the formula IIIb-1, IIIb-1

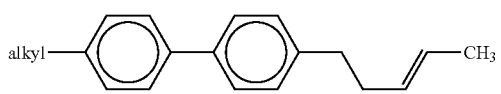

in which "alkyl" has the meaning indicated above and preferably denotes $CH_3$, furthermore $C_2H_5$ or n-$C_3H_7$.
Preferred mixtures comprise at least one compound from the group S—1, S—2, S—3 and S—4,

S-1

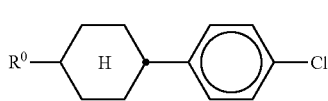

S-2

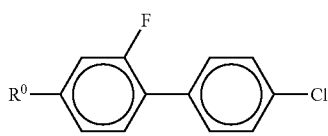

S-3

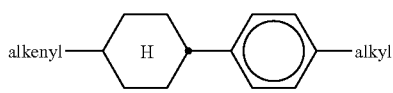

S-4

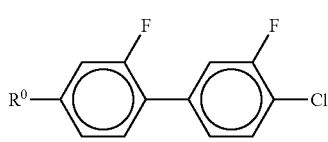

since these compounds help, inter alia, to suppress the smectic phases of the mixtures.
The liquid-crystalline component preferably comprises one or more compounds of the general formula N,

N

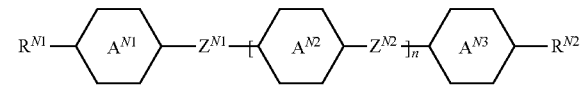

in which
$R^{N1}$ and $R^{N2}$ each, independently of one another, denote an alkyl or alkoxy radical having 1 to 15 C atoms, where, in addition, one or more $CH_2$ groups in these radicals may each be replaced, independently of one another, by —C≡C—, —$CF_2$O—,

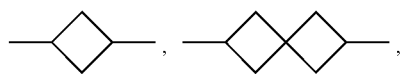

—O—, —CO—O—, —O—CO— in such a way that O atoms are not linked directly to one another, and in which, in addition, one or more H atoms may be replaced by halogen,
rings $A^{N1}$, $A^{N2}$ and $A^{N3}$ each, independently of one another, denote 1,4-phenylene, 2-fluoro-1,4-phenylene, 3-fluoro-1,4-phenylene, trans-1,4-cyclohexylene, in which, in addition, one or two $CH_2$ groups may be replaced by —O—, or 1,4-cyclohexenylene,
$Z^{N1}$ and $Z^{N2}$ each, independently of one another, denote a single bond, —$CH_2CH_2$—, —COO—, —OCO—, —C≡C—, —$CH_2$O—, —O$CH_2$—, —$CF_2$O—, —OC$F_2$— or —CH=CH—,
n denotes 0, 1 or 2.
Preferred compounds of the formula N are shown below:

N-1

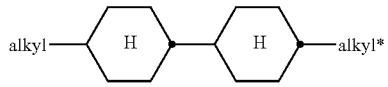

N-2

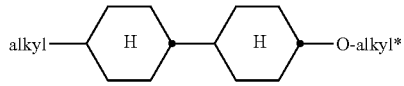

N-3

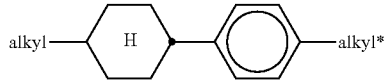

N-4

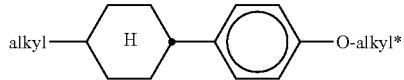

N-5

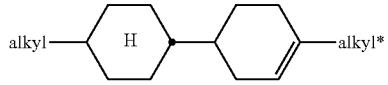

N-6

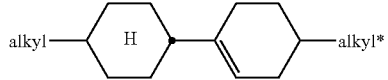

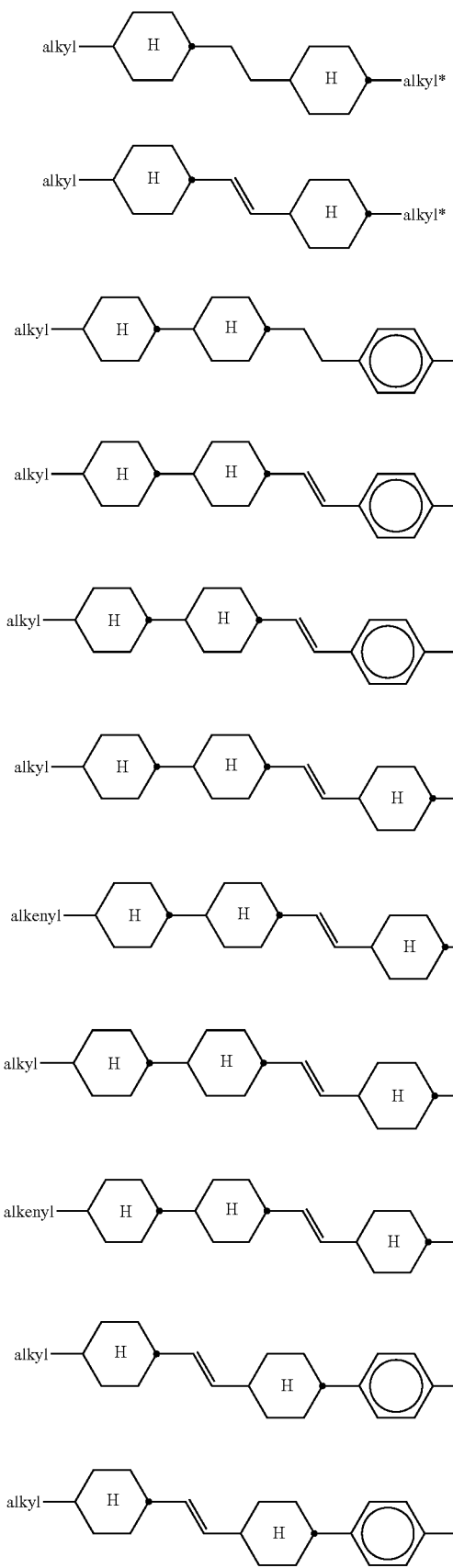
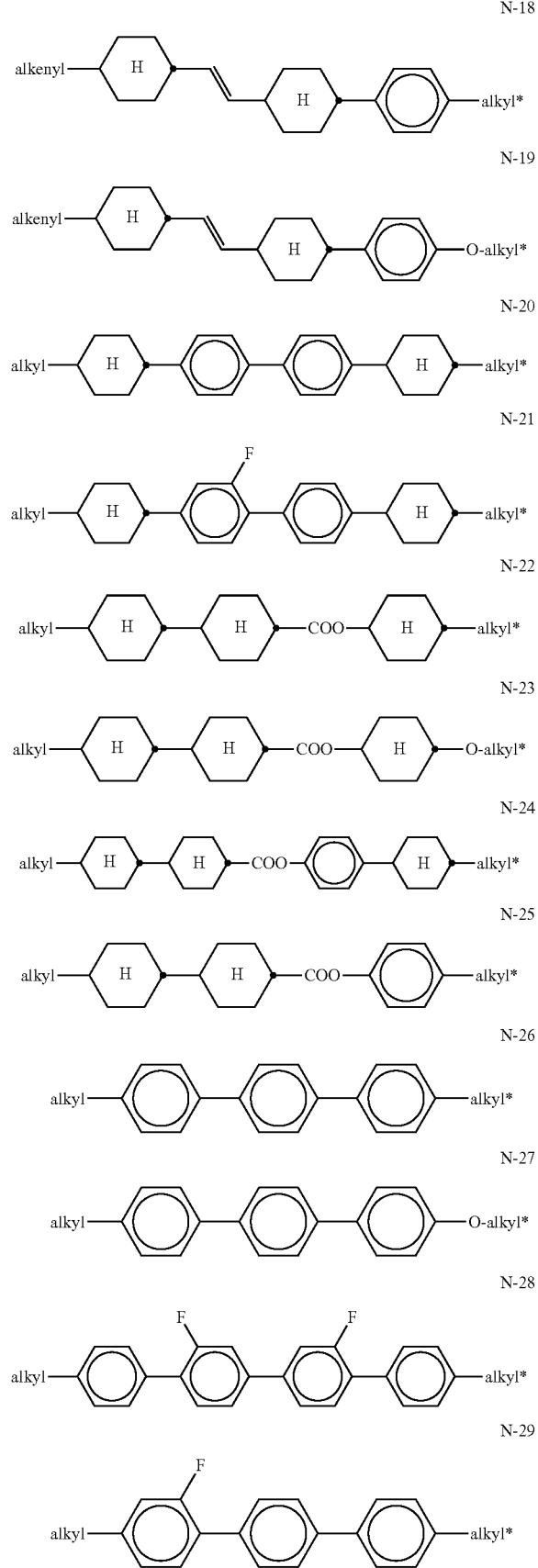

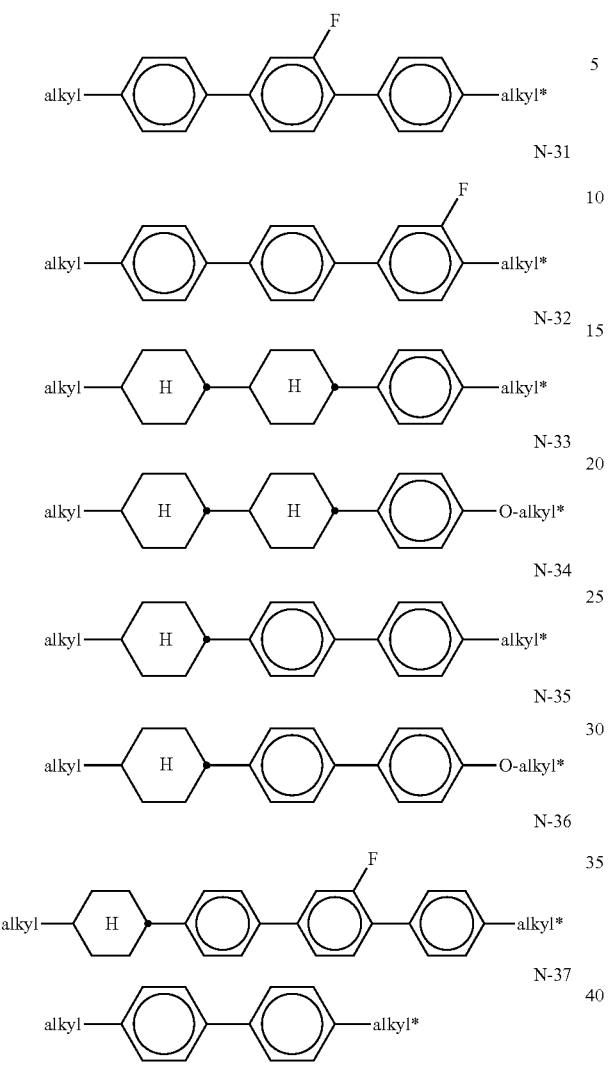

in which
alkyl and alkyl* each, independently of one another, denote a straight-chain alkyl radical having 1 to 9 C atoms, preferably 2 to 6 C atoms, and alkenyl and alkenyl* each, independently of one another, denote a straight-chain alkenyl radical having 2-6 C atoms.

Of the compounds of the formula N, particular preference is given to the compounds of the formulae N—1, N—2, N—3, N—4, N—8, N—9, N—14, N—15, N—17, N—18, N—19, N—20, N—21, N—22, N—23, N—24, N—25, N—30, N—32, N—34 and N—37.

The compounds of the formulae I to III, and N or the sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

Preferred compounds, which can be employed in a liquid-crystalline medium according to the invention are indicated below:

the medium preferably comprises one or more compounds of the formula I-1, preferably of the formula I-1c, selected from the group of the compounds of the formulae CY-3-O2, CY-3-O4, CY-5-O2 and CY-5-O4, the medium preferably comprises one or more compounds of the formula I-1, preferably selected from the group of the compounds of the formulae I-1e and I-1d, preferably of the formula CCY-n-Om, preferably selected from the group of the compounds of the formulae CCY-3-O2, CCY-2-O2, CCY-3-O1, CCY-3-O3, CCY-4-O2, CCY-3-O2 and CCY-5-O2, the medium preferably comprises one or more compounds of the formula I-2, preferably of the formula I-2b, preferably selected from the group of the compounds of the formulae CPY-2-O2, CPY-3-O2, CPY-4-O2 and CPY-5-O2, the medium preferably comprises one or more compounds of the formula I-2h, preferably selected from the group of the compounds of the formulae PY-3-O2, PY-1-O4 and PY-4-O2, the medium preferably comprises one or more compounds of the formula I-3, preferably selected from the group of the compounds of the formulae PYP-2-3 and PYP-2-4, the medium preferably optionally comprises one or more compounds of the formula I-4, preferably of the formula CLY-n-Om, preferably selected from the group of the compounds of the formulae CLY-2-O4, CLY-3-O2 and CLY-3-O3, the medium preferably comprises one or more compounds of the formula II, preferably selected from the group of the compounds of the formulae CC-n-V and CC-n-Vm, preferably CC-3-V, CC-3-V1, CC-4-V and CC-5-V, particularly preferably selected from the group of the compounds CC-3-V, CC-3-V1 and CC-4-V, very particularly preferably the compound CC-3-V, and optionally additionally the compound CC-4-V and/or CC-3-V1, the medium preferably comprises the compound PP-1-2V1, the medium preferably comprises compounds of the formulae I-1 to I-4 in an amount of 20 to 99% by weight in the mixture as a whole, the medium preferably comprises 1% by weight or more to 60% by weight or less, preferably 3% by weight or more to 50% by weight or less, particularly preferably 5% by weight or more to 45% by weight or less, of compounds of the formulae II and/or III, the medium preferably comprises 45% by weight or more to 80% by weight or less of compounds of the formulae I-1 to I-4, the medium preferably comprises 10% by weight or more to 40% by weight or less of compounds of the formula I-1, the medium preferably comprises 10% by weight or more to 40% by weight or less of compounds of the formula I-2, the medium preferably comprises 10% by weight or more to 40% by weight or less of compounds of the formula I-3, the medium preferably comprises 0% by weight or more to 40% by weight or less of compounds of the formula I-4.

In another preferred embodiment, in particular in view of PN-LC or PDLC applications, the polymerisable LC material may comprise additionally to the non-polymerisable nematic component, one or more dichroic dyes, which are preferably selected from the group of perylene dyes, anthrachinone dyes, and/or azo dyes that are known to the skilled person.

More preferably, the dichroic dyes are selected from the group of compounds of formula D,

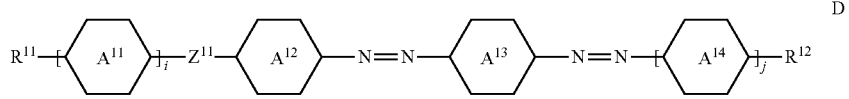

wherein,

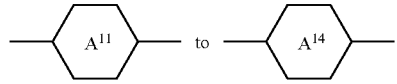

are at each occurrence, identically or differently, selected from

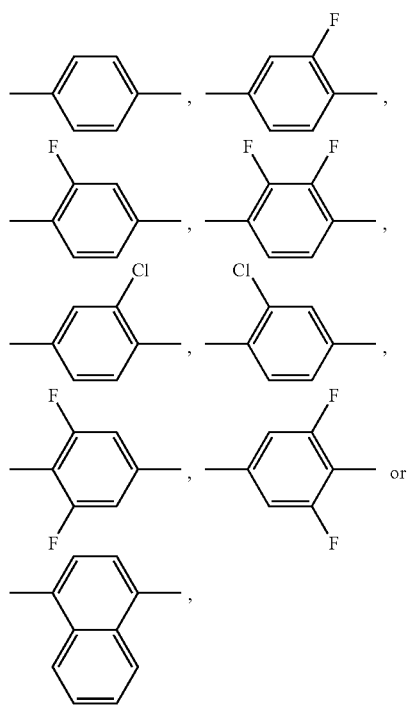

and, in case i is 2 or more, the terminal one of group

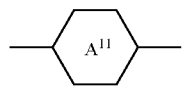

may also be

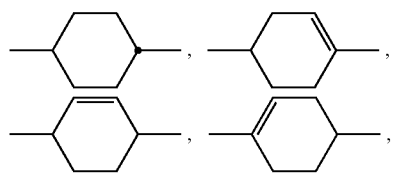

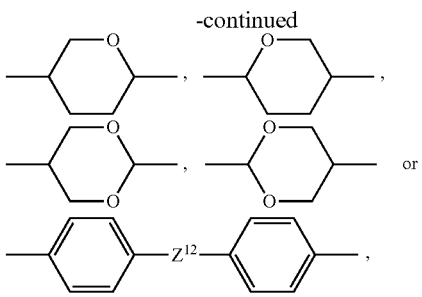

and, in case j is 2 or more, the terminal one of group

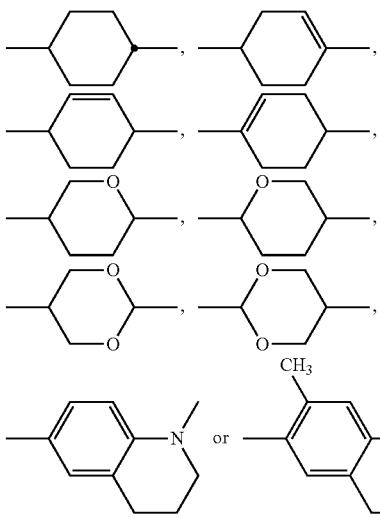

$Z^{11}$ and $Z^{12}$ are, independently of each other, —N=N—, —OCO— or —COO—, $R^{11}$ and $R^{12}$ are, independently of each other, alkyl, alkoxy, fluorinated alkyl or fluorinated alkoxy, alkenyl, alkenyloxy, alkoxyalkyl or fluorinated alkenyl, alkylaminyl, dialkylaminyl, alkylcarbonyl, alkyloxycarbonyl, alkylcarbonyloxy, alkyloxycarbonyloxy or alkylcyclohexylalkyl, and i and j are independently of each other 1, 2, 3 or 4.

In a preferred embodiment of the present invention, the liquid crystalline medium comprises one or more dichroic dyes preferably selected from the group of compounds of formulae D-1 to D-7,

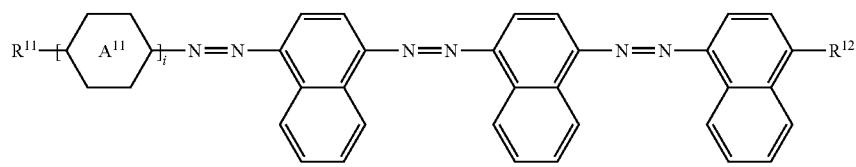 D-1
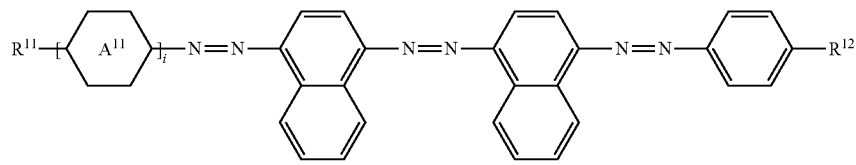 D-2
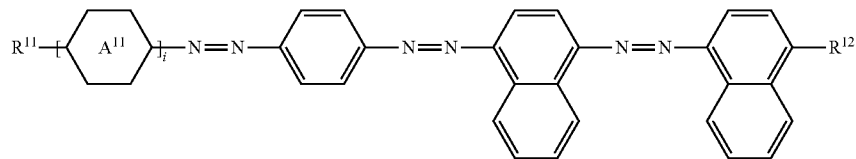 D-3
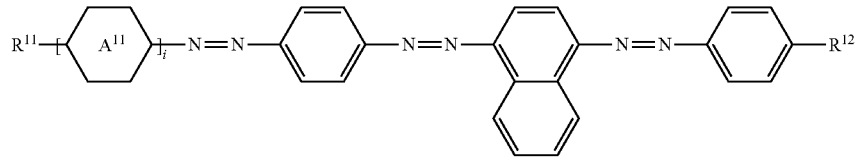 D-4
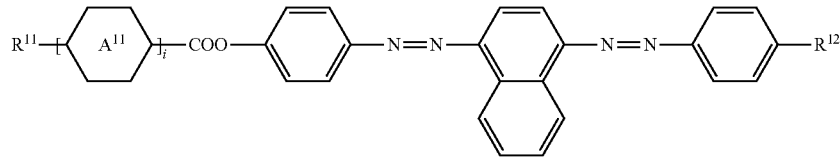 D-5
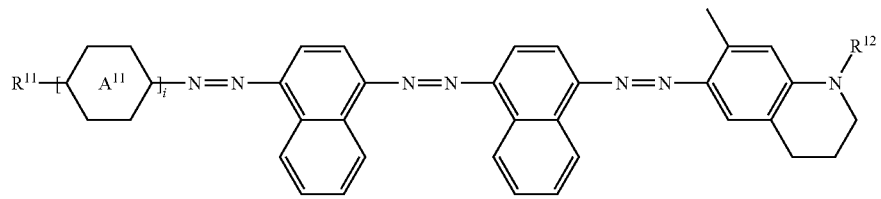 D-6
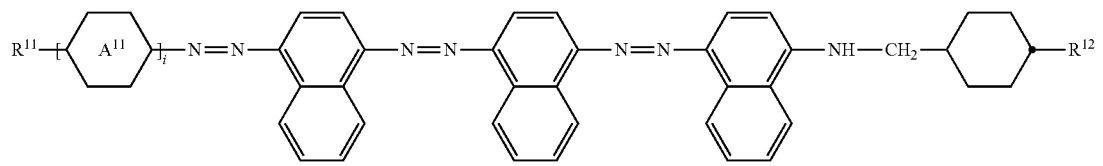 D-7
wherein the parameters have the respective meanings given under formula D above.

In a preferred embodiment of the present invention, the liquid crystalline medium comprises one or more dichroic dyes preferably selected from the group of compounds of formulae D'-1 to D'-7
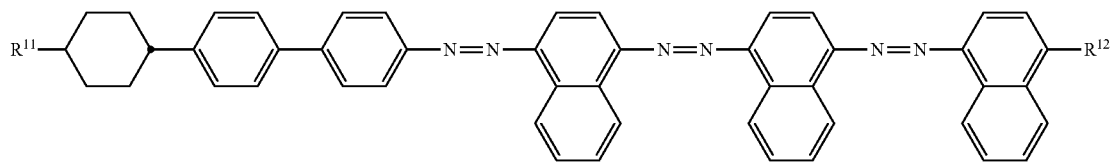
D'-1
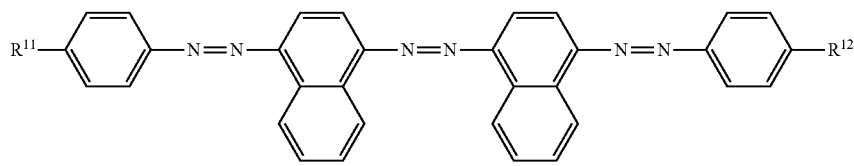
D'-2
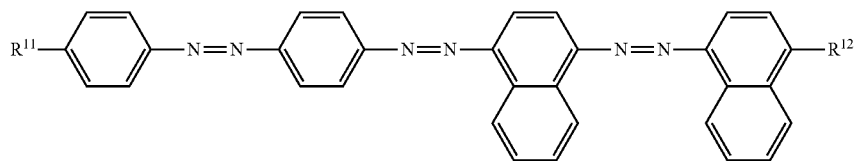
D'-3
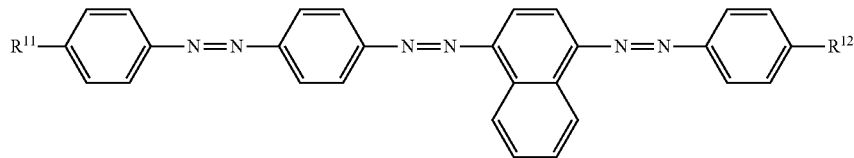
D'-4
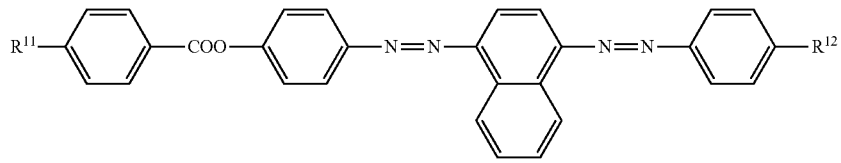
D'-5
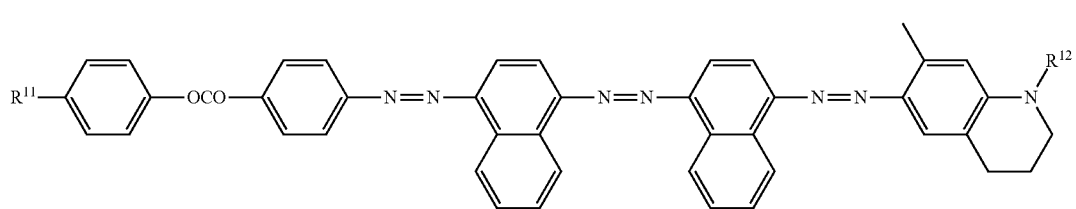
D'-6
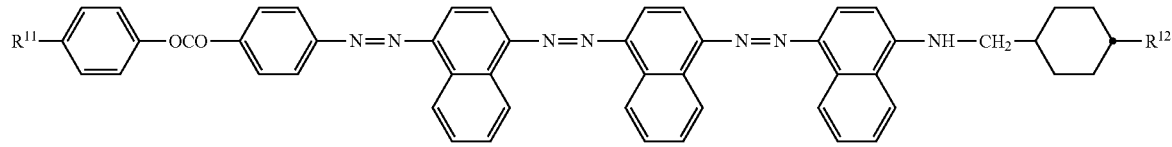
D'-7
wherein the parameters have the respective meanings given under formula D above.

Further preferred compounds of formula D are represented by the following formulae

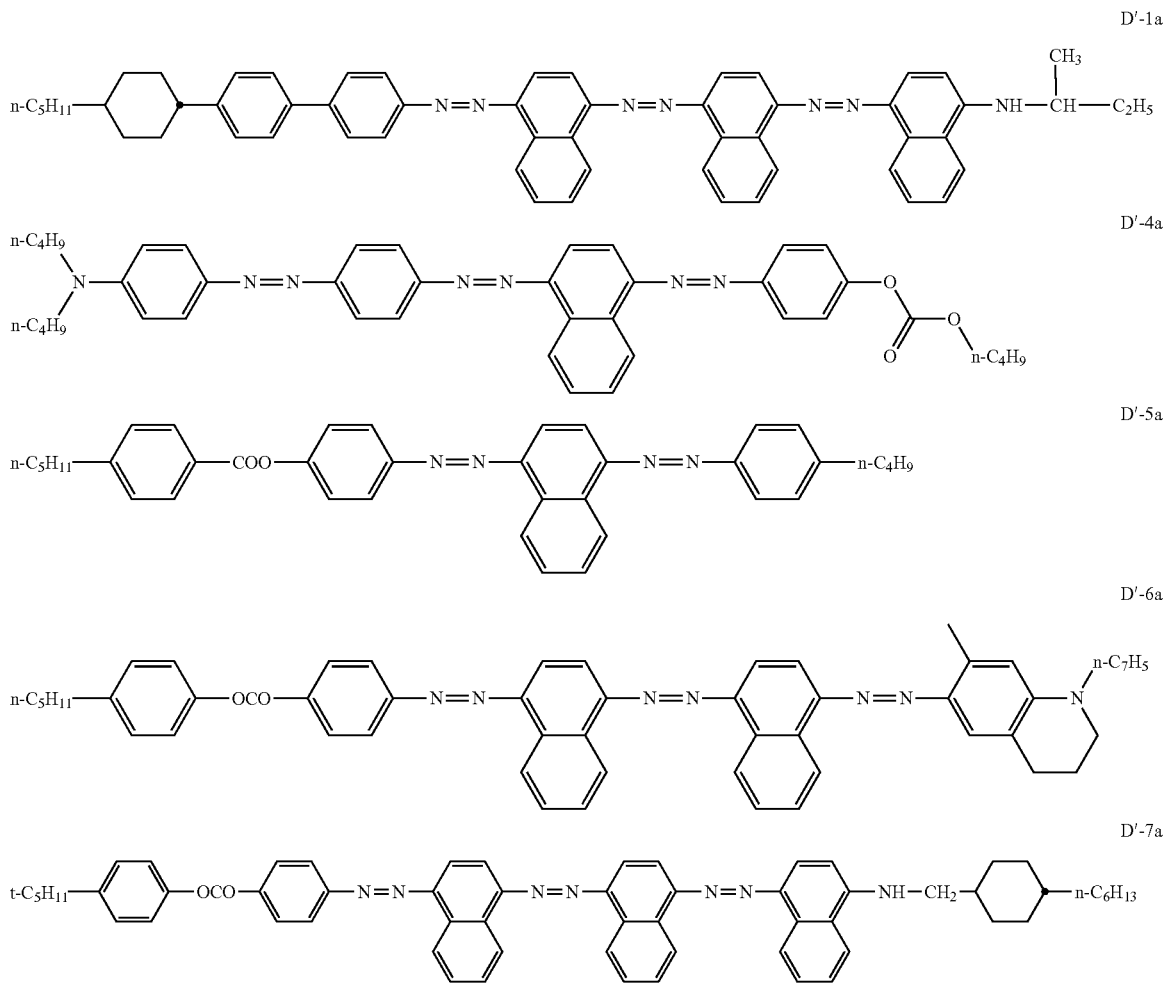

D'-1a

D'-4a

D'-5a

D'-6a

D'-7a

Preferably the concentration of the dichroic dyes in the medium is in the range from 0.1% to 5%, more preferably from 0.2% to 4%, even more preferably from 0.3% to 3%, most preferably from 0.5% to 2% and in particular about 1%.

The compounds of the formula D or its sub-formulae can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

In a preferred embodiment, the medium comprises a mixture of two or more, preferably of three or more dichroic dyes. Most preferably three dichroic dyes are at present. Preferably, the dichroic dyes have mutually complementing absorption spectra to each other, i. e. complementary absorption colours and are preferably mixed in a ratio relative to each other which results in a neutral colour of the combined absorption of the mixture, i. e. in a black appearance. This means that the absorption is almost constant over the visible spectral range.

For example, the spectral characteristic of a preferred combination of three compounds D'-1a, D'-4a and D'-5a are given in the following table:

|  | Dye No. | | |
|---|---|---|---|
|  | D'-1a<br>F593<br>ME-1107 | D'-4a<br>F355<br>ME-301 | D'-5a<br>F357<br>ME-540 |
| Absorption Spectrum in $CH_2Cl_2$ (1/100,000) | | | |
| $\lambda_{max}$/nm | 621 | 536 | 426 |
| $\Delta\lambda_{max}$/nm | ±2 | ±2 | ±2 |
| OD* | 0.620 | 0.785 | 0.520 |
| $\Delta$OD* | ±0.020 | ±0.020 | ±0.020 |
| Colour | Blue | Red | Yellow<br>(Orange) |
| Dichroic Properties | | | |
| Host LC§ No. ZLI- | 2903 | 2452 | |
| DR** | 16.2 | 13.7 | 13.0 |
| S*** | 0.83 | 0.81 | 0.80 |

*Optical Density: OD = $\log_{10} (I_i/I_t)$,
$I_i$ = Intensity of incident light,
$I_t$ = Intensity of transmitted light,
§ZLI-mixtures available from Merck KGaA, Germany,
**Dichroic Ratio of Dye in Host LC and
***Order Parameter of Dye in Host LC.

Preferably, the polymerisable LC material comprises besides one or more compounds of formula CO—1,
a) one or more di- or multireactive polymerisable mesogenic compounds,
b) optionally one or more monoreactive polymerisable mesogenic compounds,
c) optionally one or more antioxidative additives,
d) optionally one or more adhesion promotors,
e) optionally one or more surfactants,
f) optionally one or more stabilizers,
g) optionally one or more mono-, di- or multireactive polymerisable non-mesogenic compounds,
h) optionally one or more dyes showing an absorption maximum at the wavelength used to initiate photo polymerisation,
i) optionally one or more chain transfer agents,
j) optionally one or more stabilizers,
k) optionally one or more lubricants and flow auxiliaries, and
l) optionally one or more diluents,
m) optionally a non-polymerisable nematic component.

More preferably, the polymerisable LC material comprises,
a) one or more photoinitiators of formula CO—1, preferably selected from compounds of formulae CO—19 to CO—22, more preferably a compound of formula CO—19, preferably in an amount of 1 to 10% by weight, very preferably 2 to 8% by weight,
b) one or more, preferably two or more, direactive polymerisable mesogenic compounds, preferably in an amount, if present at all, of 10 to 90% by weight, very preferably 15 to 75% by weight, preferably selected from the compounds of formula DRMa-1,
c) optionally one or more, preferably two or more, monoreactive polymerisable mesogenic compounds, preferably in an amount of 10 to 95% by weight, very preferably 25 to 85%, preferably selected from compounds of formulae MRM-1 and/or MRM-7,
d) optionally one or more compounds of formula ND in the preferably in an amount of 0 to 50%, very preferably from 0 to 40%.
e) optionally one or more antioxidative additives, preferably selected from esters of unsubstituted and substituted benzoic acids, in particular Irganox®1076, and if present, preferably in an amount of 0.01 to 2% by weight, very preferably 0.05 to 1% by weight,
f) optionally one or more lubricants and flow auxiliaries, preferably selected from BYK®388, FC 4430 and/or Fluor N 562, and if present, preferably in an amount of 0.1 to 5% by weight, very preferably 0.2 to 3% by weight, and
g) optionally one or more diluents, preferably selected from n-dodecanol, if present, preferably in an amount of 0.1 to 5% by weight, very preferably 0.2 to 3% by weight, and
h) optionally a non-polymerisable nematic component, preferably comprising the compounds of formulae I to III, and N, if present, preferably in an amount of 20 to 99% by weight, very preferably 50 to 90% by weight.

The invention further relates to a method of preparing a polymer film by
providing a layer of a polymerisable LC material as described above and below onto a substrate,
polymerising the polymerisable components of the polymerisable LC material by photopolymerisation, and
optionally removing the polymerised LC material from the substrate and/or optionally providing it onto another substrate.

It is also possible to dissolve the polymerisable LC material in a suitable solvent.

In another preferred embodiment, the polymerisable LC material comprises one or more solvents, which are preferably selected from organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone. It is also possible to use binary, ternary or higher mixtures of the above solvents.

In case the polymerisable LC material contains one or more solvents, the total concentration of all solids, including the RMs, in the solvent(s) is preferably from 10 to 60%.

This solution is then coated or printed onto the substrate, for example by spin-coating, printing, or other known techniques, and the solvent is evaporated off before polymerisation. In most cases, it is suitable to heat the mixture in order to facilitate the evaporation of the solvent.

The polymerisable LC material can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable substrate materials and substrates are known to the expert and described in the literature, as for example conventional substrates used in the optical films industry, such as glass or plastic. Especially suitable and preferred substrates for polymerisation are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known colour filter materials.

The polymerisable LC material preferably exhibits a uniform alignment throughout the whole layer. Preferably the polymerisable LC material exhibits a uniform planar or a uniform homeotropic alignment.

The Friedel-Creagh-Kmetz rule can be used to predict whether a mixture will adopt planar or homeotropic alignment, by comparing the surface energies of the RM layer and the substrate:

If $\gamma_{RM} > \gamma_s$ the reactive mesogenic compounds will display homeotropic alignment, If $\gamma_{RM} < \gamma_s$ the reactive mesogenic compounds will display homeotropic alignment.

When the surface energy of a substrate is relatively low, the intermolecular forces between the reactive mesogens are stronger than the forces across the RM-substrate interface. Therefore, reactive mesogens align perpendicular to the substrate (homeotropic alignment) in order to maximise the intermolecular forces.

Homeotropic alignment can also be achieved by using amphiphilic materials; they can be added directly to the polymerisable LC material, or the substrate can be treated with these materials in the form of a homeotropic alignment layer. The polar head of the amphiphilic material chemically bonds to the substrate, and the hydrocarbon tail points perpendicular to the substrate. Intermolecular interactions between the amphiphilic material and the RMs promote homeotropic alignment. Commonly used amphiphilic surfactants are described above.

Another method used to promote homeotropic alignment is to apply corona discharge treatment to plastic substrates, generating alcohol or ketone functional groups on the substrate surface. These polar groups can interact with the polar groups present in RMs or surfactants to promote homeotropic alignment.

When the surface tension of the substrate is greater than the surface tension of the RMs, the force across the interface dominates. The interface energy is minimised if the reactive mesogens align parallel with the substrate, so the long axis of the RM can interact with the substrate. One way planar alignment can be promoted is by coating the substrate with a polyimide layer, and then rubbing the alignment layer with a velvet cloth.

Other suitable planar alignment layers are known in the art, like for example rubbed polyimide or alignment layers prepared by photoalignment as described in U.S. Pat. Nos. 5,602,661, 5,389,698 or 6,717,644.

In general, reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A further review of alignment materials and techniques is given by J. Cognard, Mol. Cryst. Liq. Cryst. 78, Supplement 1 (1981), pages 1-77.

For the production of the polymer films according to the invention, the polymerisable compounds in the polymerisable LC material are polymerised or crosslinked (if one compound contains two or more polymerisable groups) by in-situ photopolymerisation.

The photopolymerisation can be carried out in one step. It is also possible to photopolymerise or crosslink the compounds in a second step, which have not reacted in the first step ("end curing").

In a preferred method of preparation the polymerisable LC material is coated onto a substrate and subsequently photopolymerised for example by exposure to actinic radiation as described for example in WO 01/20394, GB 2,315,072 or WO 98/04651.

Photopolymerisation of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerisation is carried out by photo irradiation, in particular with UV light. As a source for actinic radiation, for example a single UV lamp or a set of UV lamps can be used. When using a high lamp power the curing time can be reduced. Another possible source for photo radiation is a laser, like e.g. a UV laser, an IR laser, or a visible laser.

The curing time is dependent, inter alia, on the reactivity of the polymerisable LC material, the thickness of the coated layer, the type of polymerisation initiator and the power of the UV lamp. The curing time is preferably ≤5 minutes, very preferably ≤3 minutes, most preferably ≤1 minute. For mass production, short curing times of ≤30 seconds are preferred.

A suitable UV radiation power is preferably in the range from 5 to 200 mWcm-2, more preferably in the range from 50 to 175 mWcm$^{-2}$ and most preferably in the range from 100 to 150 mWcm$^{-2}$.

In connection with the applied UV radiation and as a function of time, a suitable UV dose is preferably in the range from 25 to 7200 mJcm$^{-2}$ more preferably in the range from 500 to 7200 mJcm$^{-2}$ and most preferably in the range from 3000 to 7200 mJcm$^{-2}$.

Photopolymerisation is preferably performed under an inert gas atmosphere, preferably in a heated nitrogen atmosphere, but also polymerisation in air is possible.

Photopolymerisation is preferably performed at a temperature from 1 to 70° C., more preferably 5 to 50° C., even more preferably 15 to 30° C.

The polymerised LC film according to the present invention has good adhesion to plastic substrates, in particular to TAC, COP, and colour filters. Accordingly, it can be used as adhesive or base coating for subsequent LC layers which otherwise would not well adhere to the substrates.

The preferred thickness of a polymerised LC film according to the present invention is determined by the optical properties desired from the film or the final product. For example, if the polymerised LC film does not mainly act as an optical layer, but e.g. as adhesive, aligning or protection layer, its thickness is preferably not greater than 1 µm, in particular not greater than 0.5 µm, very preferably not greater than 0.2 µm.

For example, uniformly homeotropic or planar aligned polymer films of the present invention can be used as retardation or compensation films for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (in cell application).

For optical applications of the polymer film, it preferably has a thickness of from 0.5 to 10 µm, very preferably from 0.5 to 5 µm, in particular from 0.5 to 3 µm.

The optical retardation ($\delta(\lambda)$) of a polymer film as a function of the wavelength of the incident beam ($\lambda$) is given by the following equation (7):

$$\delta(\lambda)=(2\pi\Delta n \cdot d)/\lambda \tag{7}$$

wherein ($\Delta n$) is the birefringence of the film, (d) is the thickness of the film and $\lambda$ is the wavelength of the incident beam.

According to Snellius law, the birefringence as a function of the direction of the incident beam is defined as $$\Delta n=\sin \Theta/\sin \Psi \tag{8}$$

wherein $\sin \Theta$ is the incidence angle or the tilt angle of the optical axis in the film and $\sin \Psi$ is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

The birefringence ($\Delta n$) of the polymer film according to the present invention is preferably in the range from 0.01 to 0.30, more preferable in the range from 0.01 to 0.25 and even more preferable in the range from 0.01 to 0.16.

The optical retardation as a function of the thickness of the polymer film according to the present invention is less than 200 nm, preferable less than 180 nm and even more preferable less than 150 nm.

Especially with regard to the incell application, the polymer films according to the present invention exhibit a high temperature stability. Thus, the polymer films exhibit temperature stability up to 300° C., preferably up to 250° C., more preferably up to 230° C.

The polymer film of the present invention can also be used as alignment film for other liquid-crystalline or RM materials. For example, they can be used in an LCD to induce or improve alignment of the switchable liquid-crystalline medium, or to align a subsequent layer of polymerisable LC material coated thereon. In this way, stacks of polymerised LC films can be prepared.

In summary, the polymerised LC films and polymerisable LC materials according to the present invention are useful in optical elements like polarisers, compensators, alignment layer, circular polarisers or colour filters in liquid crystal displays or projection systems, decorative images, for the preparation of liquid crystal or effect pigments, and especially in reflective films with spatially varying reflection colours, e.g. as multicolour image for decorative, information storage or security uses, such as non-forgeable documents like identity or credit cards, banknotes etc.

The polymerised LC films according to the present invention can be used in displays of the transmissive or reflective type. They can be used in conventional OLED displays or LCDs, in particular LCDs of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB, and pi-cell displays.

The polymerisable LC material and polymer films according to the present invention are especially useful for a 3D display as described in EP 0 829 744, EP 0 887 666 A2, EP 0 887 692, U.S. Pat. Nos. 6,046,849, 6,437,915 and in "Proceedings o the SID 20$^{th}$ International Display Research Conference, 2000", page 280. A 3D display of this type comprising a polymer film according to the invention is another object of the present invention.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

In the present application and especially in the following examples, the structures of the liquid crystal compounds are represented by abbreviations, which are also called "acronyms". The transformation of the abbreviations into the corresponding structures is straightforward according to the following three tables A to C. Table A lists the symbols used for the ring elements, table B those for the linking groups and table C those for the symbols for the left hand and the right hand end groups of the molecules.

All groups $C_nH_{2n+1}$, $C_mH_{2m+1}$, and $C_lH_{2l+1}$ are preferably straight chain alkyl groups with n, m and l C-atoms, respectively, all groups $C_nH_{2n}$, $C_mH_{2m}$ and $C_lH_{2l}$ are preferably $(CH_2)_n$, $(CH_2)_m$ and $(CH_2)_l$, respectively and —CH=CH— preferably is trans-respectively E vinylene.

TABLE A

| Ring Elements | |
|---|---|
| 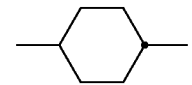 | C |
| 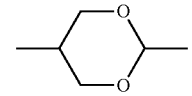 | D |
| 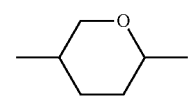 | A |
| 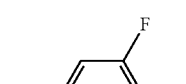 | G |
| 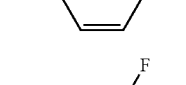 | U |

TABLE A-continued
| Ring Elements | |
|---|---|
| 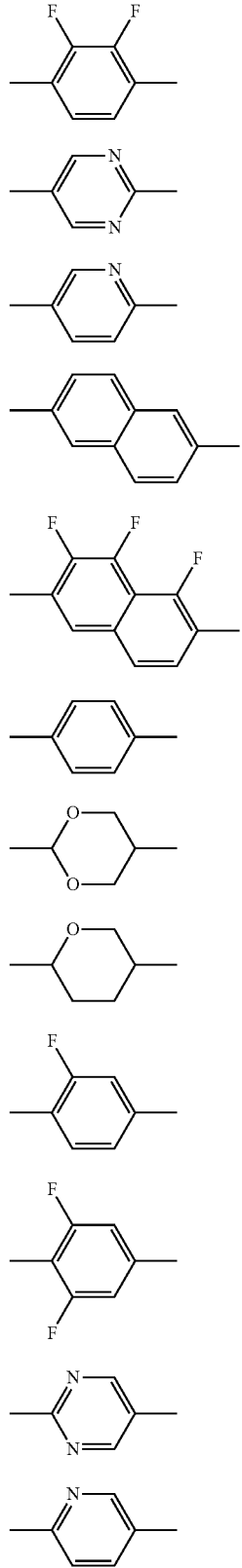 | Y |
| | M |
| | N |
| | np |
| | n3f |
| | P |
| | DI |
| | AI |
| | GI |
| | UI |
| | MI |
| | NI |
TABLE A-continued
| Ring Elements | |
|---|---|
| 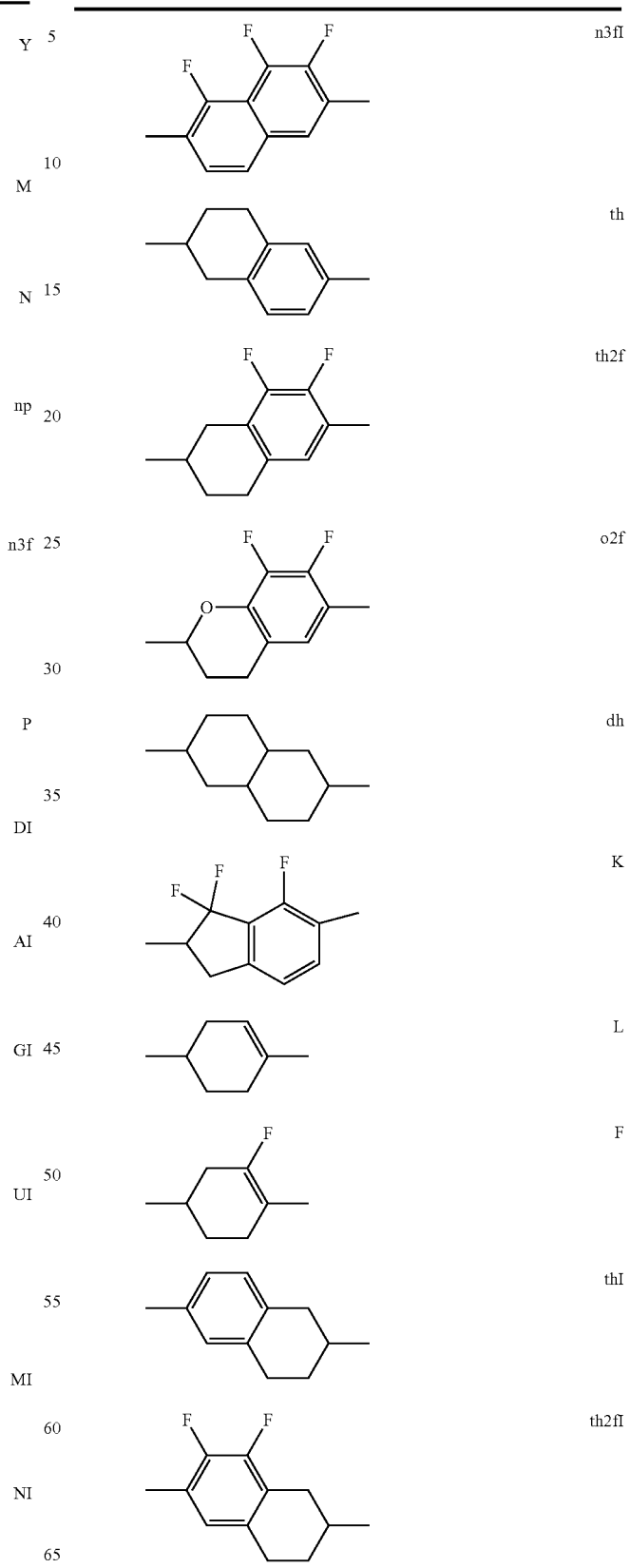 | n3fI |
| | th |
| | th2f |
| | o2f |
| | dh |
| | K |
| | L |
| | F |
| | thI |
| | th2fI |

TABLE A-continued

Ring Elements

| Code | Structure |
|---|---|
| o2fI | (chroman with 7,8-difluoro, 2,6-dimethyl) |
| KI | (indane with 1,1-difluoro, 2,6-dimethyl, 7-fluoro) |
| LI | (cyclohexene, 1,4-dimethyl) |
| FI | (cyclohexene with fluoro and two methyl groups) |

TABLE B

Linking Groups

| | | | |
|---|---|---|---|
| E | —$CH_2$—$CH_2$— | | |
| V | —CH=CH— | | |
| T | —C≡C— | | |
| W | —$CF_2$—$CF_2$— | | |
| B | —CF=CF— | | |
| Z | —CO—O— | ZI | —O—CO— |
| X | —CF=CH— | XI | —CH=CF— |
| O | —$CH_2$—O— | OI | —O—$CH_2$— |
| Q | —$CF_2$—O— | QI | —O—$CF_2$— |

TABLE C

End Groups

| Left hand side, used alone or in combination with others | | Right hand side, used alone or in combination with others | |
|---|---|---|---|
| -n- | $C_nH_{2n+1}$— | -n | —$C_nH_{2n+1}$ |
| -nO- | $C_nH_{2n+1}$—O— | -nO | —O—$C_nH_{2n+1}$ |
| —V— | $CH_2$=CH— | —V | —CH=$CH_2$ |
| -nV- | $C_nH_{2n+1}$—CH=CH— | -nV | —$C_nH_{2n}$—CH=$CH_2$ |
| -Vn- | $CH_2$=CH— $C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2O$— | —OM | —$OCFH_2$ |
| —DO— | $CF_2HO$— | —OD | —$OCF_2H$ |
| —TO— | $CF_3O$— | —OT | —$OCF_3$ |
| —A— | H—C≡C— | —A | —C≡C—H |
| —nA— | $C_nH_{2n+1}$—C≡C— | —An | —C≡C—$C_nH_{2n+1}$ |
| —NA— | N≡C—C≡C— | —AN | —C≡C—C≡N |

| Left hand side, used in combination with others only | | Right hand side, used in combination with others only | |
|---|---|---|---|
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each are integers and three points " . . . " indicate a space for other symbols of this table.

EXAMPLES

The invention will now be described in more detail by reference to the following working examples, which are illustrative only and do not limit the scope of the invention.

Utilized Photoinitiators

| Compound | Tradename |
|---|---|
| [structure: 9,9-dimethylfluorene with oxime acetate ketone substituent] | SPI-02 |
| [structure: 9,9-diethylfluorene with oxime acetate ketone substituent] | SPI-03 |
| [structure: 9,9-diethylfluorene with oxime propanoate ketone substituent] | SPI-04 |
| 2-Methyl-4'-(methylthio)-2-morpholinopropiophenone | Irgacure 907 |
| Diphenyl(2,4,6-trimethylbenzoyl)phosphine oxide | Darocure TPO |
| [structure: carbazole-based oxime ester with dioxolane group] | N-1919 |

Utilized Mixtures

| Mixture M1 | |
|---|---|
| Compound | Amount %-w/w |
| Irganox1076 | 0.08 |
| $CH_2$=CHCOO$(CH_2)_6$O—[phenyl]—COO—[phenyl]—CN | 19.98 |

Mixture M1

| Compound | Amount %-w/w |
|---|---|
| CH₂=CHCO₂(CH₂)₆O—⟨phenyl⟩—COO—⟨phenyl-3-CH₃⟩—OOC—⟨phenyl⟩—O(CH₂)₆O₂CCH=CH₂ | 22.48 |
| CH₂=CHCO₂(CH₂)₃O—⟨phenyl⟩—COO—⟨phenyl-3-CH₃⟩—OOC—⟨phenyl⟩—O(CH₂)₃O₂CCH=CH₂ | 22.48 |
| CH₂=CHCOO(CH₂)₆O—⟨phenyl⟩—COO—⟨phenyl⟩—⟨cyclohexyl⟩—C₃H₇ | 34.98 |

Mixture M2

| Compound | Amount %-w/w |
|---|---|
| Irganox1076 | 0.08 |
| CH₂=CHCOO(CH₂)₆O—⟨phenyl⟩—COO—⟨phenyl⟩—CN | 19.69 |
| CH₂=CHCO₂(CH₂)₆O—⟨phenyl⟩—COO—⟨phenyl-3-CH₃⟩—OOC—⟨phenyl⟩—O(CH₂)₆O₂CCH=CH₂ | 16.58 |
| CH₂=CHCO₂(CH₂)₃O—⟨phenyl⟩—COO—⟨phenyl-3-CH₃⟩—OOC—⟨phenyl⟩—O(CH₂)₃O₂CCH=CH₂ | 16.58 |
| CH₂=CHCOO(CH₂)₆O—⟨phenyl⟩—COO—⟨phenyl⟩—⟨cyclohexyl⟩—C₃H₇ | 47.07 |

Mixture M3

| Compound | Amount %-w/w |
|---|---|
| FluorN 561 | 0.43 |
| Irganox 1076 | 0.12 |
| CH₂=CHCO₂(CH₂)₄OOCO—⟨phenyl⟩—COO—⟨phenyl-3-CH₃⟩—OOC—⟨phenyl⟩—OCOO(CH₂)₄O₂CCH=CH₂ | 29.68 |

-continued

Mixture M3

| Compound | Amount %-w/w |
|---|---|
| CH₂=CHCOO(CH₂)₆O—⟨phenyl⟩—COO—⟨phenyl⟩—⟨cyclohexyl⟩—C₃H₇ | 16.16 |
| CH₂=CHCO₂(CH₂)₆O—⟨phenyl⟩—OOC—⟨cyclohexyl⟩—COO—⟨phenyl⟩—O(CH₂)₆O₂CCH=CH₂ | 16.24 |
| Complex branched mesogenic acrylate compound | 37.37 |

Experiment 1.1

Base mixture M1 is mixed with 1% SPI-02 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 83.06% of the initial $R_{th}$ value.

Experiment 1.2

Base mixture M1 is mixed with 1% SPI-03 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 88.94% of the initial $R_{th}$ value.

Experiment 1.3

Base mixture M1 is mixed with 1% SPI-04 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 87.59% of the initial $R_{th}$ value.

Summary

| Exp. | Base Mixture | Photoinitiator | Photoinitiator Amount | Curing Atmosphere | % of initial $R_{th}$ |
|---|---|---|---|---|---|
| 1.1 | M1 | SPI-02 | 1% | $N_2$ | 83.06 |
| 1.2 | M1 | SPI-03 | 1% | $N_2$ | 88.94 |
| 1.3 | M1 | SPI-04 | 1% | $N_2$ | 87.59 |

Experiment 2.1

Base mixture M1 is mixed with 2.5% SPI-02 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 82.72% of the initial $R_{th}$ value.

Experiment 2.2

Base mixture M1 is mixed with 2.5% SPI-03 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 90.18% of the initial $R_{th}$ value.

Experiment 2.3

Base mixture M1 is mixed with 2.5% SPI-04 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm.

The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 79.45% of the initial $R_{th}$ value.

Comparative Experiment 2.4

Base mixture M1 is mixed with 2.5% N—1919 T (commercially available from Adeka, Japan) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 88.29% of the initial $R_{th}$ value.

Summary

| Exp. | Base Mixture | Photoinitiator | Photoinitiator Amount | Curing Atmosphere | % of initial $R_{th}$ |
|---|---|---|---|---|---|
| 2.1 | M1 | SPI-02 | 2.5% | $N_2$ | 82.72 |
| 2.2 | M1 | SPI-03 | 2.5% | $N_2$ | 90.18 |

-continued

| Exp. | Base Mixture | Photoinitiator | Photoinitiator Amount | Curing Atmosphere | % of initial $R_{th}$ |
|---|---|---|---|---|---|
| 2.3 | M1 | SPI-04 | 2.5% | $N_2$ | 79.45 |
| 2.4* | M1 | N-1919 T | 2.5% | $N_2$ | 88.29 |

*Comparative experiment

Experiment 3.1

Base mixture M1 is mixed with 4.5% SPI-02 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 82.30% of the initial $R_{th}$ value.

Experiment 3.2

Base mixture M1 is mixed with 4.5% SPI-03 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 91.25% of the initial $R_{th}$ value.

Experiment 3.3

Base mixture M1 is mixed with 4.5% SPI-04 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 91.40% of the initial $R_{th}$ value.

Comparative Experiment 3.4

Base mixture M1 is mixed with 5% Irgacure® 907 (commercially available from CIBA, Switzerland) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 87.89% of the initial $R_{th}$ value.

Summary

| Exp. | Base Mixture | Photoinitiator | Photoinitiator Amount | Curing Atmosphere | % of initial $R_{th}$ |
|---|---|---|---|---|---|
| 3.1 | M1 | SPI-02 | 4.5% | $N_2$ | 82.30 |
| 3.2 | M1 | SPI-03 | 4.5% | $N_2$ | 91.25 |
| 3.3 | M1 | SPI-04 | 4.5% | $N_2$ | 91.40 |
| 3.4* | M1 | Irg. 907 | 5.0% | $N_2$ | 87.89 |

*Comparative experiment

Experiment 4.1

Base mixture M1 is mixed with 4.5% SPI-02 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured in air using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 80.98% of the initial $R_{th}$ value.

Experiment 4.2

Base mixture M1 is mixed with 4.5% SPI-03 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured in air using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 90.17% of the initial $R_{th}$ value.

Experiment 4.3

Base mixture M1 is mixed with 4.5% SPI-04 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured in air using a static fusion UV system (800 mW, 700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 91.45% of the initial $R_{th}$ value.

Comparative Experiment 4.4

Base mixture M1 is mixed with 5% Irgacure® 907 (commercially available from CIBA, Switzerland) and dissolved in to 20% solids in toluene.

The solution is spin coated at 2000 rpm on a raw glass substrate which is coated with rubbed PI. The film is annealed at 60° C. for 60 second and cured in air using a static fusion UV system (800 mW, 700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm.

The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 85.85% of the initial $R_{th}$ value.

Summary

| Exp. | Base Mixture | Photoinitiator | Photoinitiator Amount | Curing Atmosphere | % of initial $R_{th}$ |
|---|---|---|---|---|---|
| 4.1 | M1 | SPI-02 | 4.5% | Air | 80.98 |
| 4.2 | M1 | SPI-03 | 4.5% | Air | 90.17 |
| 4.3 | M1 | SPI-04 | 4.5% | Air | 91.45 |
| 4.4* | M1 | Irg. 907 | 5.0% | Air | 85.85 |

*Comparative experiment

Experiment 5.1

Base mixture M2 is mixed with 1% SPI-02 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 79.86% of the initial $R_{th}$ value.

Experiment 5.2

Base mixture M2 is mixed with 1% SPI-03 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 87.35% of the initial $R_{th}$ value.

Experiment 5.3

Base mixture M2 is mixed with 1% SPI-04 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 86.24% of the initial $R_{th}$ value.

Summary

| Exp. | Base Mixture | Photoinitiator | Photoinitiator Amount | Curing Atmosphere | % of initial $R_{th}$ |
|---|---|---|---|---|---|
| 5.1 | M2 | SPI-02 | 1% | $N_2$ | 79.86 |
| 5.2 | M2 | SPI-03 | 1% | $N_2$ | 87.35 |
| 5.3 | M2 | SPI-04 | 1% | $N_2$ | 86.24 |

Experiment 6.1

Base mixture M2 is mixed with 2.5% SPI-02 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 91.29% of the initial $R_{th}$ value.

Experiment 6.2

Base mixture M2 is mixed with 2.5% SPI-03 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 91.00% of the initial $R_{th}$ value.

Experiment 6.3

Base mixture M2 is mixed with 2.5% SPI-04 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 90.04% of the initial $R_{th}$ value.

Comparative Experiment 6.4

Base mixture M1 is mixed with 2.5% N—1919 T (commercially available from Adeka, Japan) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 83.86% of the initial $R_{th}$ value.

Summary

| Exp. | Base Mixture | Photoinitiator | Photoinitiator Amount | Curing Atmosphere | % of initial $R_{th}$ |
|---|---|---|---|---|---|
| 6.1 | M2 | SPI-02 | 2.5% | $N_2$ | 91.29 |
| 6.2 | M2 | SPI-03 | 2.5% | $N_2$ | 91.00 |
| 6.3 | M2 | SPI-04 | 2.5% | $N_2$ | 90.04 |
| 6.4* | M2 | N-1919 T | 2.5% | $N_2$ | 83.86 |

*Comparative experiment

Experiment 7.1

Base mixture M2 is mixed with 4.5% SPI-02 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 91.27% of the initial $R_{th}$ value.

Experiment 7.2

Base mixture M2 is mixed with 4.5% SPI-03 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 90.45% of the initial $R_{th}$ value.

Experiment 7.3

Base mixture M2 is mixed with 4.5% SPI-04 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 90.48% of the initial $R_{th}$ value.

Comparative Experiment 7.4

Base mixture M2 is mixed with 5% Irgacure® 907 (commercially available from CIBA, Switzerland) and dissolved in to 20% solids in toluene.

The solution is spin coated at 2000 rpm on a raw glass substrate which is coated with rubbed PI. The film is annealed at 60° C. for 60 second and cured under a N2 atmosphere using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 86.96% of the initial $R_{th}$ value.

Summary

| Exp. | Base Mixture | Photoinitiator | Photoinitiator Amount | Curing Atmosphere | % of initial $R_{th}$ |
|---|---|---|---|---|---|
| 7.1 | M2 | SPI-02 | 4.5% | $N_2$ | 91.27 |
| 7.2 | M2 | SPI-03 | 4.5% | $N_2$ | 90.45 |
| 7.3 | M2 | SPI-04 | 4.5% | $N_2$ | 90.48 |
| 7.4* | M2 | Irg. 907 | 5.0% | $N_2$ | 86.96 |

*Comparative experiment

Experiment 8.1

Base mixture M2 is mixed with 4.5% SPI-02 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured in air using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 91.54% of the initial $R_{th}$ value.

Experiment 8.2

Base mixture M2 is mixed with 4.5% SPI-03 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured in air using a static fusion UV system (800 mW, 700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 91.12% of the initial $R_{th}$ value.

Experiment 8.3

Base mixture M2 is mixed with 4.5% SPI-04 (commercially available from Samyang, Korea) and dissolved in to 20% solids in toluene.

The solution is spin coated at 2000 rpm on a raw glass substrate which is coated with rubbed PI. The film is annealed at 60° C. for 60 second and cured in air using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 91.96% of the initial $R_{th}$ value.

Comparative Experiment 8.4

Base mixture M2 is mixed with 5% Irgacure® 907 (commercially available from CIBA, Switzerland) and dissolved in to 20% solids in toluene.

The solution is spin coated at 2000 rpm on a raw glass substrate which is coated with rubbed PI. The film is annealed at 60° C. for 60 second and cured in air using a static fusion UV system (800 mW, ~700 mJ).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm.

The film is then placed in an oven at 80° C. for a total time of 2 h. After 2 h, the film is taken out of the oven and cooled to room temperature before recording the retardation profile again. The durability is quantified by the difference in $R_{th}$ before and after the oven test and results in 82.07% of the initial $R_{th}$ value.

Summary

| Exp. | Base Mixture | Photoinitiator | Photoinitiator Amount | Curing Atmosphere | % of initial $R_{th}$ |
|---|---|---|---|---|---|
| 8.1 | M2 | SPI-02 | 4.5% | Air | 91.54 |
| 8.2 | M2 | SPI-03 | 4.5% | Air | 91.12 |
| 8.3 | M2 | SPI-04 | 4.5% | Air | 91.96 |
| 8.4* | M2 | Irg. 907 | 5.0% | Air | 82.07 |

*Comparative experiment

Experiment 9.1

Base mixture M3 is mixed with 1% SPI-02 (commercially available from Samyang, Korea) and dissolved in to 33% solids in toluene/cyclohexanone (7/3).

The solution is spin coated at 2000 rpm for 30 seconds on a raw glass substrate which is coated with rubbed PI. The film is annealed at 66° C. for 60 seconds and cured under a N2 atmosphere using a fusion H bulb lamp (50% power, 10 m/min).

The film is laminated to a pressure sensitive adhesive and left with an open surface so the total film stack is glass/polymer film/pressure sensitive adhesive and the film is subjected to the durability experiment.

To measure the retardation ($R_{in}$) of each cured film, Axoscan ellipsometer is used. $R_{in}$ is analysed using a light source with a wavelength of 550 nm. To determine the retardation dispersion $R_{in-450}/R_{in-550}$, the retardation of the material is measured at wavelengths of 450 nm and 550 nm. Each film is then placed in an oven at 100° C. for a total time of 1 h. After 1 h, the film is taken out of the oven and cooled to room temperature before recording the retardation profiles again. The durability is quantified by the difference in $R_{in}$ and $R_{in-450}/R_{in-550}$ before and after the oven test and results in 84.00% of the initial $R_{in}$ value and 90.3% of the initial $R_{in-450}/R_{in-550}$ value.

Experiment 9.2

Base mixture M3 is mixed with 1% SPI-03 (commercially available from Samyang, Korea) and dissolved in to 33% solids in toluene/cyclohexanone (7/3).

The solution is spin coated at 2000 rpm for 30 seconds on a raw glass substrate which is coated with rubbed PI. The film is annealed at 66° C. for 60 seconds and cured under a N2 atmosphere using a fusion H bulb lamp (50% power, 10 m/min).

The film is laminated to a pressure sensitive adhesive and left with an open surface so the total film stack is glass/polymer film/pressure sensitive adhesive and the film is subjected to the durability experiment.

To measure the retardation ($R_{in}$) of each cured film, Axoscan ellipsometer is used. $R_{in}$ is analysed using a light source with a wavelength of 550 nm. To determine the retardation dispersion $R_{in-450}/R_{in-550}$, the retardation of the material is measured at wavelengths of 450 nm and 550 nm. Each film is then placed in an oven at 100° C. for a total time of 1 h. After 1 h, the film is taken out of the oven and cooled to room temperature before recording the retardation profiles again. The durability is quantified by the difference in $R_{in}$ and $R_{in-450}/R_{in-550}$ before and after the oven test and results in 96.70% of the initial $R_{40}$ value and 97.30% of the initial $R_{in-450}/R_{in-550}$ value.

Experiment 9.3

Base mixture M3 is mixed with 1% SPI-03 (commercially available from Samyang, Korea) and dissolved in to 33% solids in toluene/cyclohexanone (7/3).

The solution is spin coated at 2000 rpm for 30 seconds on a raw glass substrate which is coated with rubbed PI. The film is annealed at 66° C. for 60 seconds and cured under a N2 atmosphere using a using static fusion H bulb lamp (50% power, 10 m/min).

The film is laminated to a pressure sensitive adhesive and left with an open surface so the total film stack is glass/polymer film/pressure sensitive adhesive and the film is subjected to the durability experiment.

To measure the retardation ($R_{in}$) of each cured film, Axoscan ellipsometer is used. $R_{in}$ is analysed using a light source with a wavelength of 550 nm. To determine the retardation dispersion $R_{in-450}/R_{in-550}$, the retardation of the material is measured at wavelengths of 450 nm and 550 nm. Each film is then placed in an oven at 100° C. for a total time of 1 h. After 1 h, the film is taken out of the oven and cooled to room temperature before recording the retardation profiles again. The durability is quantified by the difference in $R_{in}$ and $R_{in\text{-}450}/R_{in\text{-}550}$ before and after the oven test and results in 96.40% of the initial $R_{in}$ value and 97.30% of the initial $R_{in\,-450}/R_{in\,-550}$ value.

Comparative Experiment 9.4

Base mixture M3 is mixed with 1% Darocure TPO (commercially available from CIBA, Switzerland) and dissolved in to 33% solids in toluene/cyclohexanone (7/3).

The solution is spin coated at 2000 rpm for 30 seconds on a raw glass substrate which is coated with rubbed PI. The film is annealed at 66° C. for 60 seconds and cured under a N2 atmosphere using a fusion H bulb lamp (50% power, 10 m/min).

The film is laminated to a pressure sensitive adhesive and left with an open surface so the total film stack is glass/polymer film/pressure sensitive adhesive and the film is subjected to the durability experiment.

To measure the retardation ($R_{in}$) of each cured film, Axoscan ellipsometer is used. $R_{in}$ is analysed using a light source with a wavelength of 550 nm. To determine the retardation dispersion $R_{in\text{-}450}/R_{in\text{-}550}$, the retardation of the material is measured at wavelengths of 450 nm and 550 nm. Each film is then placed in an oven at 100° C. for a total time of 1 h. After 1 h, the film is taken out of the oven and cooled to room temperature before recording the retardation profiles again. The durability is quantified by the difference in $R_{in}$ and $R_{in\text{-}450}/R_{in\text{-}550}$ before and after the oven test and results in 83.90% of the initial $R_{in}$ value and 90.20% of the initial $R_{in\text{-}450}/R_{in\text{-}550}$ value.

Summary

| Exp. | Base Mixture | Photo-initiator | Photo-initiator Amount | Curing Atmosphere | % of initial $R_{in}$ | % of initial $R_{450/550}$ |
|---|---|---|---|---|---|---|
| 9.1 | M3 | SPI-02 | 1% | $N_2$ | 84.00 | 90.3 |
| 9.2 | M3 | SPI-03 | 1% | $N_2$ | 96.70 | 97.3 |
| 9.3 | M3 | SPI-04 | 1% | $N_2$ | 96.4 | 97.3 |
| 9.4* | M3 | Darocure TPO | 1% | $N_2$ | 83.9 | 90.2 |

*Comparative experiment

The invention claimed is:

1. A polymerisable LC material comprising at least one di- or multireactive mesogenic compound, at least one compound of formula CO-1,

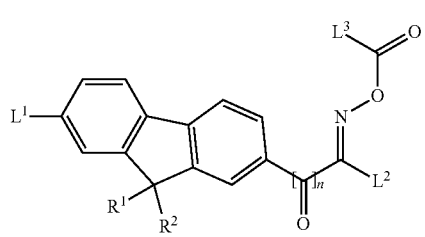

CO-1 wherein
$R^1$ and $R^2$ each denote alkyl, alkoxy or mono- oligo- or polyfluorinated alkyl or alkoxy,
$L^1$ denotes H, alkyl, alkoxy, thioalkyl, alkylcarbonyl, alkoxycarbonyl, alkylcarbonyloxy or alkoxycarbonyloxy; halogen, CN, OCN, SCN, or mono- oligo- or polyfluorinated alkyl or alkoxy atoms; or -(Sp$^{31}$-A$^{31}$),
$L^2$ and $L^3$ each denote H, alkyl, mono- oligo- or polyfluorinated alkyl, or -(Sp$^{31}$-A$^{31}$),
Sp$^{31}$ denotes a $C_1$-$C_{12}$ alkylene radical or a single bond,
A$^{31}$ denotes an aryl, heteroaryl, (non-aromatic) alicyclic or heterocyclic group, each optionally having one or more substituents, which are selected from the group consisting of silyl, sulfo, sulfonyl, formyl, amine, imine, nitrile, mercapto, nitro, halogen, $C_{1\text{-}12}$ alkyl, $C_{6\text{-}12}$ aryl, $C_{1\text{-}12}$ alkoxy, hydroxyl, and combinations of these groups, and
n denotes 1, and
at least one monoreactive mesogenic compound of the formula

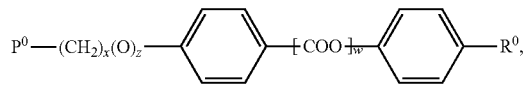

MRM1 wherein
$P^0$ is, in case of multiple occurrence independently of one another, an acryl, methacryl, oxetane, epoxy, vinyl, heptadiene, vinyloxy, propenyl ether or styrene group,
x is 0 or identical or different integers from 1 to 12,
z is each and independently, 0 or 1, with z being 0 if the adjacent x is 0,
$R^0$ is alkyl, alkoxy, thioalkyl, alkylcarbonyl, alkoxycarbonyl, alkylcarbonyloxy or alkoxycarbonyloxy with 1 to 15 C atoms for the alkyl and alkoxy portions or denotes $Y^0$,
$Y^0$ is F, Cl, CN, NO$_2$, OCH$_3$, OCN, SCN, SF$_5$, or mono- oligo- or polyfluorinated alkyl or alkoxy with 1 to 4 C atoms,
w is 0 or 1,
wherein benzene rings are optionally additionally substituted with one or more identical or different groups L, and
L is P-Sp-, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^{00}$, —NR$^{00}$R$^{000}$, —OH, —SF$_5$, optionally substituted silyl, aryl with 6 to 25 C atoms or heteroaryl with 2 to 25 C atoms, straight chain or branched alkyl, alkoxy, alkylcarbonyl, alkoxycarbonyl, alkylcarbonyloxy or alkoxycarbonyloxy with 1 to 12 C atoms for the alkyl or alkoxy portions of the straight chain groups and 3-12 atoms for the alkyl or alkoxy portions of the branched groups, wherein one or more H atoms are optionally replaced by F or Cl,
P is a polymerizable group,
Sp is a spacer group or a single bond, and
R$^{00}$ and R$^{000}$ independently of each other denote H or alkyl with 1 to 12 C-atoms,
and additionally at least one polymerizable compound of formula ND

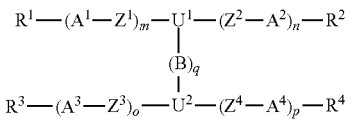

ND wherein
U$^{1,2}$ are independently of each other selected from the group consisting of

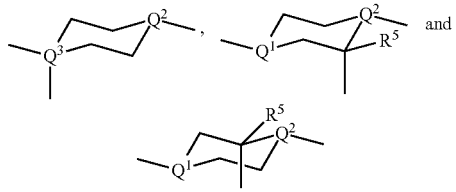

including their mirror images, wherein the rings U$^1$ and U$^2$ are each bonded to the group —(B)$_q$— via the axial bond, and one or two non-adjacent CH$_2$ groups in these rings are optionally replaced by O and/or S, and the rings U$^1$ and U$^2$ are optionally substituted by one or more groups L,
Q$^{1,2}$ are independently of each other CH or SiH,
Q$^3$ is C or Si,
B is in each occurrence independently of one another —C≡C—, —CY$^1$=CY$^2$— or an optionally substituted aromatic or heteroaromatic group,
Y$^{1,2}$ are independently of each other H, F, Cl, CN or R$^0$,
q is an integer from 1 to 10, preferably 1, 2, 3, 4, 5, 6 or 7,
A$^{1-4}$ are independently of each other non-aromatic, aromatic or heteroaromatic carbocyclic or heterocyclic groups, which are optionally substituted by one or more groups R$^5$, and wherein each of -(A$^1$-Z$^1$)$_m$—U$^1$—(Z$^2$-A$^2$)$_n$- and -(A$^3$-Z$^3$)$_o$—U$^2$—(Z$^4$-A$^4$)$_p$- does not contain more aromatic groups than non-aromatic groups,
Z$^{1-4}$ are independently of each other —O—, —S—, —CO—, —COO—, —OCO—, —O—COO—, —CO—NR$^0$—, —NR$^0$—CO—, —NR$^0$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond,
R$^0$ and R$^{00}$ are independently of each other H or alkyl with 1 to 12 C-atoms,
m and n are independently of each other 0, 1, 2, 3 or 4,
and p are independently of each other 0, 1, 2, 3 or 4, and
R$^{1-5}$ are each independently H, halogen, —CN, —NC, —NCO, —NCS, —OCN, —SCN, —C(=O)NR$^0$R$^{00}$, —C(=O)X$^0$, —C(=O)R$^0$, —NH$_2$, —NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group R$^1$-5 denoting or being substituted by P or P-Sp-.

2. A polymerisable LC material according to claim 1, wherein the at least one di- or multireactive mesogenic compound is selected from formula DRM P$^1$-Sp$^1$-MG-Sp$^2$-P$^2$  DRM wherein
P$^1$ and P$^2$ independently of each other denote a polymerisable group,
Sp$^1$ and Sp$^2$ independently of each other are a spacer group or a single bond, and
MG is a rod-shaped mesogenic group selected from formula MG -(A$^1$-Z$^1$)$_n$-A$^2$-  MG wherein
A$^1$ and A$^2$ denote, in case of multiple occurrence independently of one another, an aromatic or alicyclic group, which optionally contains one or more heteroatoms selected from N, O and S, and is optionally mono- or polysubstituted by L$^1$,
L$^1$ is P-Sp-, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^{00}$, —NR$^{00}$R$^{000}$, —OH, —SF$_5$, optionally substituted silyl, aryl with 6 to 25 C atoms or heteroaryl with 2 to 25 C atoms, straight chain or branched alkyl, alkoxy, alkylcarbonyl, alkoxycarbonyl, alkylcarbonyloxy or alkoxycarbonyloxy with 1 to 12 C atoms for the alkyl or alkoxy portions of the straight chain groups and 3-12 C atoms for the alkyl or alkoxy portions of the branched groups, wherein one or more H atoms are optionally replaced by F or Cl,
R$^{00}$ and R$^{000}$ independently of each other denote H or alkyl with 1 to 12 C-atoms,
Z$^1$ denotes, in case of multiple occurrence independently of one another, —O—, —S—, —CO—, —COO—, —OCO—, —S—CO—, —CO—S—, —O—COO—, —CO—NR$^{00}$—, —NR$^{00}$—CO—, —NR$^{00}$—CO—NR$^{000}$—, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond,
Y$^1$ and Y$^2$ independently of each other denote H, F, Cl or CN,
n is 1, 2, 3 or 4, and
n1 is an integer from 1 to 10.

3. A polymerisable LC material according to claim 2, which comprises at least one direactive mesogenic compound selected from the following formulae,

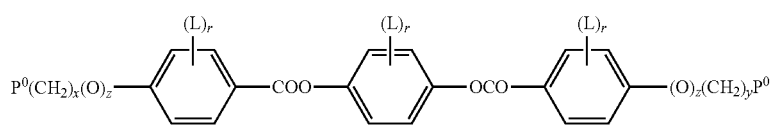

DRMa1

-continued

DRMa2
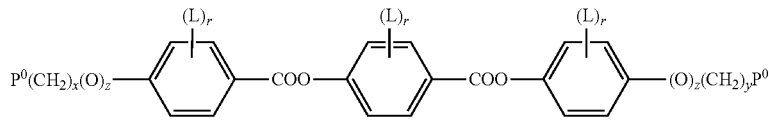

DRMa3
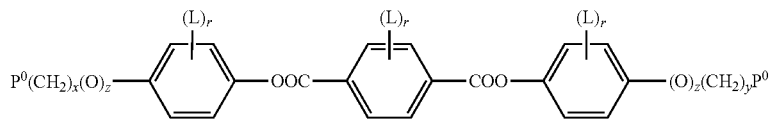

DRMa4
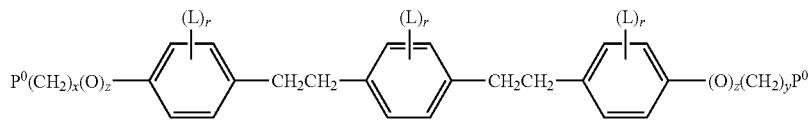

DRMa5
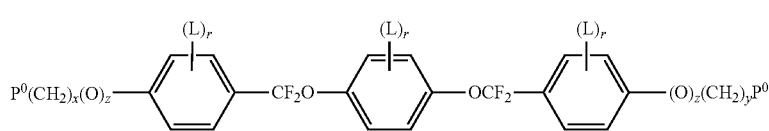

DRMa6
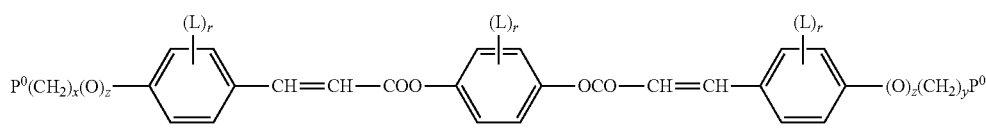

DRMa7
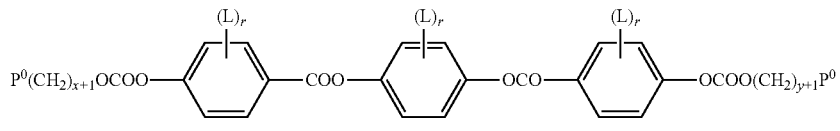

DRMb
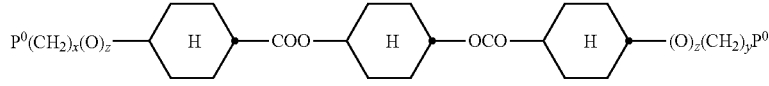

DRMc
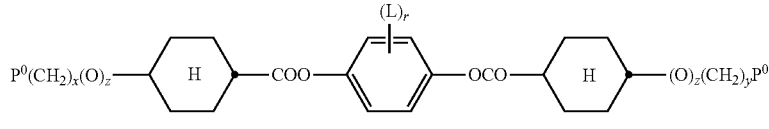

DRMd
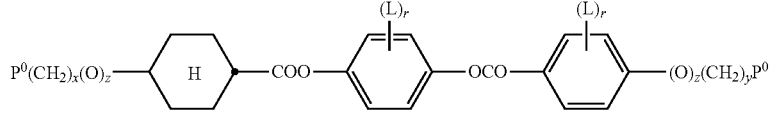

DRMe
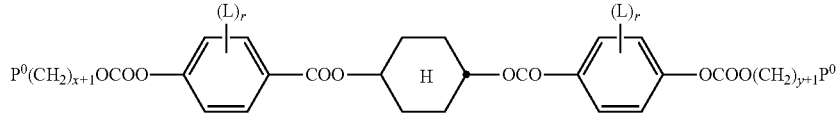

wherein $P^0$ is, in case of multiple occurrence independently of one another, an acryl, methacryl, oxetane, epoxy, vinyl, heptadiene, vinyloxy, propenyl ether or styrene group, L has, on each occurrence identically or differently, one of the meanings given for L' in formula DRM, r is 0, 1, 2, 3 or 4, x and y are independently of each other 0 or identical or different integers from 1 to 12, z is each and independently, 0 or 1, with z being 0 if the adjacent x or y is 0.

4. A polymerisable LC material according to claim 2, comprising, in addition to and other than MRM1, at least one monoreactive mesogenic compound of formula MRM, $$P^1\text{-}Sp^1\text{-}MG\text{-}R \qquad \text{MRM}$$

wherein $P^1$, $Sp^1$ and MG have the meanings as given in formula DRM,

R is F, Cl, Br, I, —CN, —NO$_2$, —NCO, —NCS, —OCN, —SCN, —C(=O)NR$^x$R$^y$, —C(=O)X, —C(=O)OR$^x$, —C(=O)R$^y$, —NR$^x$R$^y$, —OH, —SF$_5$, optionally substituted silyl, straight chain or branched alkyl, alkoxy, alkylcarbonyl, alkoxycarbonyl, alkylcarbonyloxy or alkoxycarbonyloxy with 1 to 12 C atoms for the alkyl or alkoxy portions of the straight chain groups and 3-12 C atoms for the alkyl or alkoxy portions of the branched groups, wherein one or more H atoms are optionally replaced by F or Cl, X is halogen, and $R^x$ and $R^y$ are independently of each other H or alkyl with 1 to 12 C-atoms.

5. A polymerisable LC material according to claim 4, wherein the at least one monoreactive mesogenic compound other than MRM1 is of formulae,

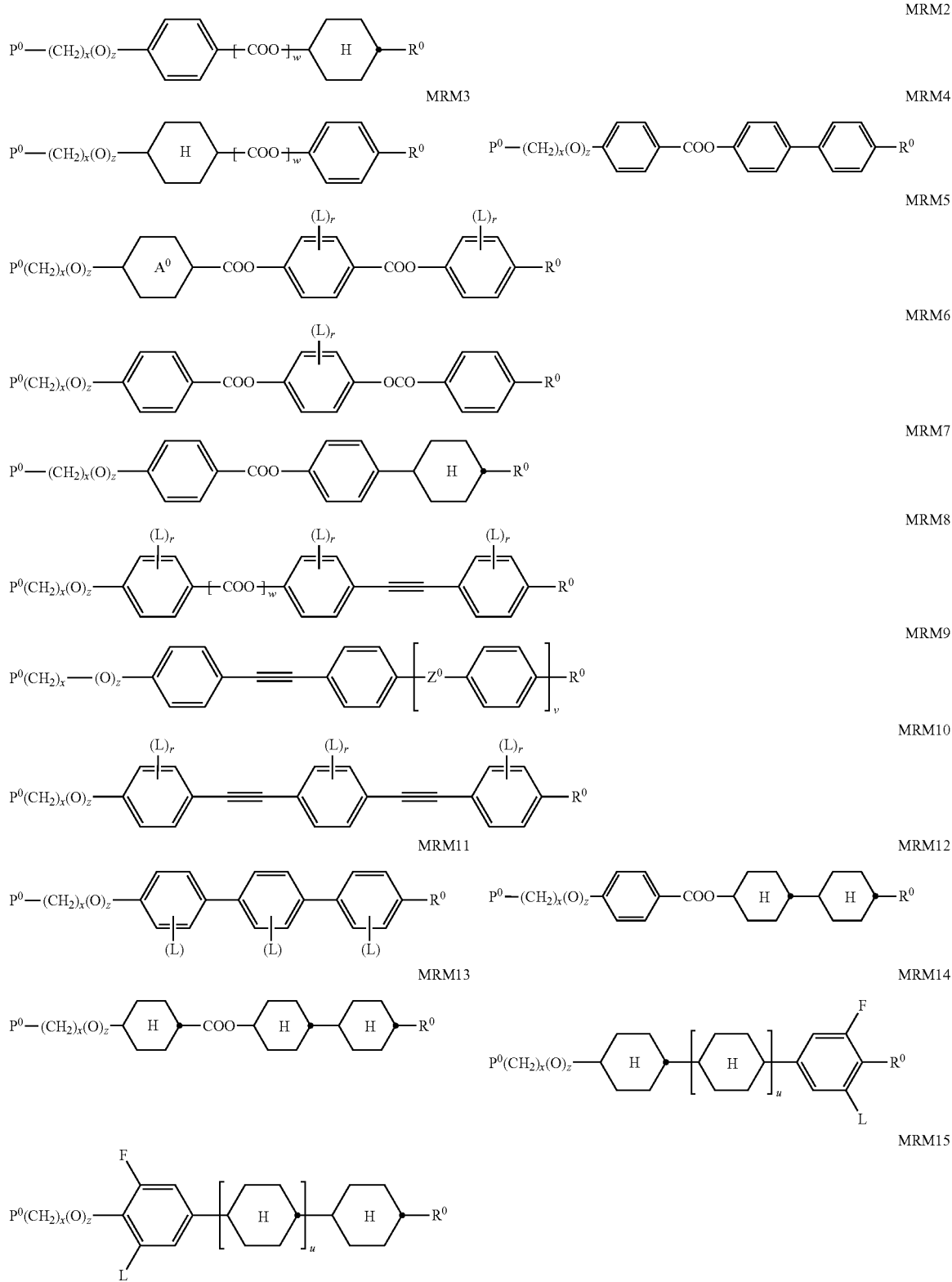

-continued

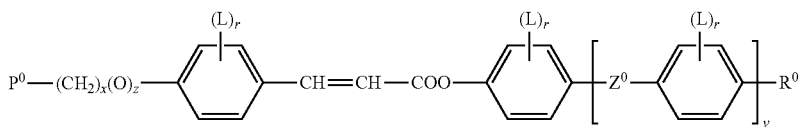
MRM16

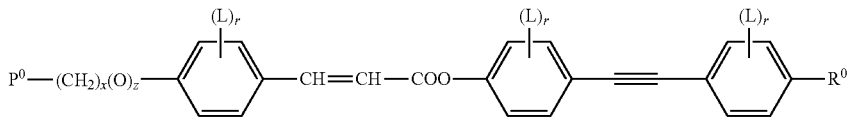
MRM17

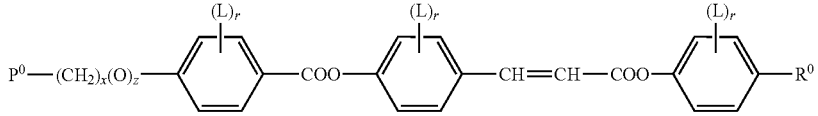
MRM18

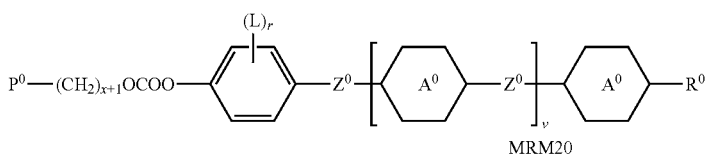
MRM19

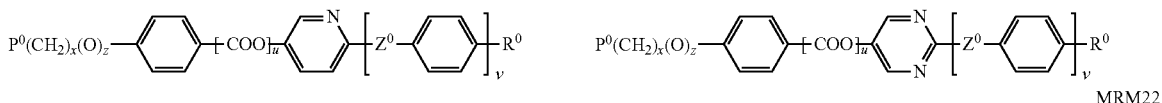
MRM20    MRM21

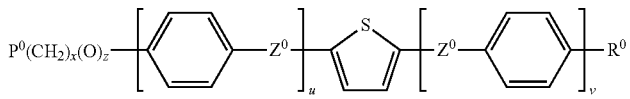
MRM22

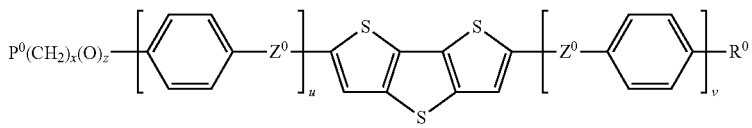
MRM23

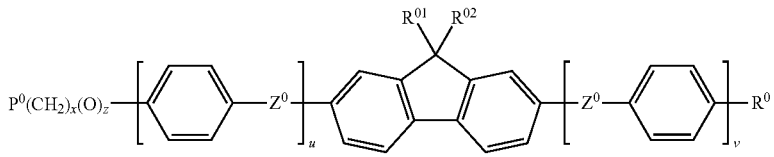
MRM24

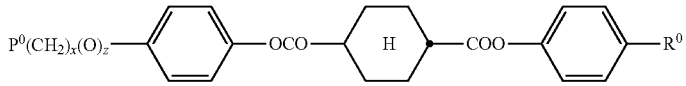
MRM25

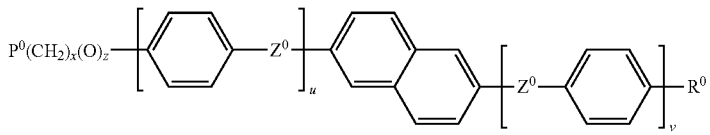
MRM26

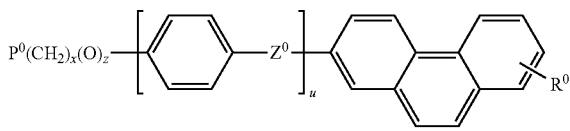
MRM27 wherein
$P^0$ is, in case of multiple occurrence independently of one another, an acryl, methacryl, oxetane, epoxy, vinyl, heptadiene, vinyloxy, propenyl ether or styrene group,
L is P-Sp-, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^{00}$, —NR$^{00}$R$^{000}$, —OH, —SF$_5$, optionally substituted silyl, aryl with 6 to 25 C atoms or heteroaryl with 2 to 25 C atoms, straight chain or branched alkyl, alkoxy, alkylcarbonyl, alkoxycarbonyl, alkylcarbonyloxy or alkoxycarbonyloxy with 1 to 12 C atoms for the alkyl or alkoxy portions of the straight chain groups and 3-12 atoms for the alkyl or alkoxy portions of the branched groups, wherein one or more H atoms are optionally replaced by F or Cl, r is 0, 1, 2, 3 or 4, x and y are independently of each other 0 or identical or different integers from 1 to 12, z is each and independently, 0 or 1, with z being 0 if the adjacent x or y is 0, $R^0$ is alkyl, alkoxy, thioalkyl, alkylcarbonyl, alkoxycarbonyl, alkylcarbonyloxy or alkoxycarbonyloxy with 1 to 15 C atoms for the alkyl and alkoxy portions or denotes $Y^0$, $Y^0$ is F, Cl, CN, $NO_2$, $OCH_3$, OCN, SCN, $SF_5$, or mono- oligo- or polyfluorinated alkyl or alkoxy with 1 to 4 C atoms, $Z^0$ is —COO—, —OCO—, —$CH_2CH_2$—, —$CF_2O$—, —$OCF_2$—, —CH=CH—, —OCO—CH=CH—, —CH=CH—COO—, or a single bond, $A^0$ is, in case of multiple occurrence independently of one another, 1,4-phenylene that is unsubstituted or substituted with 1, 2, 3 or 4 groups L, or trans-1,4-cyclohexylene, u and v are independently of each other 0, 1 or 2, w is 0 or 1, and wherein the benzene and naphthalene rings are optionally additionally substituted with one or more identical or different groups L.

6. A polymerisable LC material according to claim 1, wherein the proportion of di- or multireactive mesogenic compounds is in the range from 5 to 99% by weight.

7. A polymerisable LC material according to claim 4, wherein the proportion of monoreactive mesogenic compounds is in the range from 5 to 80% by weight.

8. A polymerisable LC material according to claim 1, further comprising one or more antioxidants.

9. A polymerisable LC material according to claim 1, further comprising one or more additives selected from the group consisting of: surfactants, further stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

10. A process for the preparation of the polymerisable LC material according to claim 1 comprising the steps of mixing one or more compounds of formula CO-1 with at least one di- or multireactive mesogenic compound and at least one monoreactive mesogenic compound of the formula MRM1.

11. A process for the preparation of a polymer film comprising:
providing a layer of a polymerisable LC material according to claim 1 onto a substrate,
photopolymerising the polymerisable LC material, and
optionally removing the polymerised LC material from the substrate and/or optionally providing it onto another substrate.

12. A polymer film obtained from a polymerisable LC material according to claim 1 by a process comprising the steps of:
providing a layer of the polymerisable LC material onto a substrate,
photopolymerising the LC material, and
optionally, removing the polymerised LC material from the substrate and/or optionally providing it onto another substrate.

13. A polymer film according to claim 12, wherein the LC material is uniformly aligned.

14. An optical device, electro optical device, information storage device, decorative or security application device, liquid crystal display, 3D display, projection system, polariser, compensator, alignment layer, circular polariser, colour filter, decorative image, liquid crystal pigment, reflective film with spatially varying reflection colours, multicolour image, non-forgeable document, identity or credit card or banknote, comprising a polymer film according to claim 12.

15. An optical component or device, polariser, patterned retarder, compensator, alignment layer, circular polariser, colour filter, decorative image, liquid crystal lens, liquid crystal pigment, reflective film with spatially varying reflection colours, or multicolour image for decorative or information storage, comprising at least one polymer film according to claim 12.

16. An optical device, electro optical device, information storage device, decorative or security application device, liquid crystal display, 3D display, projection system, polariser, compensator, alignment layer, circular polariser, colour filter, decorative image, liquid crystal pigment, reflective film with spatially varying reflection colours, multicolour image, non-forgeable document, identity or credit card or banknote, comprising a polymerizable LC material according to claim 1.

17. An optical component or device, polariser, patterned retarder, compensator, alignment layer, circular polariser, colour filter, decorative image, liquid crystal lens, liquid crystal pigment, reflective film with spatially varying reflection colours, or multicolour image for decorative or information storage, comprising a polymerizable LC material according to claim 1.

* * * * *